United States Patent [19]
Ozawa et al.

[11] 3,971,924
[45] July 27, 1976

[54] ELECTRONIC CALCULATOR DISPLAYING A PARTIAL RESULT OBTAINED FROM A PORTION OF A NUMERICAL EXPRESSION

[75] Inventors: Masayoshi Ozawa, Machida; Minoru Machida, Tokyo; Yoichi Kawabata, Tokyo; Mitsuaki Seki, Tokyo, all of Japan

[73] Assignee: Canon Kabushiki Kaisha, Tokyo, Japan

[22] Filed: Apr. 30, 1974

[21] Appl. No.: 465,570

[30] Foreign Application Priority Data
May 7, 1973 Japan................................ 48-50907
May 7, 1973 Japan................................ 48-50908

[52] U.S. Cl. ............................................. 235/156
[51] Int. Cl.² ........................................... G06F 7/38
[58] Field of Search ........... 235/156, 159, 160, 164,

[56] References Cited
UNITED STATES PATENTS

| | | | |
|---|---|---|---|
| 3,720,820 | 3/1973 | Cochran | 235/156 |
| 3,825,736 | 7/1974 | Osborne | 235/168 |
| 3,839,630 | 10/1974 | Olander et al. | 235/156 |

Primary Examiner—David H. Malzahn
Attorney, Agent, or Firm—Fitzpatrick, Cella, Harper & Scinto

[57] ABSTRACT

An electronic calculator having a pair of parenthesis keys is capable of displaying a temporary partial result obtained from an operation performed on a portion of a numerical expression to be calculated, which portion is included within a pair of parentheses. The partial result may be continuously displayed until the next key operation is executed. A temporary result from an exponent term in an expression is also indicated visually.

| FORMULLAE | SYSTEM 1 | SYSTEM 2 | SYSTEM 3 | INVENTIVE SYSTEM |
|---|---|---|---|---|
| A + B = | A =  B = | A + B + | A + B = | A + B = |
| A − B = | A = B = | A + B = | A − B = | A − B = |
| A × B = | A × B = | A × B = | A × B = | A × B = |
| A ÷ B = | A ÷ B = | A ÷ B = | A ÷ B = | A ÷ B = |
| A+B−C= | A = B = C = | A + B + C = | A + B C = | A + B − C = |
| A÷B×C= | A ÷ B × C = | A ÷ B × C = | A ÷ B C = | A ÷ B × C = |
| A+B×C= | B × C = A = | B × C = + A = | B × C + A = | A + B × C = |
| A−B÷C= | B ÷ C = A = | B ÷ C = SC + A = | B ÷ C = A − SC | A = B ÷ C = |
| KIND OF FUNCTION KEYS | × ÷ <br> = ≡ | × ÷ + − <br> = SC | | ] [ aˣ |

FIG. 1B

| FORMULLAE | SYSTEM 1 | SYSTEM 2 | SYSTEM 3 | INVENTIVE SYSTEM |
|---|---|---|---|---|
| $(A-B) \div C =$ | A= B= ÷ C= | A+ B= ÷ C= | A− B= ÷ C= | [ A − B ] ÷ C = |
| $A \times (B+C) =$ | B= C= × A= | B+ C+ = × A= | B+ C= × A= | A × [ B + C ] = |
| $A+B \times (C-D \div E) =$ | D÷ E= C= × B= + A= | D÷ E= SC + C+ = × B+ A+ = | D÷ E= SC + C= × B+ A= | A + B × [ C − D ÷ E ] = |
| $A \div B^c \times (D+E) =$ | | | | A ÷ B $a^x$ C × [ D + E ] = |
| KIND OF FUNCTION KEYS | × ÷ = = | × ÷ + − = SC | | ] [ $a^x$ |

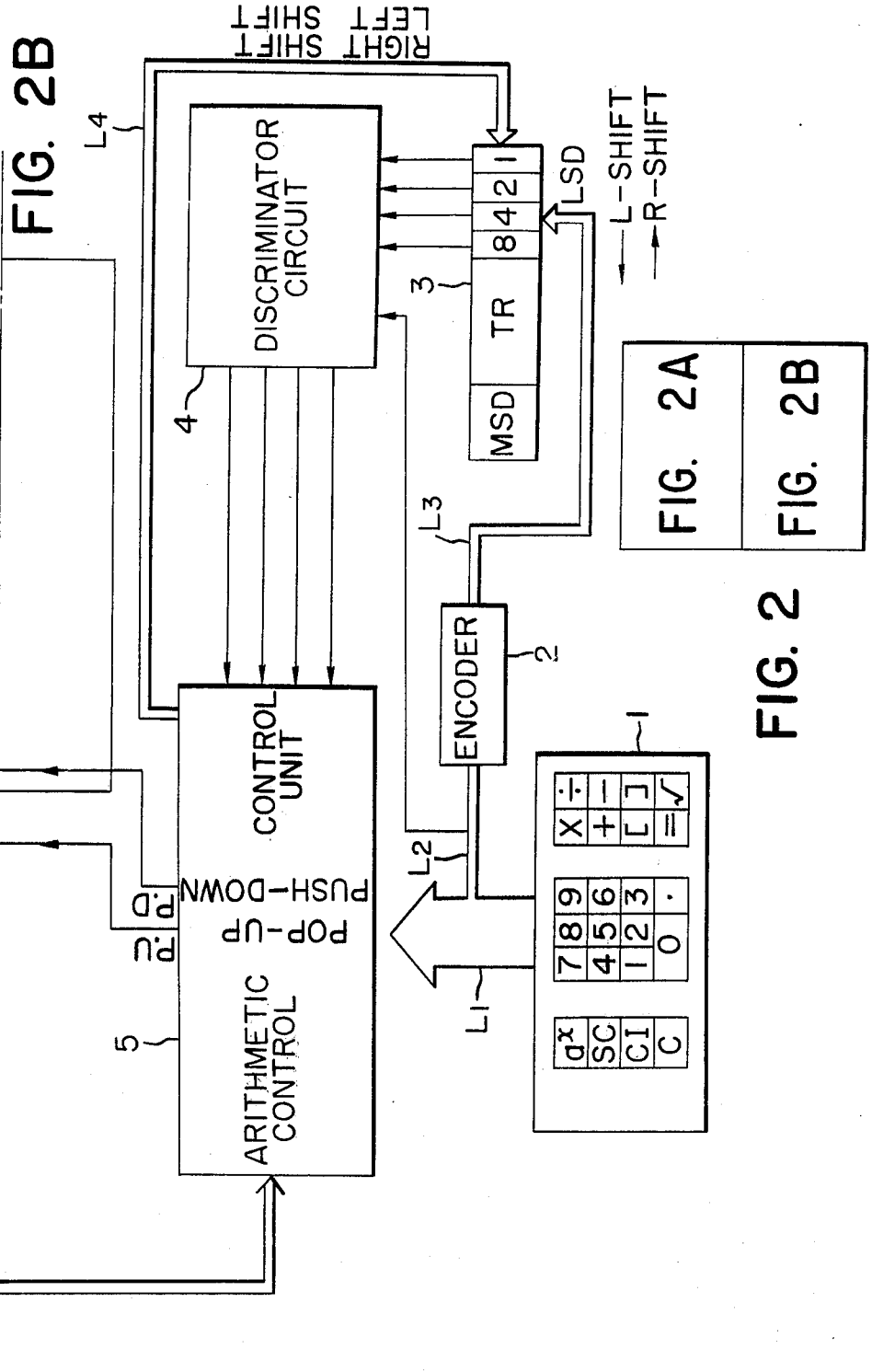

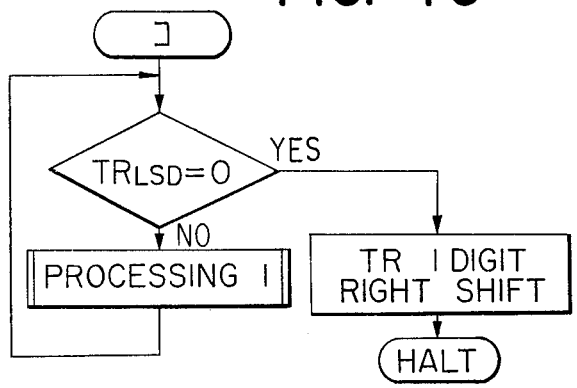
FIG. 4G
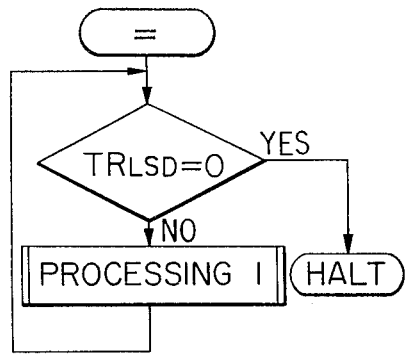
FIG. 4H
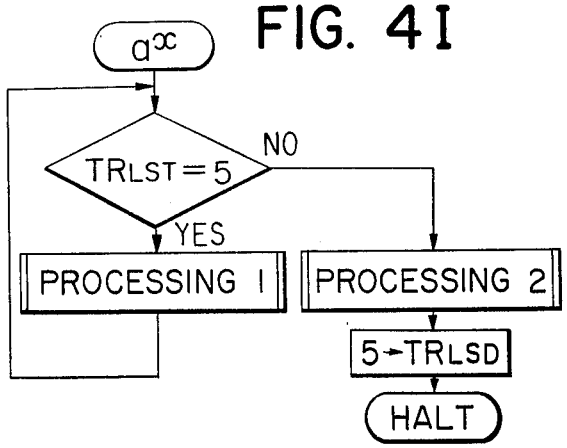
FIG. 4I
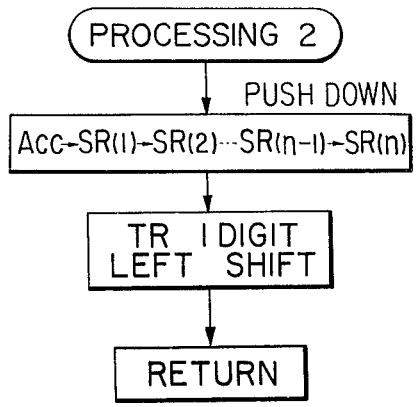
FIG. 4J
FIG. 5
| KEYS | CODES | ORDER |
|------|-------|-------|
| C, [, =, | 0 | 4 |
| + | 1 | 3 |
| − | 2 | |
| × | 3 | 2 |
| ÷ | 4 | |
| $a^x$ | 5 | 1 |

FIG. 6A  A+B×C=

| REGISTERS / STEPS | Acc | TR | LSD | SR(1) | SR(2) | SR(3) | SR(4) | SR(5) |
|---|---|---|---|---|---|---|---|---|
| A | A | 0~0 | 0 | 0~0 | 0~0 | 0~0 | 0~0 | 0~0 |
| ⊞ | A | 0~0 | 1 | A | 0~0 | 0~0 | 0~0 | 0~0 |
| B | B | 0~0 | 1 | A | 0~0 | 0~0 | 0~0 | 0~0 |
| ⊠ | B | 0~01 | 3 | B | A | 0~0 | 0~0 | 0~0 |
| C | C | 0~01 | 3 | B | A | 0~0 | 0~0 | 0~0 |
|  | B×C | 0~0 | 1 | A | 0~0 | 0~0 | 0~0 | 0~0 |
| ⊟ | A+B×C | 0~0 | 0 | 0~0 | 0~0 | 0~0 | 0~0 | 0~0 |

FIG. 6B  A×(B+C)=

| REGISTERS / STEPS | Acc | TR | LSD | SR(1) | SR(2) | SR(3) | SR(4) | SR(5) |
|---|---|---|---|---|---|---|---|---|
| A | A | 0~0 | 0 | 0~0 | 0~0 | 0~0 | 0~0 | 0~0 |
| ⊠ | A | 0~0 | 3 | A | 0~0 | 0~0 | 0~0 | 0~0 |
| ⊏ | 0 | 0~03 | 0 | A | 0~0 | 0~0 | 0~0 | 0~0 |
| B | B | 0~03 | 0 | A | 0~0 | 0~0 | 0~0 | 0~0 |
| ⊞ | B | 0~030 | 1 | B | "A" | 0~0 | 0~0 | 0~0 |
| C | C | 0~030 | 1 | B | "A" | 0~0 | 0~0 | 0~0 |
| ⊐ | B+C | 0~0 | 3 | A | 0~0 | 0~0 | 0~0 | 0~0 |
| ⊟ | A×(B+C) | 0~0 | 0 | 0~0 | 0~0 | 0~0 | 0~0 | 0~0 |

FIG. 6C  A+B−C=

| REGISTERS \ STEPS | Acc | TR | LSD | SR(1) | SR(2) | SR(3) | SR(4) | SR(5) |
|---|---|---|---|---|---|---|---|---|
| A | A | 0~0 | 0 | 0~0 | 0~0 | 0~0 | 0~0 | 0~0 |
| + | A | 0~0 | 1 | A | 0~0 | 0~0 | 0~0 | 0~0 |
| B | B | 0~0 | 1 | A | 0~0 | 0~0 | 0~0 | 0~0 |
| − | A+B | 0~0 | 2 | A+B | 0~0 | 0~0 | 0~0 | 0~0 |
| C | C | 0~0 | 2 | A+B | 0~0 | 0~0 | 0~0 | 0~0 |
| = | A+B−C | 0~0 | 0 | 0~0 | 0~0 | 0~0 | 0~0 | 0~0 |

FIG. 6D  (A−B)÷C=

| REGISTERS \ STEPS | Acc | TR | LSD | SR(1) | SR(2) | SR(3) | SR(4) | SR(5) |
|---|---|---|---|---|---|---|---|---|
| [ | 0~0 | 0~0 | 0 | 0~0 | 0~0 | 0~0 | 0~0 | 0~0 |
| A | A | 0~0 | 0 | 0~0 | 0~0 | 0~0 | 0~0 | 0~0 |
| − | A | 0~0 | 2 | A | 0~0 | 0~0 | 0~0 | 0~0 |
| B | B | 0~0 | 2 | A | 0~0 | 0~0 | 0~0 | 0~0 |
| ] | A−B | 0~0 | 0 | 0~0 | 0~0 | 0~0 | 0~0 | 0~0 |
| ÷ | A−B | 0~0 | 4 | A−B | 0~0 | 0~0 | 0~0 | 0~0 |
| C | C | 0~0 | 4 | A−B | 0~0 | 0~0 | 0~0 | 0~0 |
| = | (A−B)÷C | 0~0 | 0 | 0~0 | 0~0 | 0~0 | 0~0 | 0~0 |

| REGISTERS / STEPS | Acc | TR | LSD | SR(1) | SR(2) | SR(3) | SR(4) | SR(5) |
|---|---|---|---|---|---|---|---|---|
| A | A | 0~0 | 0 | 0~0 | 0~0 | 0~0 | 0~0 | 0~0 |
| + | A | 0~0 | 1 | A | 0~0 | 0~0 | 0~0 | 0~0 |
| B | B | 0~0 | 1 | A | 0~0 | 0~0 | 0~0 | 0~0 |
| × | B | 0~1 | 3 | B | A | 0~0 | 0~0 | 0~0 |
| ( | 0 | 0~13 | 0 | B | A | 0~0 | 0~0 | 0~0 |
| C | C | 0~13 | 0 | B | A | 0~0 | 0~0 | 0~0 |
| − | C | 0~130 | 2 | C | B | A | 0~0 | 0~0 |
| D | D | 0~130 | 2 | C | B | A | 0~0 | 0~0 |
| ÷ | D | 0~1302 | 4 | D | C | B | A | 0~0 |
| E | E | 0~1302 | 4 | D | C | B | A | 0~0 |
| ) | C−D÷E | 0~01 | 3 | B | A | 0~0 | 0~0 | 0~0 |
| = | A+B×(C−D÷E) | 0~0 | 0 | 0~0 | 0~0 | 0~0 | 0~0 | 0~0 |

FIG. 6F $A \div B^C \times (D+E) =$

| REGISTERS STEPS | Acc | TR | LSD | SR(1) | SR(2) | SR(3) | SR(4) | SR(5) |
|---|---|---|---|---|---|---|---|---|
| A | A | 0~0 | 0 | 0~0 | 0~0 | 0~0 | 0~0 | 0~0 |
| ÷ | A | 0~0 | 4 | A | 0~0 | 0~0 | 0~0 | 0~0 |
| B | B | 0~0 | 4 | A | 0~0 | 0~0 | 0~0 | 0~0 |
| $a^x$ | B | 0~04 | 5 | B | A | 0~0 | 0~0 | 0~0 |
| C | C | 0~04 | 5 | B | A | 0~0 | 0~0 | 0~0 |
| × | $A \div B^C$ | 0~0 | 3 | $A \div B^C$ | 0~0 | 0~0 | 0~0 | 0~0 |
| ( | 0 | 0~3 | 0 | $A \div B^C$ | 0~0 | 0~0 | 0~0 | 0~0 |
| D | D | 0~3 | 0 | $A \div B^C$ | 0~0 | 0~0 | 0~0 | 0~0 |
| + | D | 0~30 | 1 | D | $A \div B^C$ | 0~0 | 0~0 | 0~0 |
| E | E | 0~30 | 1 | D | $A \div B^C$ | 0~0 | 0~0 | 0~0 |
| ) | D+E | 0~0 | 3 | $A \div B^C$ | 0~0 | 0~0 | 0~0 | 0~0 |
| = | $A \div B^C \times (D+E)$ | 0~0 | 0 | 0~0 | 0~0 | 0~0 | 0~0 | 0~0 |

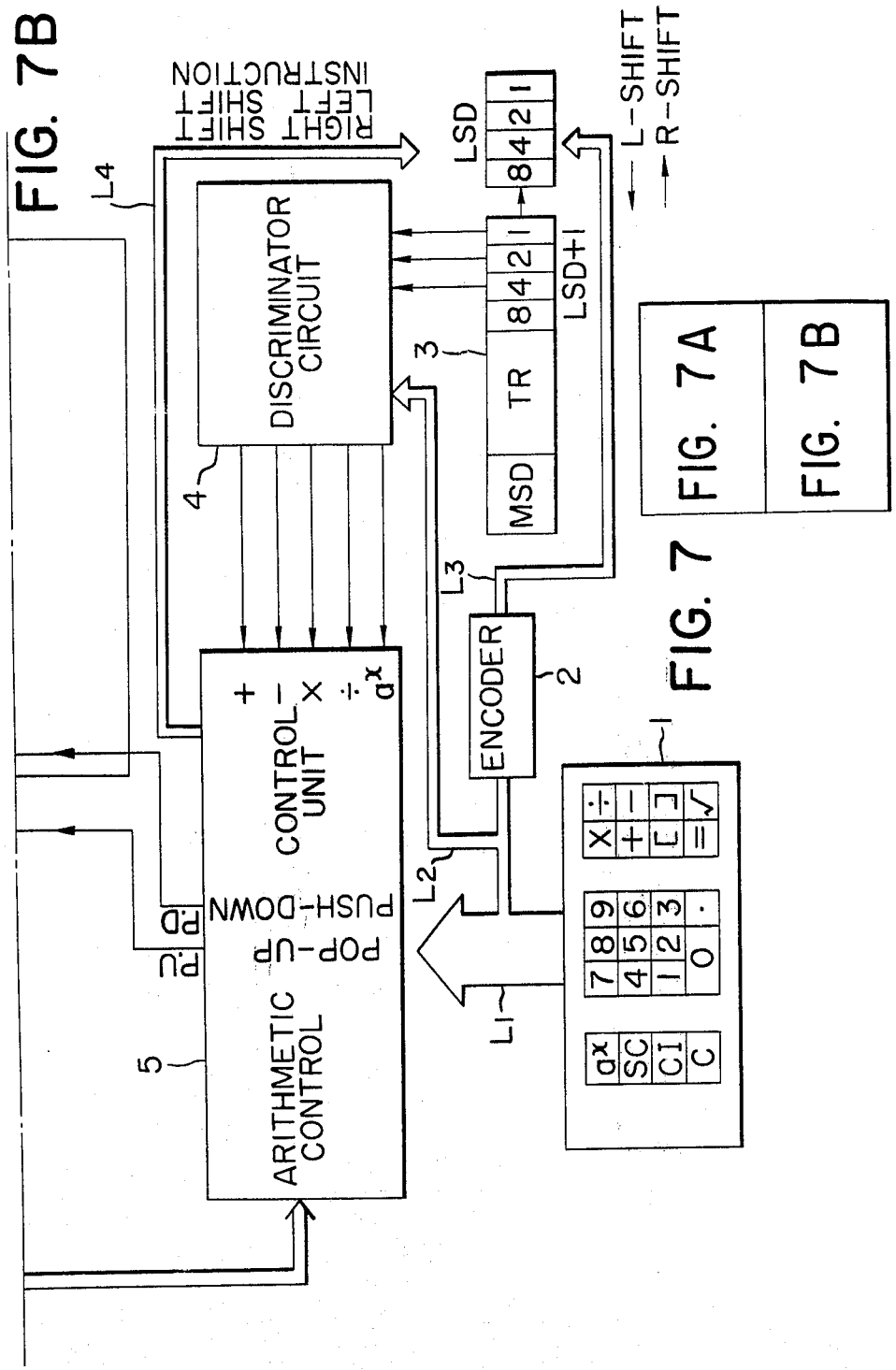

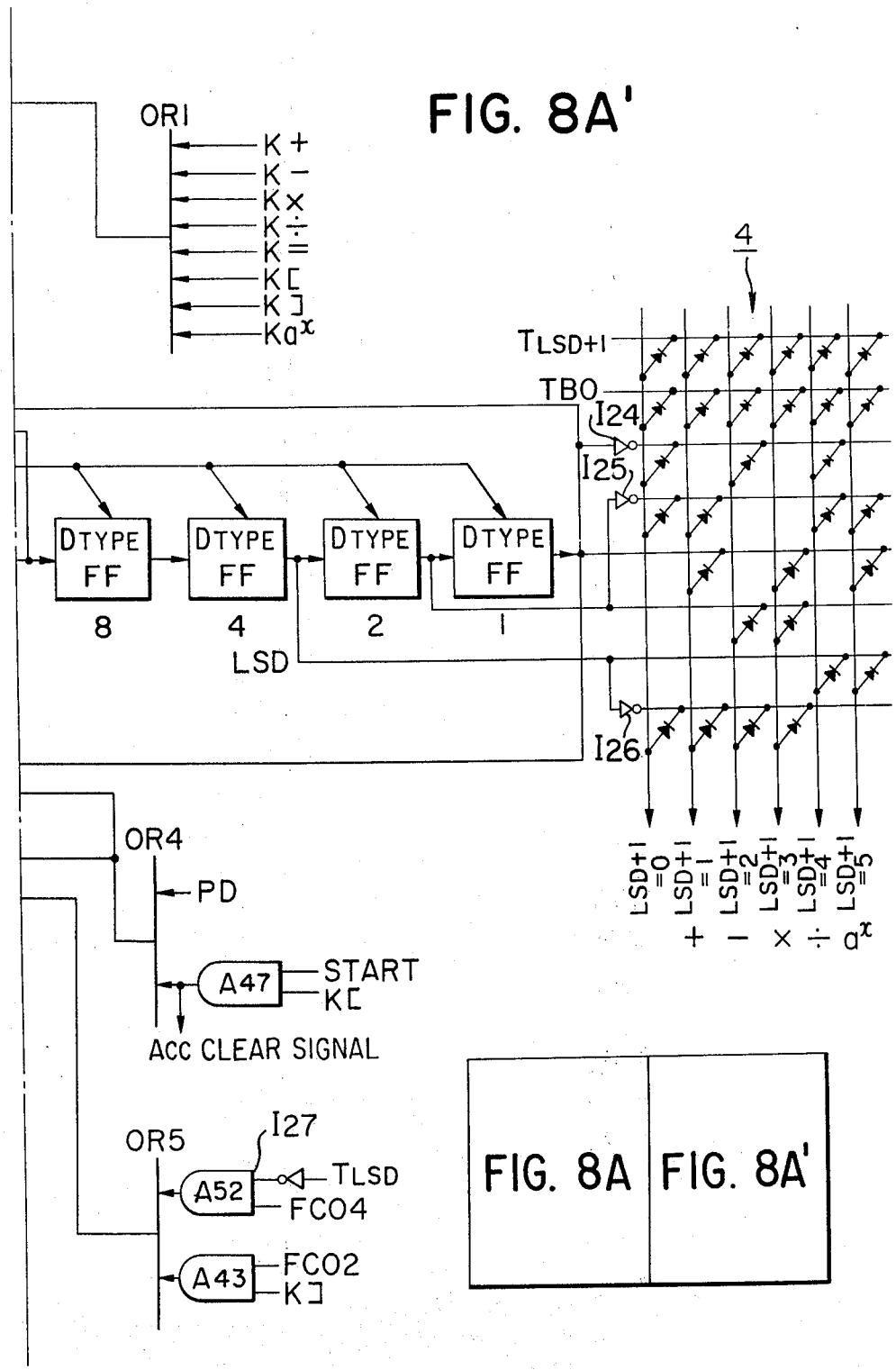

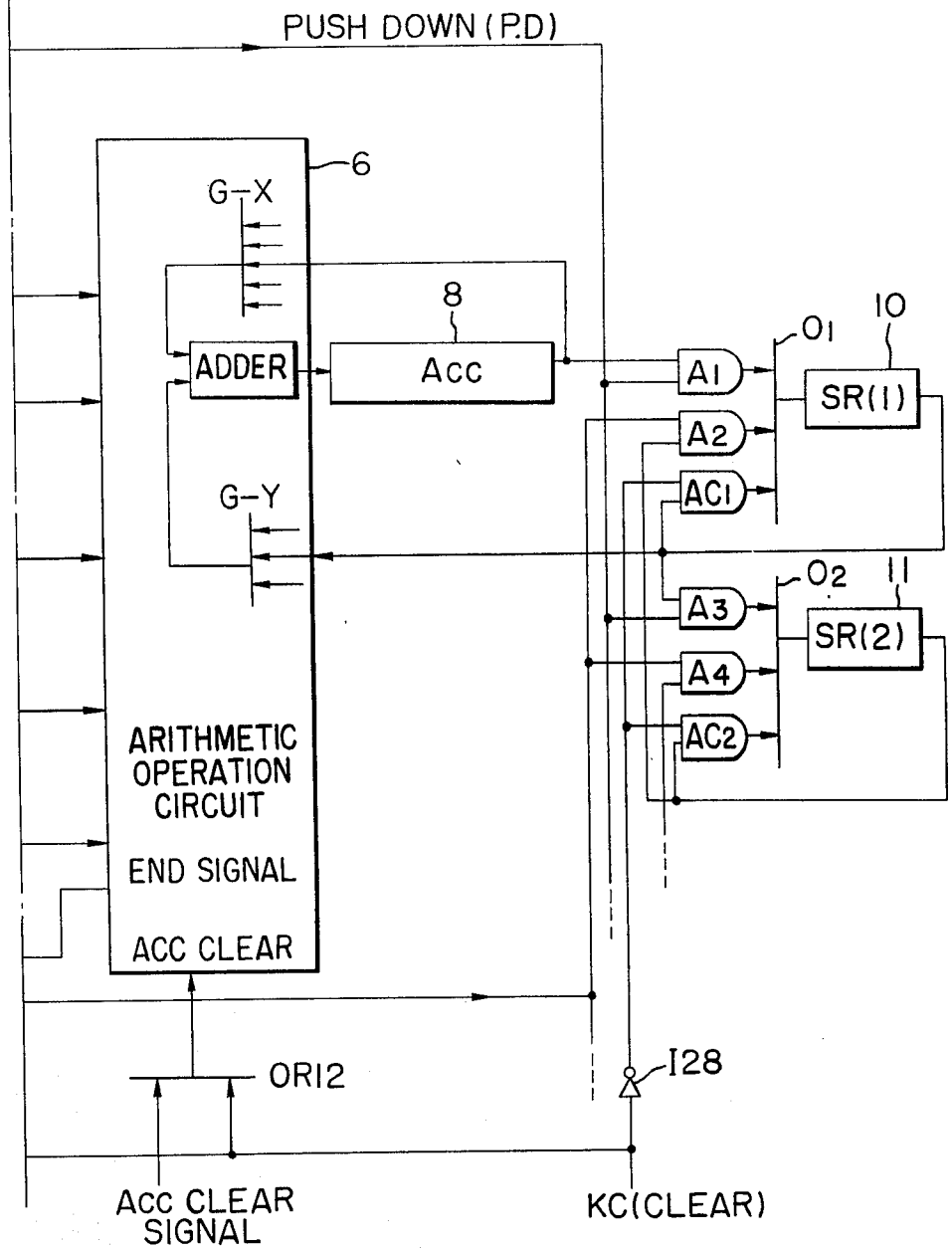
FIG. 8B"
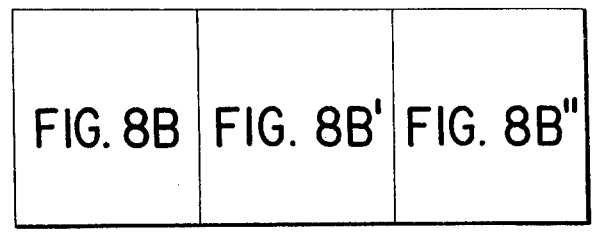

BASIC TIMING PULSE
GENERATOR SECTION

KEY BOARD SECTION

BASIC TIMING 2

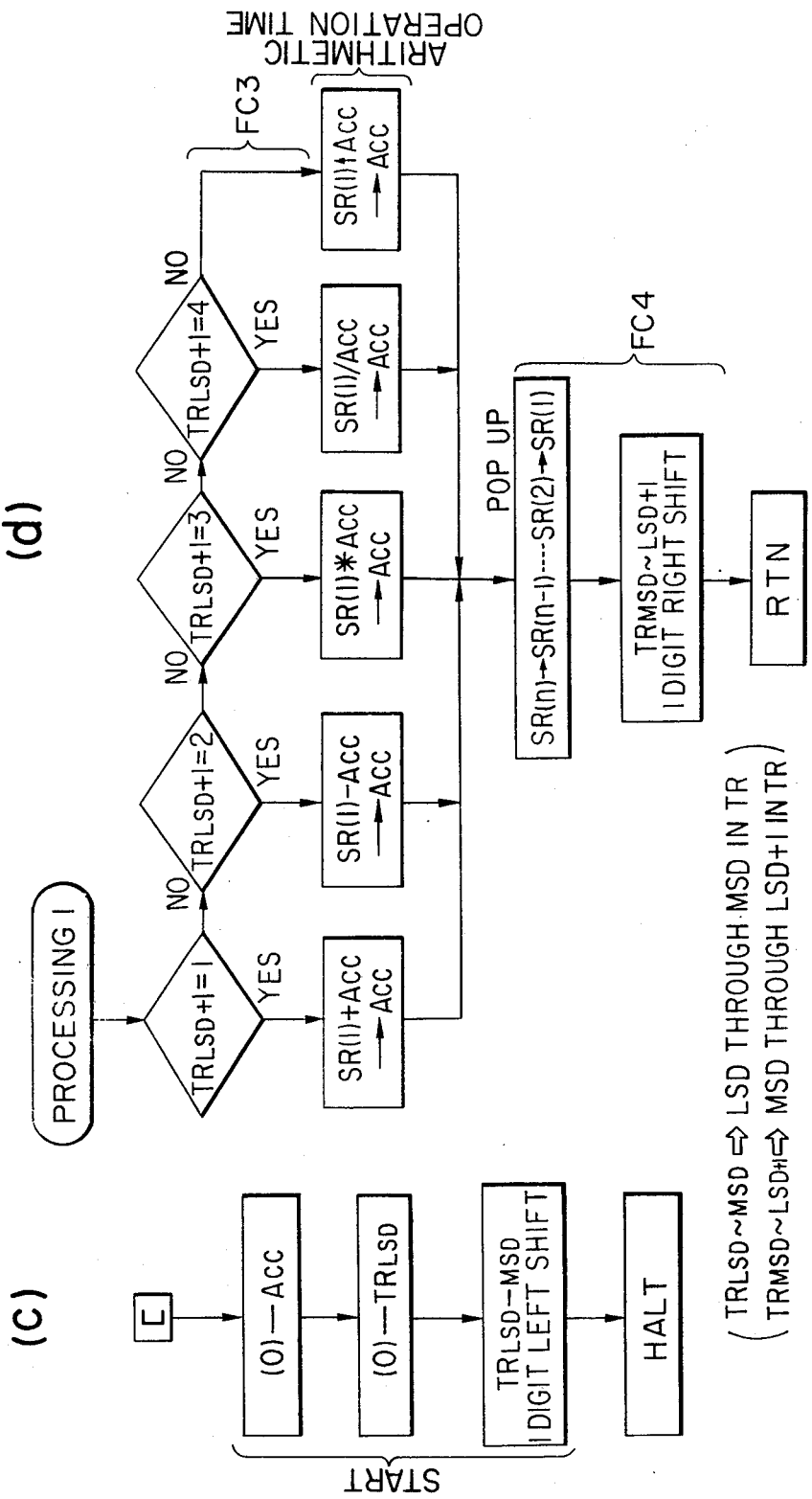

FIG. 14

$A \times (B+C) =$

| STEPS | | REGISTERS | ACC | TR | L·S+D | SR(1) | SR(2) | SR(3) | SR(4) | SR(5) |
|---|---|---|---|---|---|---|---|---|---|---|
| C | | | 0~0 | 0~0 | 0~0 | 0~0 | 0~0 | 0~0 | 0~0 | 0~0 |
| A | IMMEDIATELY AFTER OCCURRENCE OF START | | A | 0~0 | 0~0 | 0~0 | 0~0 | 0~0 | 0~0 | 0~0 |
| ☒ | IMMEDIATELY AFTER OCCURRENCE OF FC02 | | A | 0~0 | 0~3 | 0~3 | 0~0 | 0~0 | 0~0 | 0~0 |
| ⌐ | | | A | 0~0 | 0~3 | 3~0 | A | 0~0 | 0~0 | 0~0 | 0~0 |
| B | IMMEDIATELY AFTER OCCURRENCE OF START | | B | 0~3 | 0~3 | 0~0 | A | 0~0 | 0~0 | 0~0 | 0~0 |
| + | IMMEDIATELY AFTER OCCURRENCE OF FC02 | | B | 0~3 | 0~3 | 0~1 | A | 0~0 | 0~0 | 0~0 | 0~0 |
| C | | | B | 0~30 | 0~30 | 1~0 | B | A | 0~0 | 0~0 | 0~0 |
| ⌐ | IMMEDIATELY AFTER OCCURRENCE OF FC04 | | C | 0~30 | 0~30 | 1~0 | B | A | 0~0 | 0~0 | 0~0 |
| = | IMMEDIATELY AFTER OCCURRENCE OF FC02 | | B+C | 0~3 | 0~3 | 0~0 | A | 0~0 | 0~0 | 0~0 | 0~0 |
| | | | B+C | 0~0 | 0~30 | 0~0 | A | 0~0 | 0~0 | 0~0 | 0~0 |
| | | | A×(B+C) | 0~0 | 0~0 | 0~0 | 0~0 | 0~0 | 0~0 | 0~0 | 0~0 |

| STEPS \ REGISTERS | ACC | TR | LSD+1 | SR(1) | SR(2) | SR(3) | SR(4) | SR(5) |
|---|---|---|---|---|---|---|---|---|
| [C] | 0~0 | 0~0 | 0 | 0~0 | 0~0 | 0~0 | 0~0 | 0~0 |
| A | A | 0~0 | 0 | 0~0 | 0~0 | 0~0 | 0~0 | 0~0 |
| [+] | A | 0~0 | 1 | A | 0~0 | 0~0 | 0~0 | 0~0 |
| B | B | 0~0 | 1 | A | 0~0 | 0~0 | 0~0 | 0~0 |
| [×] | B | 0~01 | 3 | B | A | 0~0 | 0~0 | 0~0 |
| [[ | 0~0 | 0~013 | 0 | B | A | 0~0 | 0~0 | 0~0 |
| C | C | 0~013 | 0 | B | A | 0~0 | 0~0 | 0~0 |
| [-] | C | 0~0130 | 2 | C | B | A | 0~0 | 0~0 |
| D | D | 0~0130 | 2 | C | B | A | 0~0 | 0~0 |
| [÷] | D | 0~01302 | 4 | D | C | B | A | 0~0 |
| [( | 0~0 | 0~013024 | 0 | D | C | B | A | 0~0 |
| E | E | 0~013024 | 0 | D | C | B | A | 0~0 |
| [+] | E | 0~0130240 | 1 | E | D | C | B | A |
| F | F | 0~0130240 | 1 | E | D | C | B | A |
| )] | E+F | 0~0130240 | 0 | D | C | B | A | 0~0 |
| [×] | D÷(E+F) | 0~01302 | 4 | D÷(E+F) | C | B | A | 0~0 |
| G | G | 0~01302 | 3 | D÷(E+F) | C | B | A | 0~0 |
| )] | C-D÷(E+F)×G | 0~01 | 3 | B | A | 0~0 | 0~0 | 0~0 |
| [=] | A+B×[C-D÷(E+F)×G] | 0~0 | 0 | 0~0 | 0~0 | 0~0 | 0~0 | 0~0 |

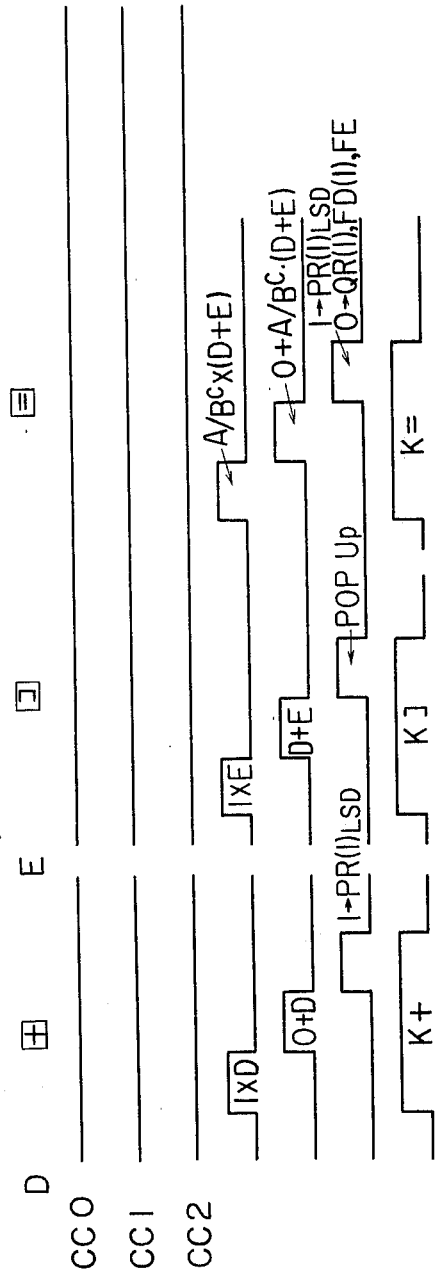
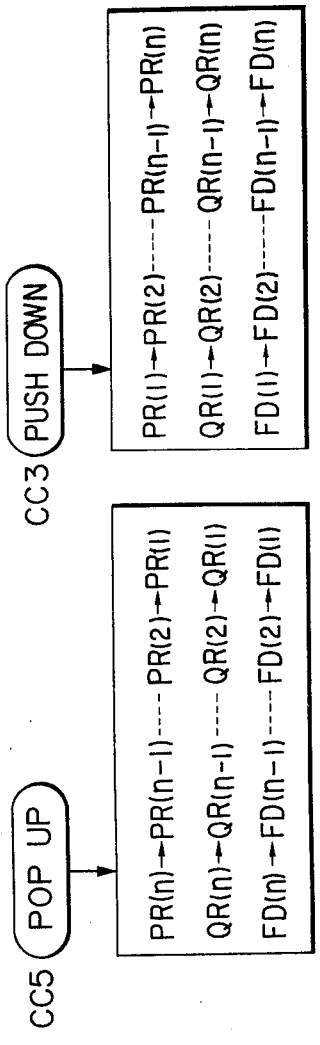

ELECTRONIC CALCULATOR DISPLAYING A PARTIAL RESULT OBTAINED FROM A PORTION OF A NUMERICAL EXPRESSION

BACKGROUND OF THE INVENTION

1. Field of the Invention

The present invention relates to an electronic calculator which is capable of operating a numerical expression in sequence of touching the keyboard thereof in accordance with the order from left to right reading along the expression to be calculated, and is capable, in case of an expression including parentheses, of visually indicating in the display unit thereof a temporary answer resultant from operating the portion of the equation between the parentheses. The present invention also relates to an electronic calculator, which visually indicates not only the temporary result derived from a part of an expression between parentheses but any temporary result obtained from an independently operable portion of an expression to be calculated, by discriminating as an arithmetic block any independently operable portion of the expression to execute in turn an arithmetic operation to that portion.

2. Description of the Prior Art

A conventional desktop calculator has been designed with giving importance to the simple system configuration thereof, so that some operational functions might be reduced to a certain extent. For example, when a conventional calculator is operated by touching keys 3, ×, ( , 4, +, 5, ), and = in accordance with a numerical expression 3 × (4 + 5) =, the calculator will display or print out only the final result 27, and not any intermediate temporary result derived from a portion of the expression, such as 9 obtained from (4 + 5).

However it is often necessary for an operator to be informed of a temporary result with regard to a portion of an expression to be calculated. Otherwise, an operator must redundantly operate the calculator to obtain the temporary result. In the example described above, when an operator intends to know the result of (4 + 5) as a partial result of the expression, the operator should depress keys 4, +, 5, and = to be informed of the answer 9 visually indicated in the display unit thereof, which answer may be written down on a sheet of paper, and after that the operator will clear all previous settings in the calculator to carry out the remaining operation 3 × 9 = by touching keys 3, ×, 9, and =. Then the final answer 27 will be indicated in the display unit. Thus, in a conventional calculator, an operator must discretely twice operate the keyboard thereof in accordance with two numerical expressions such as 4 + 5 = and 3 × 9 =. In case of calculating a number of numerical expressions, an operator will be worried by obtaining a lot of the temporary results.

Calculating a numerical expression containing an exponential term, such as $3^2$, an operator often intends to known the partial answer, such as 9 in the aforesaid example, resultant from the exponential operation. In that case, the first touching of keys 3, $a^x$, 2, and = causes the answer 9 to be obtained in a conventional calculator, and then the remaining part of that expression being calculated by employing the intermediate result 9. Thus, a numerical expression containing many independently operable terms should be divided into portions to be partially calculated so as to obtain intermediate result.

Since such a conventional calculator is capable of displaying only the final answer from a numerical expression, it becomes more difficult to check out misoperations in keying before completing the calculation of the expression including more terms. Such a conventional calculator requires relatively more careful operation in keying, causing an operator to be exhausted.

SUMMARY OF THE INVENTION

The principal object of the present invention is to provide an improved desktop electronic calculator without the disadvantages described above, which visually indicates a temporary result obtained from a portion of a numerical expression to be calculated.

It is an object of the present invention to provide a calculator visually indicating the temporary result partially obtained from the portion of a numerical expression between a pair of parentheses as well as the final answer derived from the entire expression when the numerical expression comprising at least a pair of parentheses, data numerals and arithmetic operators is serially imput into an electronic calculator by keying in sequece from left to right reading along the numerical expression.

It is another object of the present invention to provide a calculator capable of displaying an exponential result temporarily obtained from an expression containing any exponential term once keying the exponential term in, which result may be held in the display unit thereof until the next keying.

Such an electronic calculator in accordance with the present invention will permit an operator to be relatively less exhausted.

BRIEF DESCRIPTION OF THE DRAWINGS

FIGS. 1A and 1B show the tables illustrating the difference among the key depression systems according to the present invention and of the prior art;

FIGS. 2, 2A and 2B are a block diagram of a first embodiment of the present invention;

FIGS. 4A–4K are flow charts used for the explanation of the mode of operation of the first embodiment;

FIG. 5 shows a table illustrating the priority orders of the arithmetic operations applied to the first and second embodiments of the present invention;

FIGS. 6A, 6B, 6C, 6D, 6E and 6F are tables used for the explanation of the shifts in various registers used in the second embodiment when the keys are depressed;

FIGS. 14 and 15 are tables used for the explanation of the shifts in registers used in the second embodiment when an arithmetic operation is carried out;

FIGS. 18A and 18B are timing charts used for the explanation of the arithmetic operation of $A \div B^c (D + E)$ in accordance with the third embodiment;

FIGS. 20A, 20B and 20C are tables showing the shifts in registers in the third embodiment used in conjunction with the explanation of the mode of operation of the third embodiment.

DESCRIPTION OF THE PREFERRED EMBODIMENTS

An introductory explanation to an electronic calculator will now be followed with referring to the accompanying drawings.

With the desktop calculators or the like having the numerical and functional of operator keys, the keys must be depressed according to the systems 1, 2, or 3 shown in FIGS. 1A and 1B. It is seen that the keys are not depressed in the sequence as they appear from left to right in an expression to be calculated as they are depressed, for instance, in the sequence of (+=) key = or (—=) key =. Even according to the systems 2 and 3 the arithmetic operations of an expression including parenthesis cannot be carried out in the left-to-right sequence. However, according to the system of the present invention shown in the fourth column in FIGS. 1A and 1B, one may depress the keys in the sequence as numerals, operators and other notations appearing in an expression as will be described in more detailed hereinafter with reference to the accompanying drawings.

Prior to the description of the present inventions, the operators used in this specification will be explained.

| Operators | Functions and Designations | Keys |
|---|---|---|
| + | addition, and positive sign | + |
| − | subtraction, and negative sign | − |
| * | multiplication | × |
| / | division | ÷ |
| ↑ | exponentiation Example 2↑3 = $2^3$ | $a^r$ |

Figure 2A:
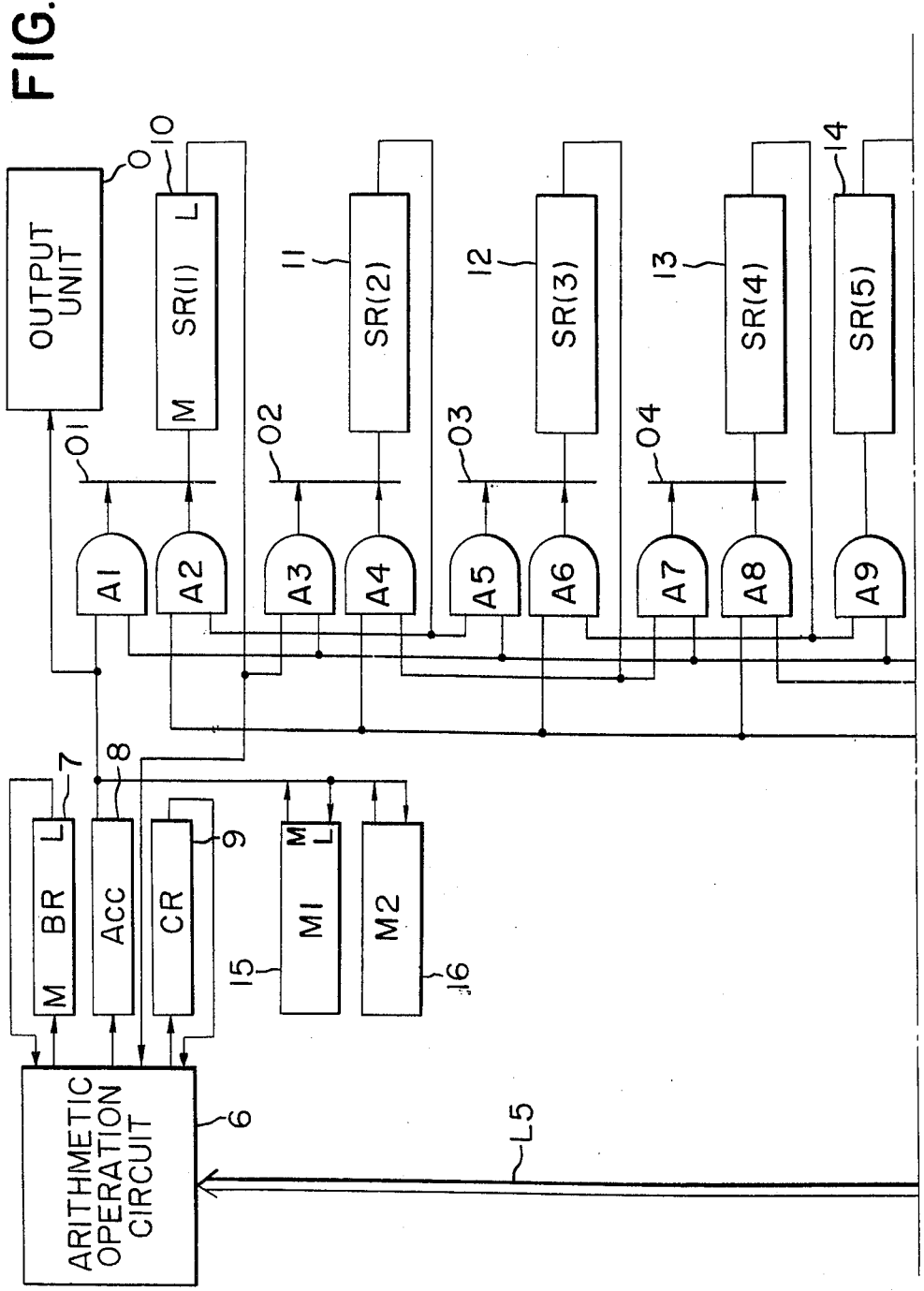
Figure 3:
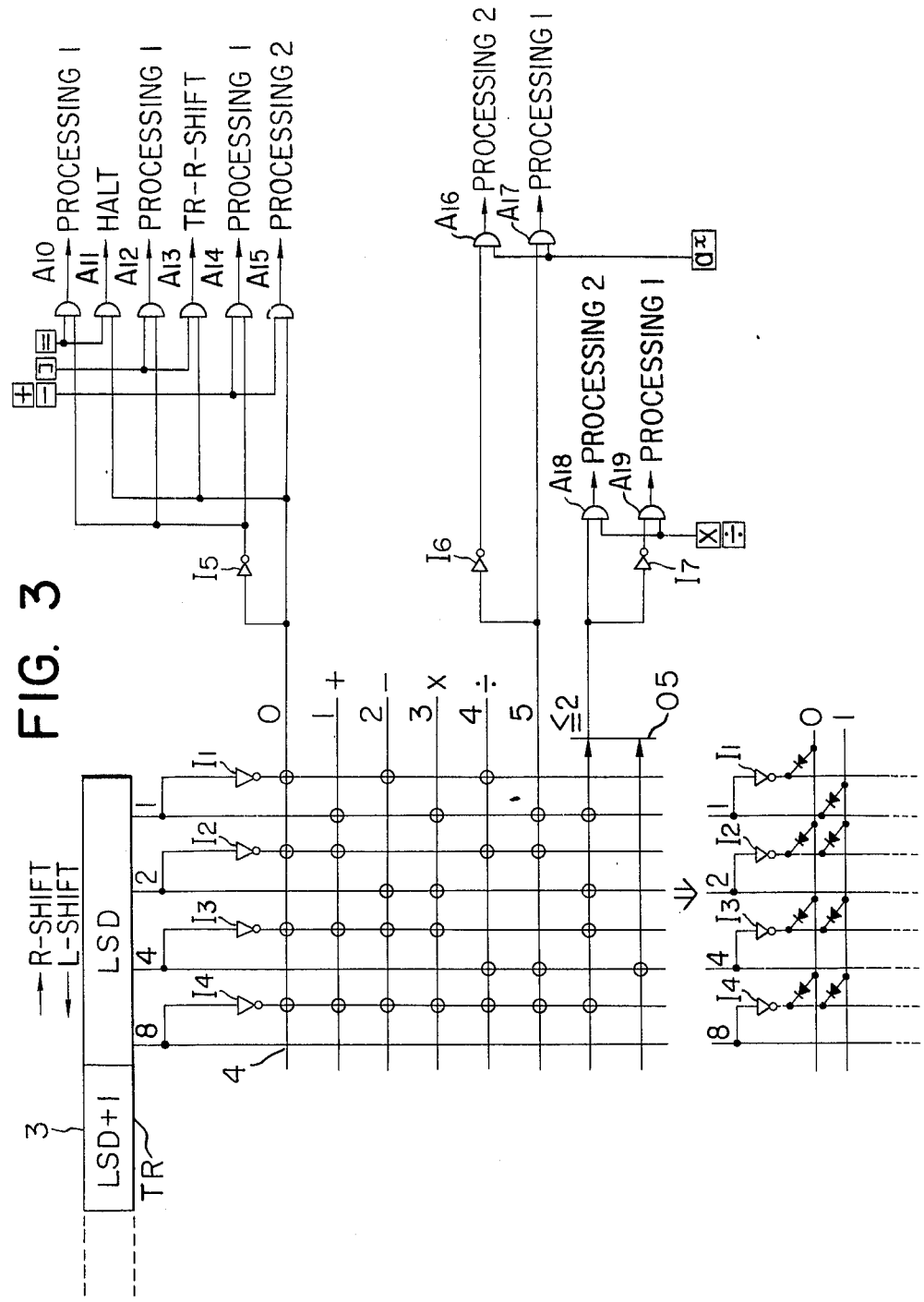
FIG. 3 is a fragmentary detailed diagram thereof.

First Embodiment, FIGS. 2 and 3

Referring to FIGS. 2 and 3 illustrating the first embodiment of the present invention, an arithmetic operation may be carried out when one depresses the numeral and functional keys on keyboard 1 in the left-to-right sequence. The keyboard 1 includes numeral data keys 0–9, a decimal point key · arithmetic operation keys ×, ÷, + and −, parenthesis keys ( and ), an equation key =, an exponentiation key $a^r$ (for instance to obtain $2^3$, the keys are depressed in the order of 2, $a^r$, 3 and =), a display register (for example, Acc) clear key C1 and a key C for clearing all the register.

An encoder 2 is of a conventional type for coding the key signals entered by the keyboard 1. When the operator keys +, −, =, ×, ÷ and $a^r$ are depressed, the key signals are coded and given the priority or order in the sequence of operations as shown in FIG. 5.

A shift register TR 3 is of the type capable of shifting the data to both left and right and storing therein the coded operators in the order the operator keys are depressed. As shown in FIG. 5, the operator $a^r$ has the first order; the operators × and ÷, the second order; the operators + and −, the third order; and the operators c, ( and =, the fourth order so that the priority is given to the operator having the higher order in arithmetic operations as will be described in detail hereinafter.

A discriminator 4 is adapted to discriminate the data stored in the LSD place or stage in the shift register TR 3 as shown in FIG. 3 so that the order of the arithmetic operations in determined and then transmitted to a control until 5 as shown in detail in FIG. 3.

The control unit 5 accomplishes various controls in response to the data and instructions entered by the keyboard 1. A control circuit 6 controls the basic arithmetic operations carried out by registers 7, 8, and 9. A group of shift registers 10–14 are adapted to temporarily store the operators and operands so that various arithmetic operations may be carried out as the keys are depressed in the left-to-right sequence. AND gates A1–A9 control the shifts of the data and AND gates A10–A19 control the discrimination of the content in the LSD. Reference numerals 01–05 denote OR gates; I1–I7, inverters; and M1 and M2, memory registers of the conventional type for solving a function and carrying out a multiplication by a constant that is, the multiplication in which various multiplicands are multiplied by a constant multiplier.

Figure 4A:
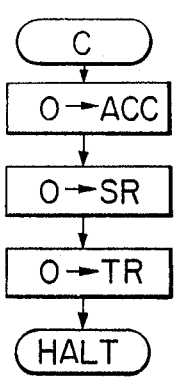

Next referring to FIGS. 2, 3, 4, 5 and 6A, the arithmetic operation of A + B × C (See the 7th row in the fourth column in FIG. 1A) will be described. First the clear key C is depressed to clear all of the registers as shown in FIG. 4A, and then the commercial value A is entered by depressing the numerical keys on the keyboard 1 so that the value is stored in the register Acc as shown in the Step A in FIG. 6A. Next the operator key + is depressed so that the control unit 5 accomplishes the operations shown in FIG. 4(b). The types of operations are different depending upon the coded signal stored in the LSD (Least Significant Digit) of the register TR. That is, if the content in the LSD is not 0, the operation 1 is executed but if the content is (0), the operation 2 is executed. Whether the operation 1 or 2 is executed is discriminated by the discriminating circuit 4. In the instant example, all of the registers have been cleared by depressing the clear key C and the content in the LSD is 0 as the coded signal of the operator key C is 0 as shown in FIG. 5, so that the operation 2 is carried out. That is, the content in the LSD of the register TR is detected by the discriminating circuit 4 comprising a diode matrix as shown in FIG. 3 so that the 0 output appears on the output line 0 of the discriminating circuit 4. As a result the AND gate A15 is opened so that the instruction to carry out the operation 2 is transferred to the control unit 5.

In the operation 2, the AND gate A1 is opened to transfer the data in the register Acc into the register SR(1) as shown in FIG. 4 (j), and the AND gate A3 is opened to transfer the content in the SR(1) into the register SR(2). In like manner, AND gates A5, A7, A9, . . . and $A_{2n+1}$ are opened so that the contents of the registers SR(2), SR(3), . . . and SR($n-1$) to the next registers SR(3), SR(4), . . . and SR($n$), respectively. The transfer of the data from one register to another is started in response to the output signal at the output terminal P.D. of the control unit 5. In this specification the operation of transferring one word as a unit from one register to another in the manner described above will be referred to as "Push Down" hereinafter.

Figure 4B:
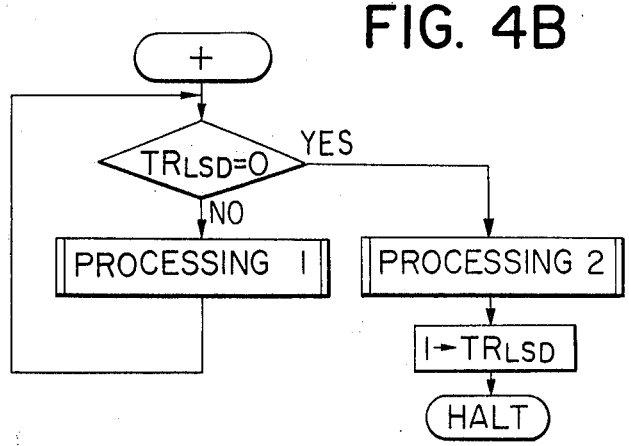
Figure 4C:
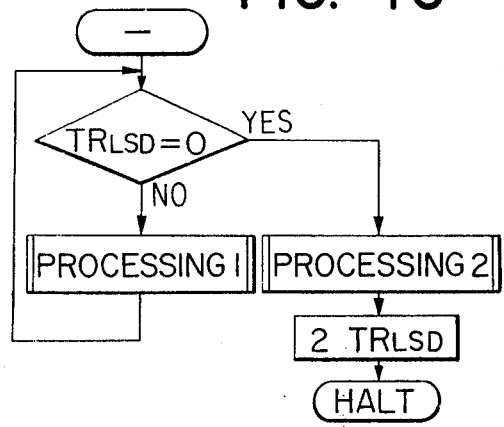

After the "Push Down", the data in the register TR are shifted by one digit to left and then returned to the position shown in FIG. 4(b). Thereafter the coded signal "1" of the operator key ± is stored in the LSD of the register TR, and then the operation is halted. Therefore as shown in the Step ± in FIG. 6A, numerical value B is entered by depressing the keys on the keyboard 1 so that it is stored in the register Acc. In this case, as shown in the Step B in FIG. 6A it is not known yet which of the operator keys +, −, ×, ÷ or $a^x$ is to be depressed so that the arithmetic operation is not carried out. That is, the addition A + B is not carried out.

Figure 4D:
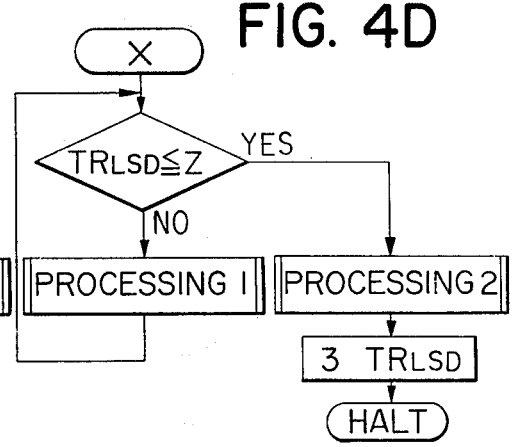
Figure 4E:
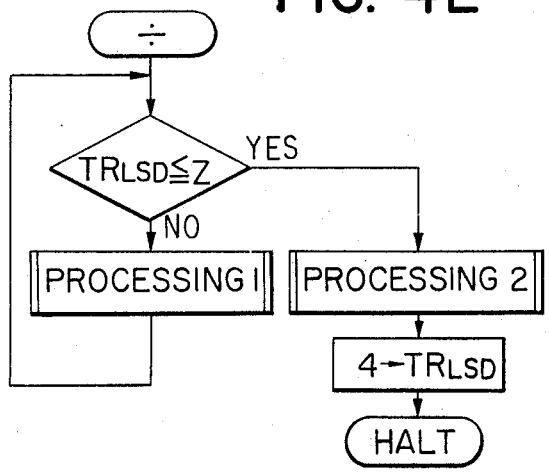

When the operator key × is depressed, the control unit 5 accomplishes the operations shown in FIG. 4(d). That is, when the content in the LSD of the register TR is greater than the coded signal "2", the operation 1 is carried out, but when the former is equal to or smaller than the latter, the operation 12 is carried out. Whether the operation 1 or 2 is carried out is determined by the discriminating circuit 4. In the instant example, the coded signal "1" is stored in the LSD of the register TR and is smaller than the coded signal "2" so that the AND gate A18 (See FIG. 3) is opened to carry out the operation 2. Therefore, as shown in FIG. 4(j), the "Push Down" of the numerical data A and B is accomplished, and the data in the register TR are shifted by one digit or position to left under the control of the control unit 5. Thereafter, the routine is returned to the flow chart shown in FIG. 4 (d) so that the coded signal "3" of the operator key × is stored in the LSD of the register TR. Thereafter the operation is stopped. In this step, as shown in Step × in FIG. 6A, the numerical value B is stored in the register Acc; the coded signal "3," in the LSD of the register TR: the coded signal "1," in the next least significant digit of the register TR: and the numerical value B, in the registers SR(1) and SR(2).

When the numerical value C is entered, the content B in the register Acc is replaced by C, but no data are shifted and no arithmetic operation is carried out.

Next when the key = is depressed, the routine shown in FIG. 4(h) is carried out in response to the control signals from the control unit 5. That is, the discrimination whether the coded signal stored in the LSD of the register TR is 0 or not is carried out as in the case of the depression of the operator key +. In the instant example, the coded signal "3" of the key × is stored in the LSD of the register TR as shown in STEP C in FIG. 6A, AND gate A10 (See FIG. 3) is opened to carry out the operation 1. In operation 1, the processes as shown in FIG. 4(k) are carried out in cooperation with the control unit 5, the arithmetic unit 6, and the group of registers. That is, the content in the LSD of the register TR is "3", so that the multiplication of the operands B and C stored in the register SR(1) and register Acc, respectively, is carried out by the arithmetic unit 6 under the control of the control unit 5. The result or product (B × C) is stored in the register Acc. The arithmetic operations such as addition, subtraction, multiplication and division may be performed by the well known means such as processor 10 and arithmetic unit 22 shown in FIG. 1A of the accompanying drawings of U.S. Pat. No. 3,302,183.

In response to the data shift instruction which appears at the output terminal P.U. of the control unit 5, AND gates A2$n$, A2$n$-1, . . . A8, A4, and A2 are opened so that the data in the registers SR($n$) are transferred into the register SR($n$−1); the data in the SR($n$−1), into the register SR($n$−2) . . . ; and the data in the register SR(2), into the register SR(1), which will be referred to as "Pop Up" in this specification. Thereafter, the data in the register TR are shifted by one digit to right so that the coded signal "3" is erased. As shown in Step C in the second column in FIG. 6A, the product B × C is stored in the register Acc; the addition code "1", in the LSD of the register TR: and the numerical value A in the register SR(2) is popped up and stored in the register SR(1). The datum 0 in the register SR(4) is stored in the register SR(3) so that the former is cleared. Since the contents in the succeeding registers are zero, they remain unchanged even when the "pop up" is carried out.

When the operation or process 1 is completed, the operation is returned again to the alternative or decision box TR$_{LSD}$ = O? in FIG. 4(h). Since the addition code "1" is stored in the LSD of the register TR, the operation 1 is carried out. In operation 1, the numerical value A stored in the register SR(1) and the product "B × C" stored in the register Acc are added in the arithmetic unit 6 under the control of the control unit 5, and the result "A + B × C" is stored in the Acc. "Pop Up" is again carried out so that the content in the register TR is shifted by one digit to right. As a result, as shown in Step = in FIG. 6A, the answer A + B × C is stored in the register Acc while the contents in other registers become zeros. The program is again returned to the flow diagram shown in FIG. 4(h) to detect the content in the LSD of the register TR. Since the addition code "1" has been shifted by one digit to right, the content in the LSD is zero so that the answer to the question TR$_{LSD}$ = O? is yes. Therefore, the operation is halted. Thus, the arithmetic operations are completed, and the answer "A + B × C" in the register Acc is displayed or read out by a printer 0.

As described above, according to the first embodiment the operators +, −, *, / and ↑ are assigned with the priority order as shown in FIG. 5 in the sequence of arithmetic operations so that the register TR into which are stored the operator codes in the order of the depression of the operator keys, shifts its content to right or left while the "Push Down" or "Pop Up" of the data stored in the group of registers SR is accomplished. Therefore the answer to a problem may be obtained only by depressing the keys on the keyboard in the sequence of the numeral values, operators and other mathematic notations as they appear in the problem from left to right.

In order to point out more clearly the features of the present invention, an example of carrying out an arithmetic operations of a problem including the parenthesis such as A × (B + C) will be described. The numeral values B and C must be aggregated by the parenthesis because the multiplication and division must be carried out prior to the addition and subtraction. According to the present invention the parenthesis keys (and) are provided and they may be also depressed in the sequence as they appear in an equation to be operated.

Referring back to FIGS. 2, 3, 4, 5 and 6B, the steps of the arithmetic operation of an equation A × (B + C) will be described in detail hereinafter. First the clear key C is depressed to clear the contents of all registers, and then the numerical data A are entered into the register Acc by depressing the keys on the keyboard 1. Next the operator key × is depressed so that the steps as shown in FIG. 4(d) are carried out. That is, when the content in the LSD of the register TR is equal to or smaller than 2, the operation 2 is to be carried out, while when the former is greater than 2, the operation 1 is to be carried out. Since the content in the LSD of the register TR is zero, AND gate A18 is opened and the routine for carrying out the operation 2 is transmitted to the control unit 5. The steps of the operation 2 are shown in FIG. 4(j). That is, the data in the register Acc are transferred into the register SR(1) as AND gate A2 is opened; the data in the register SR(1), into the register SR(2) as AND gate A3 is opened; and so on. That is, "Push Down" is carried out among the registers SR(1), SR(2), . . . and SR(n). Thereafter the data in the register TR are shifted by one digit to left; the multiplication code "3" is stored in the LSD of the register TR; and then the operation is halted.

As shown Step × in FIG. 6B, the content A in the register Acc is pushed down into the register SR(1) when the key × is depressed, and simultaneously the coded signal "3" representing the multiplication is entered into the LSD of the register TR. In this case, no data are shifted into the other registers SR(2), . . . and SR(n) so that their contents are all zeros.

Figure 4F:
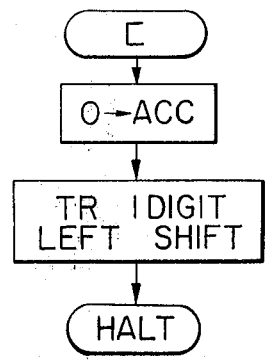
Figure 4K:
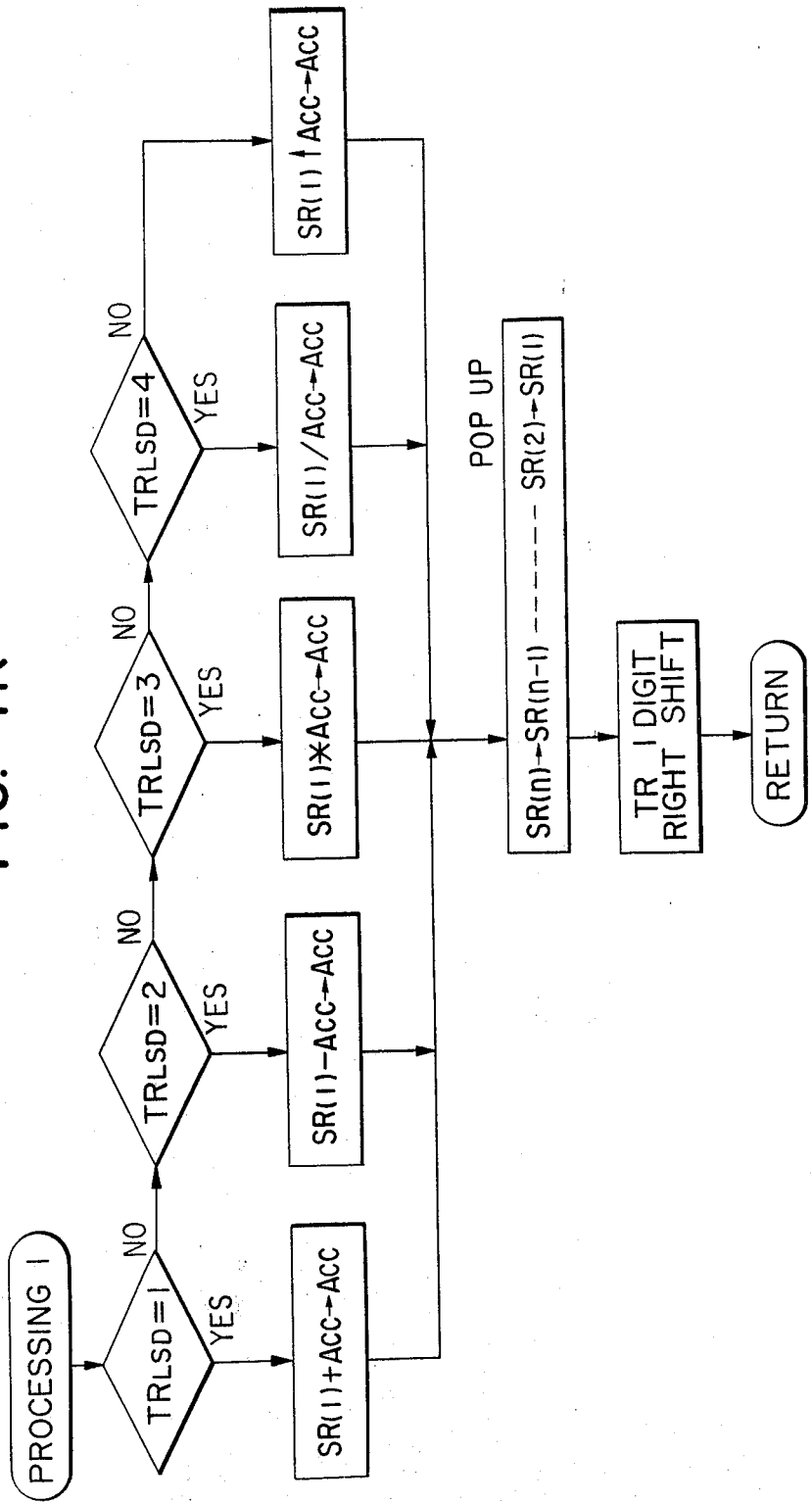

When the parenthesis key ( is depressed, the register Acc is cleared and the data in the register TR are shifted by one digit from left to right as shown in FIG. 4(f) so that the content in LSD becomes zero (0).

When the numerical valve B is entered, it is stored in the register Acc. When the operator key + is depressed, the routine shown in FIG. 4(b) is carried out. That is, when the content in the LSD of the register TR is zero, AND gate A14 (See FIG. 3) is opened so that the operation 1 is to be carried out, but when the former is 0, AND gate A15 is opened so that operation 2 is to be carried out. In other words, the content in the LSD of the register is the coded signal of the operator key depressed immediately before and is compared with the newly entered code so that the priority in operation is given to either of them. The operation is carried out according to the priority order. In other words the important feature of the present invention resides in the fact that the multiplication and division of the numerical data or values on both sides of the operators X and ÷ are carried out only when one of the operator keys X, ÷ or $a^r$ which generates the code 3, 4 or 5 upon depression is depressed, but the addition or subtraction of the numerical values on both sides of the operator + or − is carried out only when the operator key + or − is further depressed. That is, as is clear from the discriminating circuit 4 shown in FIG. 3, the flow diagram shown in FIG. 4 and the priority table shown in FIG. 5, the operation for raising the power is carried out when one of the operator keys except the parenthesis key ( is depressed, but the multiplication and division are carried out only when one of the operator keys except the parenthesis key ( and the power key $a^r$ is depressed. The addition and subtraction are carried out only when one of the operator keys except the operator keys (, $a^r$, and ÷ is depressed. This means that the electronic computer in accordance with the present invention has the decision-making ability to decide which arithmetic operation should be carried out first. As one enters the numerical values, operators and other mathematic notations in the sequence as they appear in an equation to be solved, the steps of the arithmetic operations are automatically sequenced and started while the operands and operators to be used later are stored.

When the operator key + is depressed, the key which has been depressed immediately before the operator key + is the parenthesis key ( so that 0 is stored in the LSD of the register TR. As a result, AND gate A15 is opened so that the numerical value B is pushed down in the group of registers SR in order to execute the operation 2 shown in FIG. 4(j). Therefore the value B is stored in the register SR(1) while the value A, in the register SR(2). Thereafter, the data in the register TR are shifted by one digit to left so that the code "1" of the operator key + shown in FIG. 5 is stored in the LSD of the register TR. Thus, the routine shown in FIG. 4(b) is completed.

When the numerical value C is entered, the numerical value B in the register Acc is replaced by the value C. Thus as shown in Step C in FIG. 6B, the numerical values A, B and C are stored in the registers SR(2), SR(1) and Acc, respectively.

Next the process when the key ) is depressed will be described hereinafter with reference to the flow diagram shown in FIG. 4(g). The content in the LSD of the register TR is detected as 1 so that the AND gate A12 (See FIG. 3) is opened to apply the instruction signal to the control unit for performing the routine 1 shown in FIG. 4(k). In this case, the more detailed analyses of the content in the LSD in the register TR is carried out as described hereinbefore. Since the content in the LSD of the register TR is 1, the addition instruction is generated so that the data B in the register SR(1) is added to the value C in the register Acc and the sum (B + C) is stored in the register Acc. Next in response to the data shift instruction which appears on the output terminal P. U. of the control unit 5, AND gates A2n, A2n−1, . . . A8, A4 and A2 are opened so that "Pop Up" is started among the group of registers SR. Thereafter the data in the register TR are all shifted by one digit to right so that the routine returns back to the alternative box again. This time, the sum of B and C is stored in the register Acc; data A, in the register SR(1); and 0, in the LSD of the register TR. Since the content in the LSD of the register TR is 0, all data in the register TR are shifted by one digit to left again. Therefore the computer is now ready. That is, the contents as shown in Step ) in FIG. 6B are stored in the registers.

Thereafter the key = is depressed so that the content in the LSD of the register TR is detected. In the instant example, the content is 3 so that AND gate A10 (See FIG. 3) is opened to apply the instruction signal to the control unit 5 for performing the operation 1 shown in FIG. 4(k). Since the answer to the question $TR_{LSD} = 3$? is "yes," the multiplication instruction is generated so that the data A in the SR register (1) is multiplied with the sum of B and C stored in the register Acc and the product is stored in the register Acc. Thereafter the group of registers SR is "popped up," and all the data in the register TR are shifted by one digit to left. Therefore, the routine is returned again to the alternative or decision box $TR_{LSD} = 3$?. The contents in the registers SR(1) through SR(n) are all zeros; the content in the register TR is also zero; and the content in the register Acc is the answer to the problem A × (B + C). Since the content in the LSD of the register TR is 0, the operation is completed.

FIGS. 6C, 6D, 6E and 6F show the examples of the arithmetic operations carried out by the first embodiment shown in FIGS. 2 and 3 according to the flow charts shown in FIG. 4. FIG. 6C shows an example in which the arithmetic operations are carried out in the sequence of the numerical values as they are entered because both operator codes are "3s" representing the depression of the operator keys + and −.

Second Embodiment, FIGS. 7-14

Figure 13A:
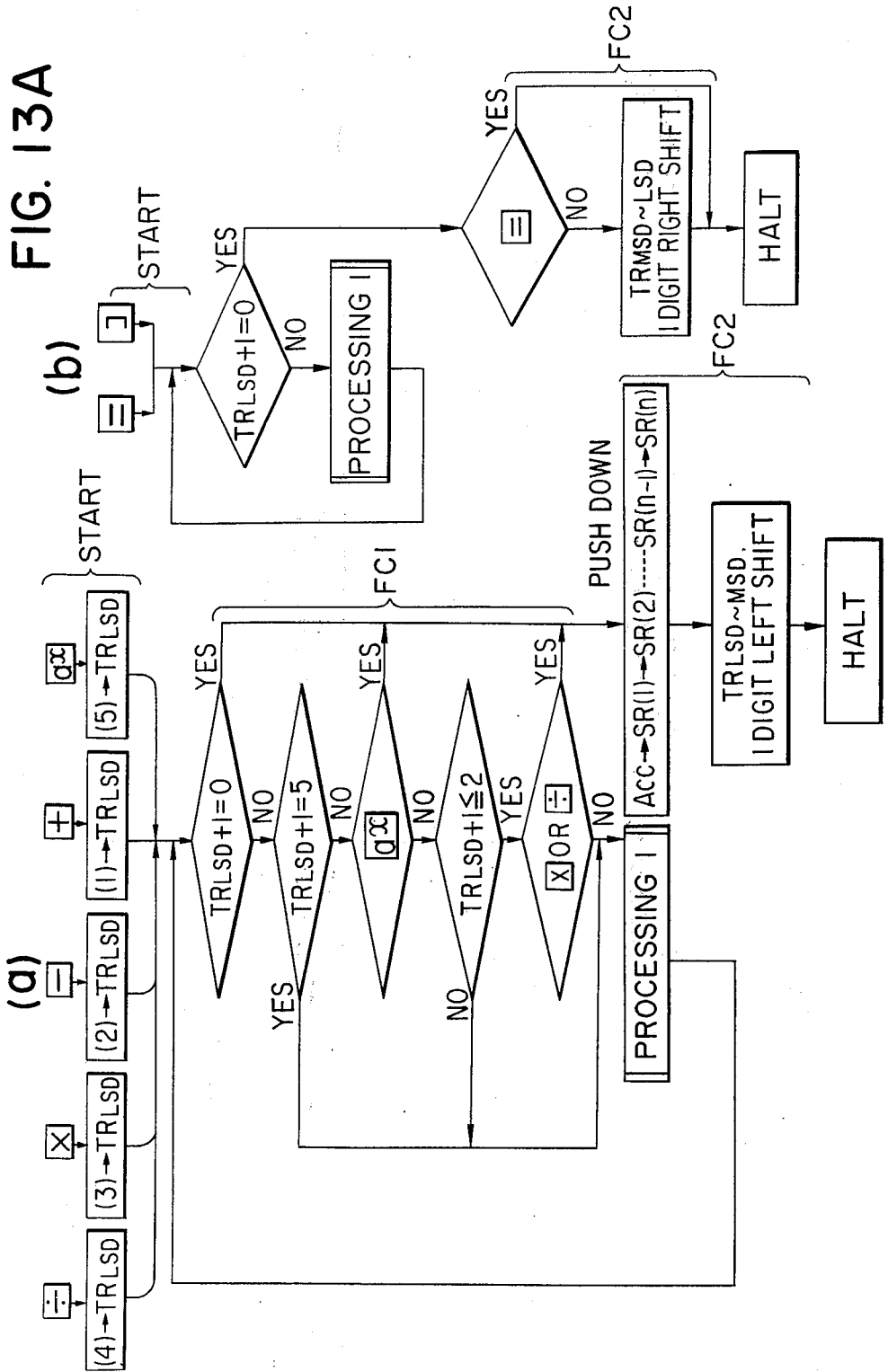
FIG. 13A is a timing chart used for the explanation of the mode of operation of the second embodiment.

The second embodiment of the present invention is different from the first embodiment in that the data stored in the next least significant digit location in the register TR are compared with the operator code stored in the LSD and a new instruction is stored in the LSD in the register TR. As shown in FIG. 13A, the second embodiment has an advantage over the first embodiment in that the control may become simple.

Figure 7A:
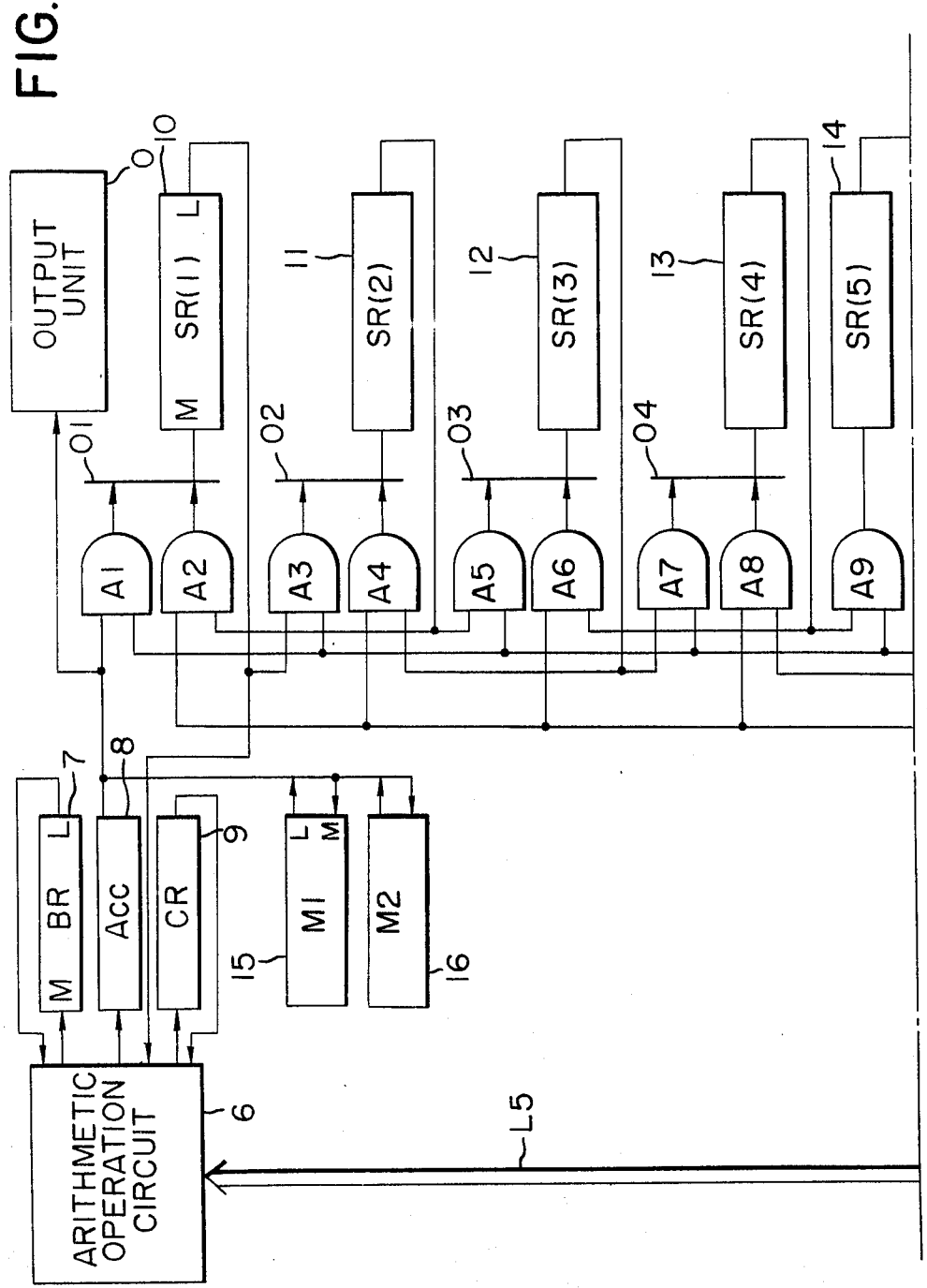
FIG. 7 is a block diagram of the second embodiment of the present invention.
Figure 8A:
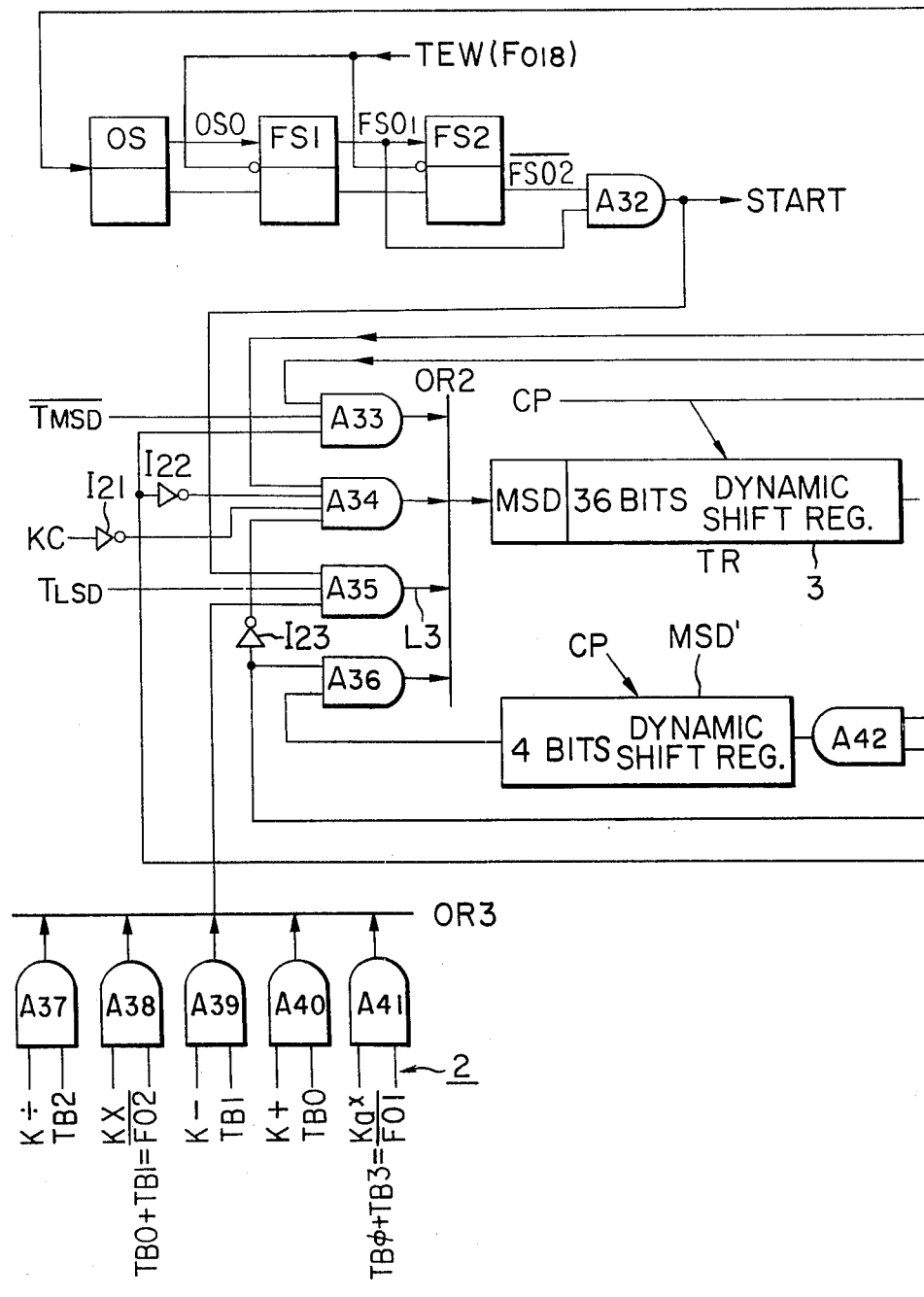
FIGS. 8A and 8B are detailed block diagrams thereof.
Figure 8B:
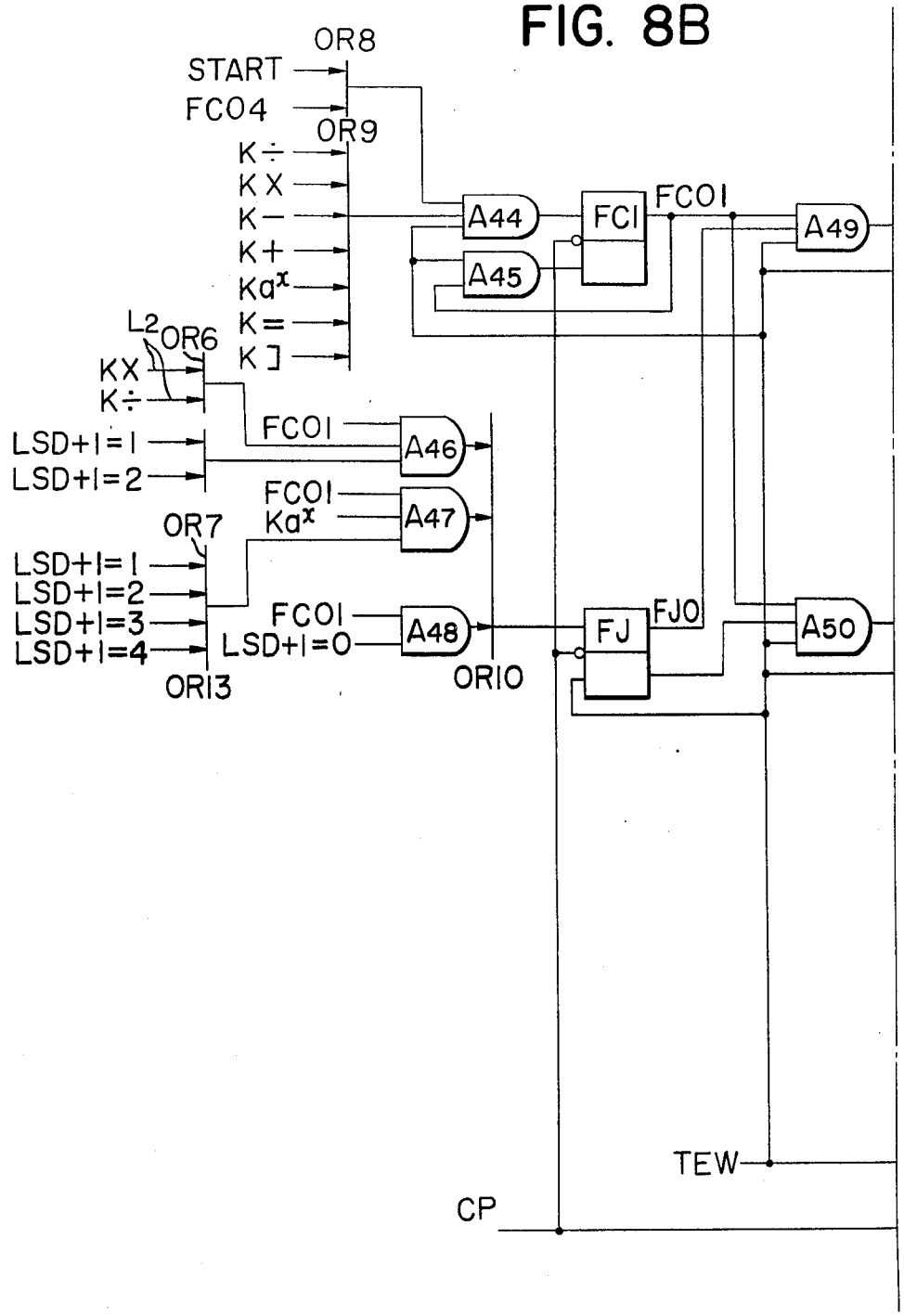
Figure 8B:
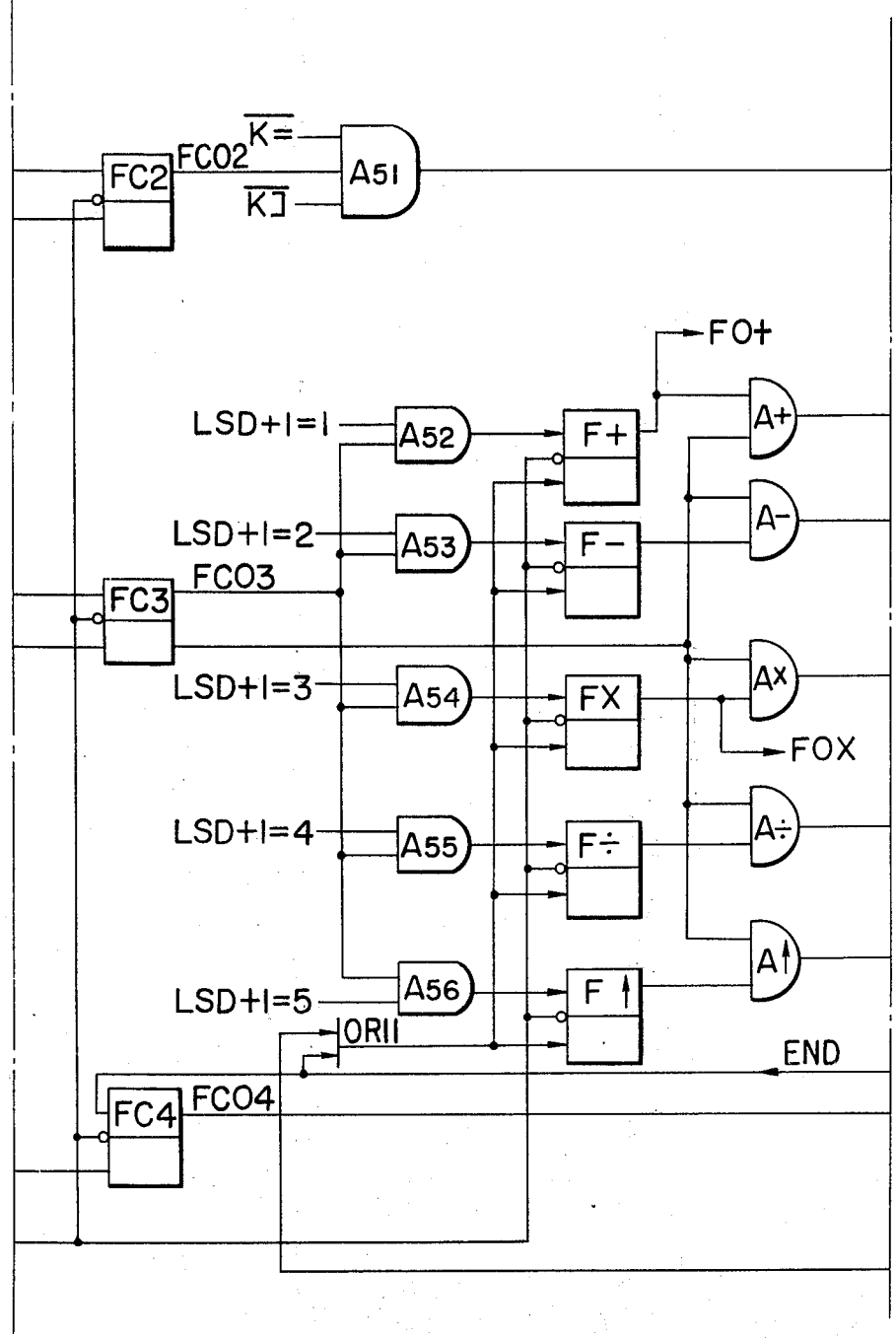
Figure 9A:
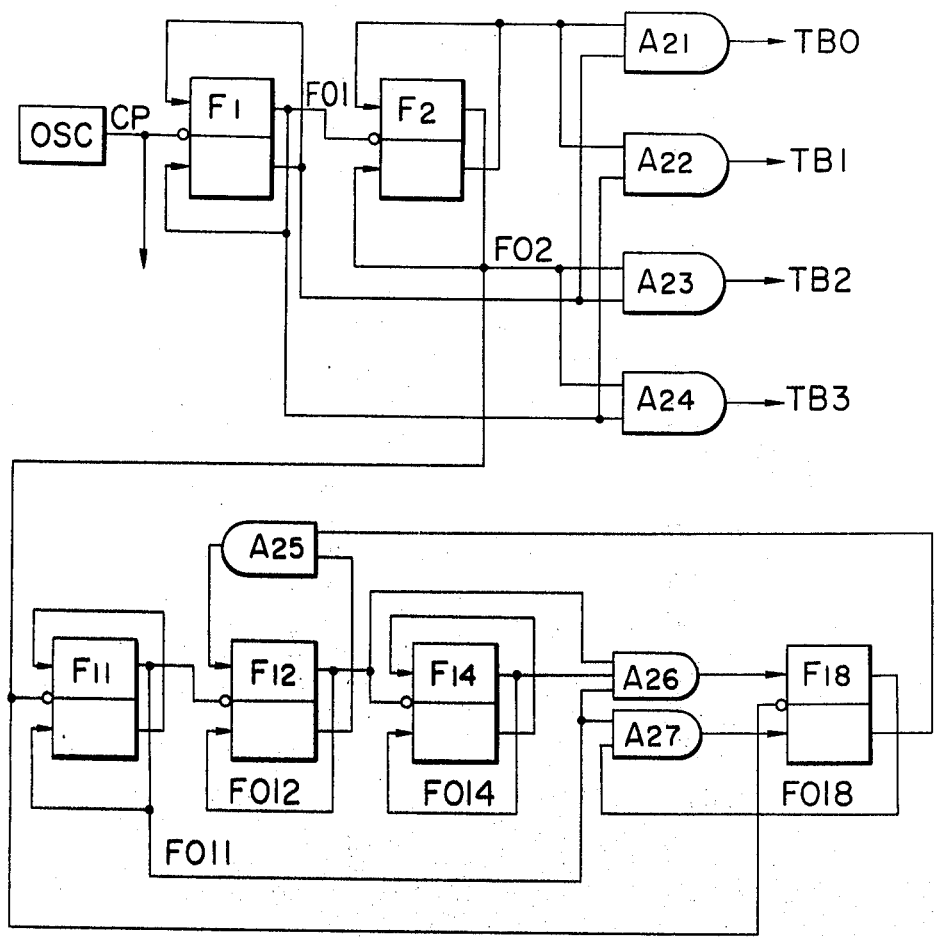
FIGS. 9A and 9B are detailed views of a fundamental control signal generating circuit thereof.
Figure 9B:
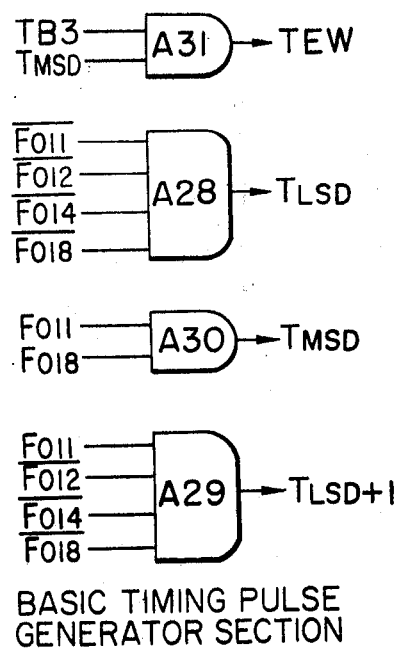
Figure 10:
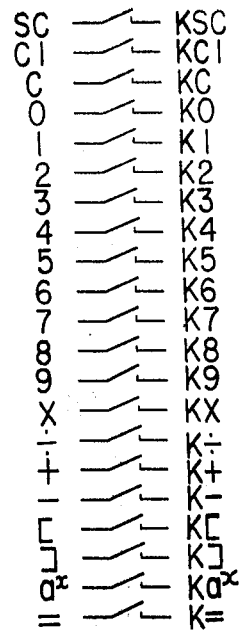
FIG. 10 is a schematic view of a keyboard generating various key signals.

FIGS. 8, 9 and 10 are detailed circuit diagrams of the second embodiment shown in FIG. 7; FIG. 11 shows the waveforms of the fundamental timing pulses used for the explanation of the mode of operation thereof; and FIG. 12 is a timing chart used for the explanation of the mode of carrying out the arithmetic operation on a problem A × (B + C). The contents in the registers in each step are shown in FIG. 14. The construction and mode of operation of the second embodiment shown in FIG. 7 will be described in detail with reference to FIGS. 7, 8, 9, 10, 11, 12, 13 and 14.

Figure 11A:
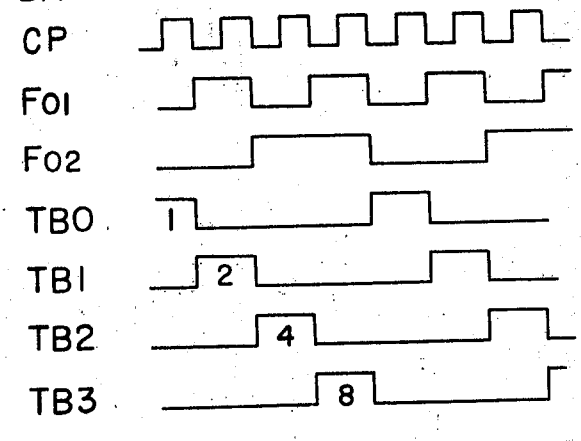
FIGS. 11A and 11B show the control signals generated by the fundamental control signal generating circuit shown in FIGS. 9A and 9B.
Figure 11B:
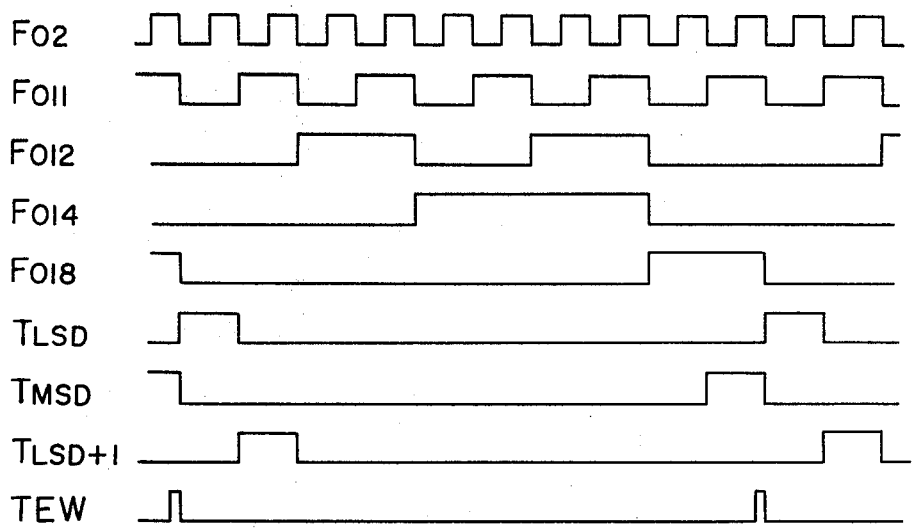

FIG. 9 shows a circuit diagram of a pulse generator for generating various timing pulses shown in FIGS. 11A and 11B. The clock pulses CP generated by an oscillator OSC are applied to a first and second flip-flops F1 and F2 so that the signals F01 and F02 may be derived. The signals TB0, TB1, TB2 and TB3 which have the weights 1, 2, 4 and 8, respectively, are derived from AND gates A21, A22, A23 and A24, respectively. In the second embodiment, each word consists of ten digits. In response to the signal F02, set output signals F011, F012, F014, and F018 are derived from flip-flops F11, F12, F14, and F18, respectively, as shown in FIG. 11B. From AND gates A28, A29, A30 and A31 shown in FIG. 9 are derived the least significant digit signal $T_{LSD}$, the next least significant digit signal $T_{LSD+1}$, the most significant digit signal $T_{MSD}$, and the one-word-termination signal TEW.

FIG. 10 shows various key signals such as KC, K0–K9, KX, K÷, K+, K−, K(,K), $Ka^{-x}$ and so on derived when the keys on the keyboard 1 are depressed.

Figure 11C:
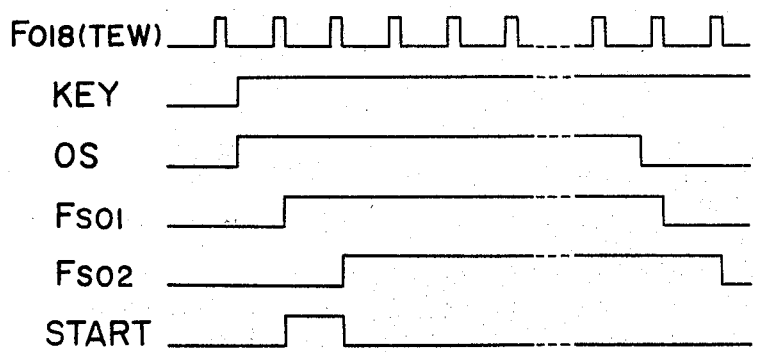
FIG. 11C shows the waveforms used for the explanation of the generation of the key start signal.

The start signal START shown in FIG. 11C is generated by a circuit consisting of an OR gate OR1, one-shot multivibrator OS, flip-flops FS1 and FS2, and an AND gate A32. Based upon the conventional techniques, the operation instruction key signals (for instance, K+, K(, and so on) transmitted asynchronously from the OR gate OR1 are synchronized with the synchronizing signal FO18 or signal TEW to generate the start signal START as shown in FIG. 11C. For instance when the key signal KX is transmitted through the OR gate OR1, the one-shot multivibrator OS is actuated for a predetermined time as shown in FIG. 11C so that the flip-flop FS1 in the next stage is set in synchronism with the fall of the signal FO18 which is the first signal generated immediately after the one-shot vibrator OS has been actuated. As a result, as shown in FIG. 11C the start signal START, which rises to a high level for a one word time interval, is derived from the AND gate A32, and in response to this start signal START, various circuits are actuated.

The register TR shown in FIG. 8A has ten digit places and normally circulates its content through an AND gate A34 by shifting the content to right. An one-digit register MSD' is used to shift by one digit to left. That is, when the AND gates A36 and A42 are opened to shift the content in the register TR through the register MSD', the content in the register TR may be shifted by one digit to left. The content in the register TR is shifted by one digit to right through an AND atc A33 which is interposed in the circulation loop between the next LSD and MSD places in order to hold the one digit content shifted from the next LSD place to the LSD place for one circulation period, that is one word time. An AND gate A35 serves to transmit the operator key signal (for instance, KX, K+, and so on) into the MSD place in the register TR at a timing $T_{LSD}$. AND gates A37–A41 make up an encoder 2 for generating the code signals shown in FIG. 5. The discriminating circuit 4 comprises a diode matrix circuit shown and detects the contents stored in the LSD place and the next LSD place in the register TR at $T_{LSD+1}$ and TBO, respectively. The coded signals 0–5 stored are detected in response to the output signals on the output lines.

Figure 13B:
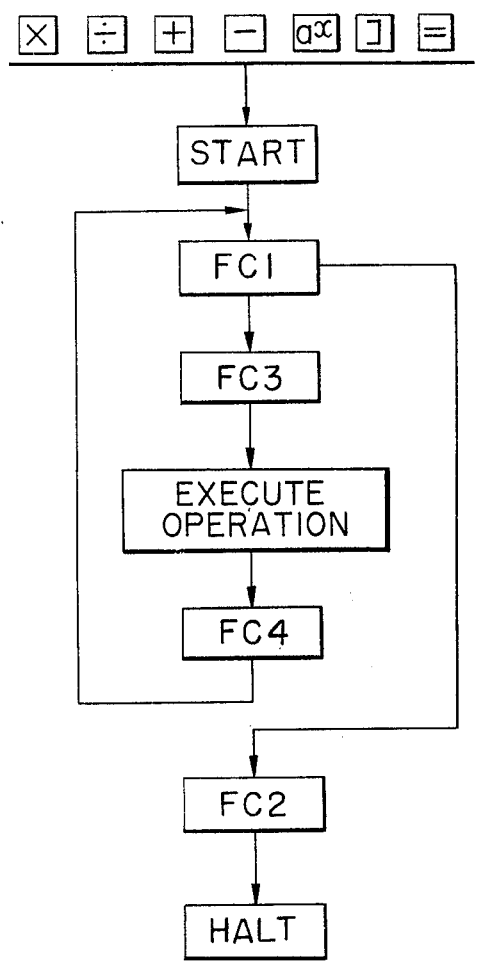
FIGS. 13B and 13C are flow charts of the second embodiment used for the timing and sequence when flip-flops FC1–FC4 are set.
Figure 13C:
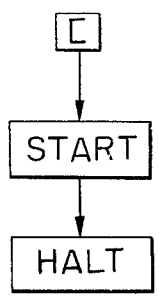

Flip-flops FJ, FC1–FC4, F+, F−, FX, F÷ and F↑ are set and reset in response to various conditions. As shown in FIGS. 13A and 13B, the flip-flop FC1 is set for one word time immediately after the key start signal START so that the content in the next LSD place in the register TR may be detected for this one word time. The flip-flop FC2 is set for one word time when the register TR shifts its content by one digit to right or left or when "Push Down" is carried out. The flip-flop FC3 is set for one word time when the content in the next LSD place in the register TR is discriminated. The flip-flop FC4 is set for one word time when the register TR is popped up or shifts its content by one digit to right. The flip-flop FJ decides whether the flip-flop FC2 or FC3 is set. The flip-flops F+, F−, Fx, F÷ and F↑ are set when the addition, subtraction, multiplication, division and raising to powers are carried out.

Next the mode of operation will be described with reference to FIGS. 8–14. For instance, the operation of A × (B + C) will be described in detail. When the clear key C is depressed as shown in FIG. 14, the AND gates AC1, AC2, and so on associated with the data registers SR(1), SR(2), and so on which make up a data stack shown in FIG. 8 are closed so that the circulation loop is interrupted. Therefore, the registers SR(1), SR(2), and so on are all cleared. The clear signal KC is applied through the OR gate OR 12 to the arithmetic unit 6 so that the register ACC is also cleared. Datum A is stored into the register Acc in the manner well known in the art.

Figure 12A:
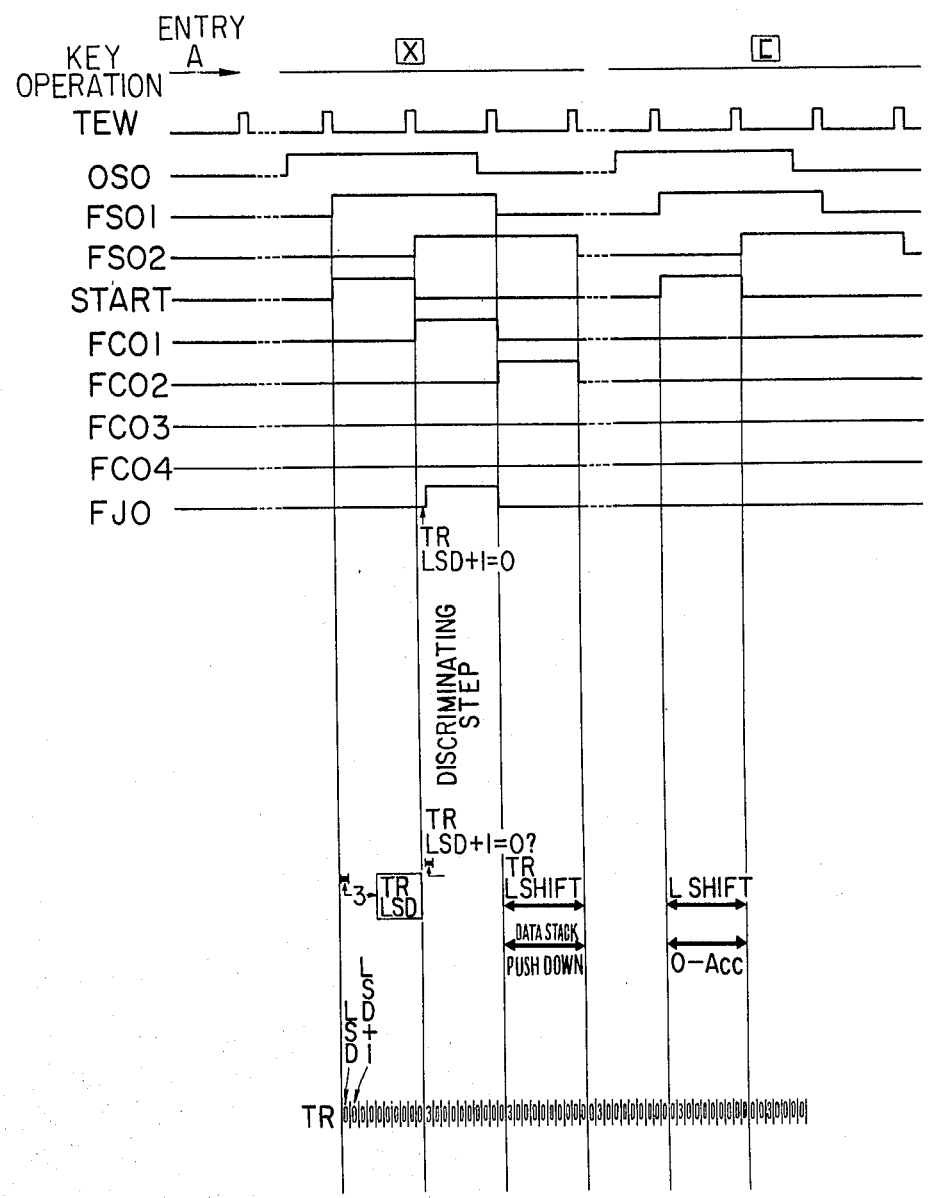
FIGS. 12A–12D show the signals generated at various points in the circuit shown in FIGS. 8–10 when the arithmetic operation of A × (B + C) is carried out.

When the key X is depressed, the key signal is transmitted though the OR gate OR1 to the one-shot multivibrator OS so that the latter is actuated. The flip-flops FS1 and FS2 are set so that the start signal START may be derived from the AND gate A32. The start signal is applied for one word time to the AND gate A35. Since the fundamental timing pulse TB) or TB1 is applied to the gate A38, it generates the multiplication code signal 1 + 2 = 3 according to the rules shown in FIG. 5 in response to the key signal KX. The multiplication code signal is transmitted through the OR gate 3 to the AND gate 35 so that the latter is opened at the time $T_{LSD}$ to transfer the multiplication code signal "3" through the OR gate OR 2 and the MSD in the register TR into the LSD place. The multiplication code signal is dynamically circulated through the AND gate A34 in synchronism with the clock pulses CP and is held. At the time LSD+1 during the time interval when the start signal is at a high level as shown in FIG. 12A, the code signal of the key X is stored in the MSD place in the register TR and then in the LSD place when the start signal which continues for one word terminates. During the start signal is at a high level, the OR gates OR8 and OR9 (See FIG. 8B) are opened and the signal TEW is generated so that the AND gate A44 is opened. As a result, the flip-flop FC1 is set so that the set output signal FCO1 is generated. As shown in FIG. 12A, the flip-flop FC1 is set immediately after the start signal, which continues for one word time, terminates, and the AND gate A45 is opened in response to the next signal TEW to reset the flip-flop FC1. Therefore the set time of the flip-flop FC1 is also equal to one word time. As shown in FIG. 13A (a), this time interval is used for various discrimination. First the discrimination whether the content in the next LSD place in the register TR is zero or not is carried out. Except the code signal 3 is stored in the LSD place by the depression of the key X, the contents in the digit places LSD+1, LSD+2, . . . and MSD are all zeros. The register TR is a dynamic register as shown in FIG. 8A and circulates its content so that when the content 0 in the next LSD place is shifted into the LSD place, it is detected at the timing $T_{LSD + 1}$ of the diode matrix 4. Therefore, the signal appears on the output line LSD + 1 = 0 so that the content is detected as being 0. In response to this signal, the AND gate A48 (See FIG. 8B) is opened as the signal FCO1 is also applied thereto so that the flip-flop FJ is set. The flip-flop FJ remains set until the signal TEW is applied to its reset input terminal. In response to the set signal FJO and the signal TEW the AND gate A49 is opened so that the flip-flop FC02 is set. (Various signals generated during this step are illustrated in FIG. 12A). The flip-flop FC2 is also set for one word time. Since the key signals such as K= and K) are not entered during this time interval, and AND gate A51 is opened. The output signal of the AND gate A51 is a signal for starting "Push Down" in the group of registers SR. Therefore the AND gates A1, A3, and so on are opened so that "Push Down" of the registers Acc, SR(1), SR(2), and so on is started. Simultaneously, the output signal P. D. of the AND gate A51 is transmitted through the OR gate OR4 (See FIG. 8A) to the AND gates A36 and A42 so that the latter are opened while the AND gate A34 is closed as the signal is transmitted through an inverter I23. The content in the register TR is circulated to right through the register MSD'. Since the push-down signal P. D. is the set output signal FCO2 of the flip-flop FC2, it is at a high level for one word time. During this time, the content 10 digits in the register TR plus the content one digit in the register MSD' are circulated so that the content in the register TR is shifted by one digit to left when one word time is terminated. The above step is shown in the row "immediately after the occurrence of FC02" in the step X in FIG. 14. The numerical value A is stored in the register Acc, and the multiplication code signal "3" is stored in the next LSD place in the register TR as the latter has shifted its contents by one digit to left.

Next the parenthesis key ( is depressed so that as shown in FIG. 13A at (c), the content in the register Acc is all cleared while only the content in the LSD place in the register TR is cleared. Simultaneously the content in the register TR is shifted by one digit to left. When the parenthesis key ( is depressed, the start signal is generates as with the case when the key X is depressed. The AND gate A47 (See FIG. 8A) is opened, and the output signal of the AND gate A47 is transmitted through the OR gate OR4 so that the content in the register TR is shifted by one digit place to left as in the case of the application of the Push Down signal P. D.

Therefore, as shown in Step ( in FIG. 14 the multiplication code signal "3" is shifted into the third digit place LSD + 2 from the LSD place in the register TR. The content in the LSD place in the register TR becomes automatically 0 as the content in the register TR is shifted by one digit place to left and the output signal is derived from the AND gate A35. To clear the register Acc, the ouput signal from the AND gate A47 is used. The output signal is transmitted through the OR gate OR12 (See FIG. 8B) to the arithmetic unit 6 so that the content in the register Acc is all cleared. This can be done by using the same method for clearing the registers SR(2) and so on. During this time period, the flip-flops FC1 and FC2 are not set as clear from FIG. 8B and FIG. 13. Except the function of storing the numerical value B into the register Acc, other circuits accomplish no function at all.

Next the key + is depressed so that as shown in FIG. 13A the steps which were accomplished when the key X was depressed for pushing down the group of registers SR and causing the register TR to make a shift to left by one digit place are repeated as the content in the next LSD+1 in the register TR was changed to 0 upon depression of the parenthesis key (. Since these steps are accomplished in the manner described hereinbefore with the conjunction of the depression of the key X, the detailed explanation will not be made. However, it should be noted that, when the addition key + is depressed, the code "1" is stored in the LSD place in the register TR according to the rules shown in FIG. 5, while the multiplication code signal "3" is stored when the key X is depressed. Next the numerical value is entered and stored in the register Acc, replacing the numerical value B.

When the parenthesis key ) is depressed, the start signal is generated in a manner substantially similar to that described hereinbefore so that the flip-flop FC1 (See FIG. 8B) is set. As shown in Step C in FIG. 14, the addition code "1" is stored in the next LSD place in the register TR so that the flip-flop FJ is not set. Consequently, the flipflop FC2 is not set. However, in response to the reset output signal of the flip-flop FJ and the set output signal from the flip-flop FC1, the AND gate A50 is opened at time TEW so that the flip-flop FC3 is set. The set output signal FCO3 of the flip-flop FC3 is held for one word time so that the content in the next LSD shown at (d) in FIG. 13A is detected. The waveforms of various control pulses during this time interval are illustrated in detail in FIG. 12C. As shown in FIG. 14, Step C, the content in the next LSD in the register TR is the addition code "1" so that the signal appears on the output line LSD+1 in the discriminating circuit shown in FIG. 8A. In response to this signal, the AND gate A52 (See FIG. 8B) is opened so that the flip-flop F+ is set. In response to the set output signal FO+ of the flip-flop F+ and the reset output signal derived from the flip-flop FC3 after it has been set for one word time, the AND gate A+ is opened so that the addition of the numerical value C and the numerical value B stored in the register SR(2) is carried out by adder in the arithmetic unit 6 in the manner well known in the art, and the sum B + C is stored in the register Acc. After this arithmetic operation has been performed, the arithmetic unit 6 generates the operation-end signal END at a timing shown in FIG. 12C so that the flip-flop F+ is reset while the flip-flop FC4 is set. The operation-end signal may be derived by any of the conventional signal generating circuits. The flip-flop FC4 is also set for one word time, and the set output signal FCO4 is used as the "Pop Up" signal P. U. for starting the "Pop Up" in the group of registers SR. The Pop Up signal P. U. is applied to the AND gates A2, A4, and so on shown in FIG. 8B, so that "Pop Up" is performed in the manner described hereinabove.

As shown in the row "immediately after the occurrence of set output signal FCO4 in Step )" in FIG. 14,"the sum of the sum of the numerical values B and C is stored in the register Acc; and the numerical value A is stored in the register SR(1) as the content in the register SR(2) has been shifted in the above "Pop Up." The set output signal to the AND gate 52 to which is applied the inverted $T_{LSD}$ signal and then to the AND gate A33 through an OR gate OR5 shown in FIG. 8A. The output from the next LSD place in the register TR is applied to the AND gate A33 as the other input, and the AND gate A34 is closed as the signal is inverted by the inverter 122 so that the contents in the digit places from LSD+1 to MSD in the register TR are shifted to right to be circulated. In this step, as shown in FIG. 14, Step ), the upper row, the code signal O is stored in the next LSD place in the register TR because its contents have been shifted by one digit place to right as described above.

Figure 12B:
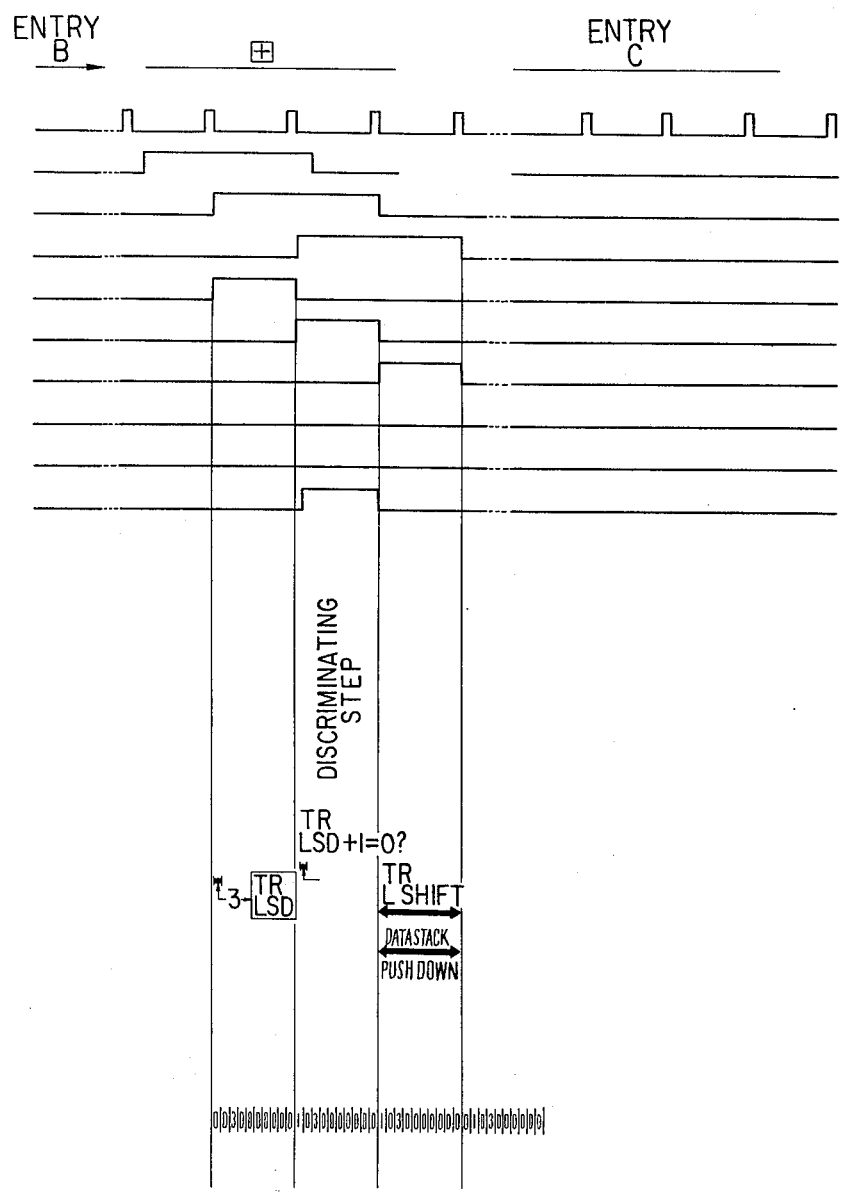
Figure 12C:
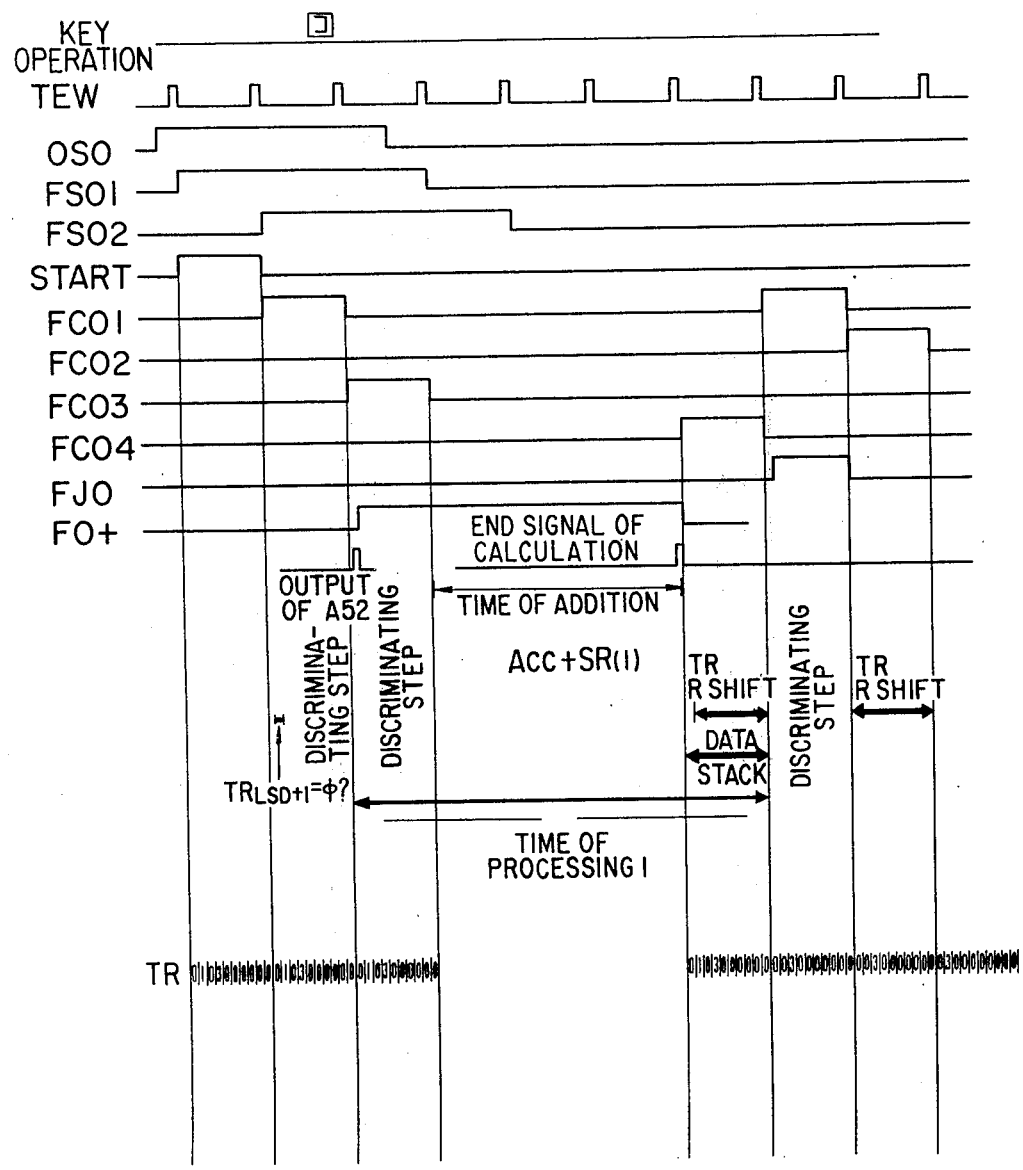

The set output signal FCO4 of the flip-flop FC4 is also applied to an OR gate OR8 (See FIG. 8B) so that the AND gate A44 is opened to set the flip-flop FC1. Since the content in the next LSD place in the register TR is 0 as the content has been shifted by one digit place to right, the AND gate A48 is opened to set the flip-flop FJ. As a result, as shown in FIG. 12C, the flip-flop FC2 is also set at the termination of the signal FCO1. Since the key ) is depressed, the output of the AND gate A51 is inhibited so that "Push Down" signal is not generated. The set output signal FCO2 of the flip-flop FC2 is applied to the AND gate A43 (See FIG. 8A), the key signal K) is applied through the gate 43 to the OR gate OR5 so that the content in the register TR is shifted by one digit place to right in a manner substantially similar to that described when the set output signal FCO4 of the flip-flop FC4 is applied to the OR gate OR5, within a time interval shown in FIG. 12C. This step is illustrated in FIG. 14, Step ), the lower row. The code signal "O" is stored in the LSD place in the register TR while the multiplication code signal "3," in the nest LSD place.

Figure 12D:
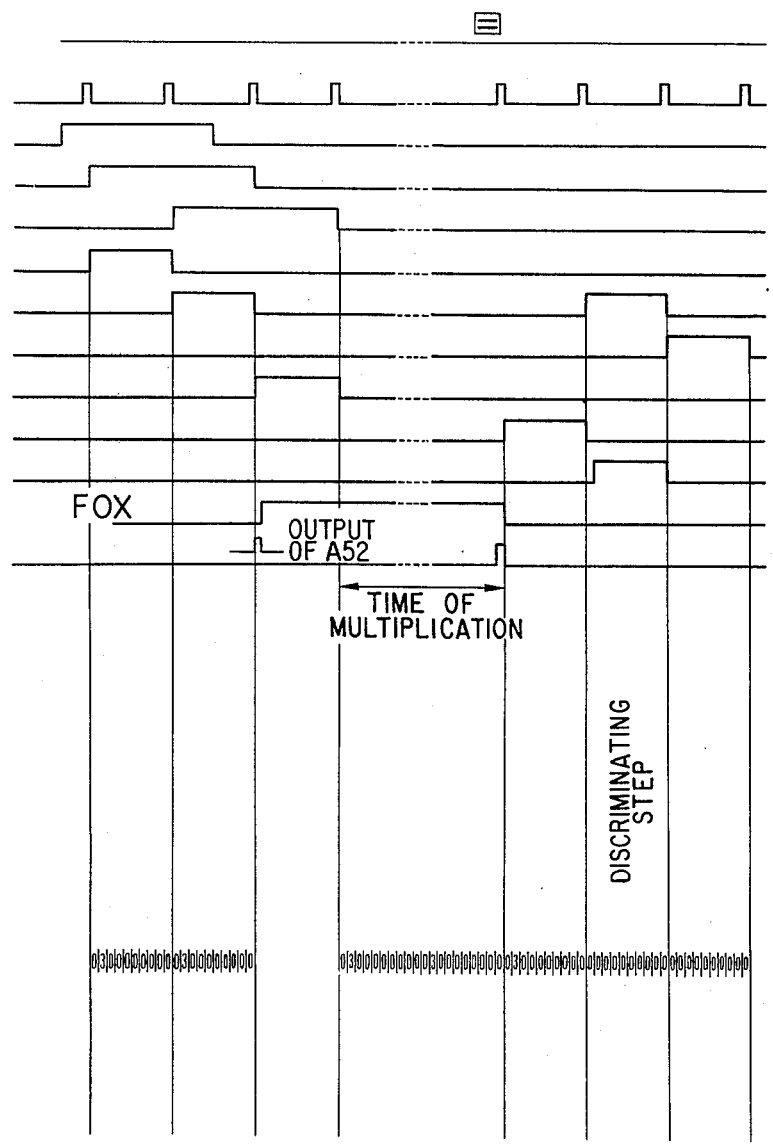

When the key = is depressed, the same steps with those when the key ) was depressed are accomplished as shown in FIG. 13A at (b) until the flip-flop FC3 is set as shown in FIG. 12D. This time, the multiplication flip-flop FX is set and the multiplication of the numerical value A stored in the register SR(1) and the sum B + X stored in the register Acc is performed, and the product A × (B + C) is stored in the register Acc as shown in Step = in FIG. 14. Other registers are all cleared. Thus the arithmetic operation of the problem A × (B + C) = is completed.

Third Embodiment, FIGS. 16 – 20

Next referring to FIGS. 16–20, the third embodiment which is different from the first and second embodiments of the present invention described hereinbefore will be described in detail hereinafter. Prior to the description of the third embodiment, the terms used in this specification will be explained.

1. Primary: a constant, a variable or an arithmetic expression aggregated or grouped by parenthesis so as to be treated as a single quantity.
   Examples: 3.14, RM, (5 + 2.5) RM refers to "datum" read out from a memory and is treated as a variable.
2. Factor: a primary or factor ↑ primary
   Examples: 4.56, 4.56 ↑ 3, RM2 ↑ RM1
3. Terms: a factor or term / factor, or factor or term * factor
   Examples: 2/3, RM1 * 3, 5 * 4.5/RM2
4. Arithmetic Expression: a term ± term or arithmetic expression ± term
   Examples: −1.23, 5 + 3 − 4 *(RM1 − 2), 2↑3 + RM2/3

The primary, factor, term and arithmetic expression are given the priority in the order named in arithmetic operation. When two primaries, factors, terms or arithmetic expressions having the same priority appear, the arithmetic operations are performed as they appear, that is from left to right.

From the definition of (4) arithmetic expression, the addition and subtraction upon depression of the operator keys + and − mean that the data of the term are transferred into the data of the arithmetic expression. From the definition (3) term, the multiplication and division upon depression of the operator keys × and ÷ mean that the data of the factor are transformed into the data of the term. The primary, factor, term and arithmetic expression are defined in more detail in JIS Electronic Computer Terms ALGOL (Standard 7000) JIS,C,6210, page 6, published Mar. 1, 1972 by Japan Standard Associaton based upon the decision reached Japan Industrial Standard Reasearch Council.

Figure 16A:
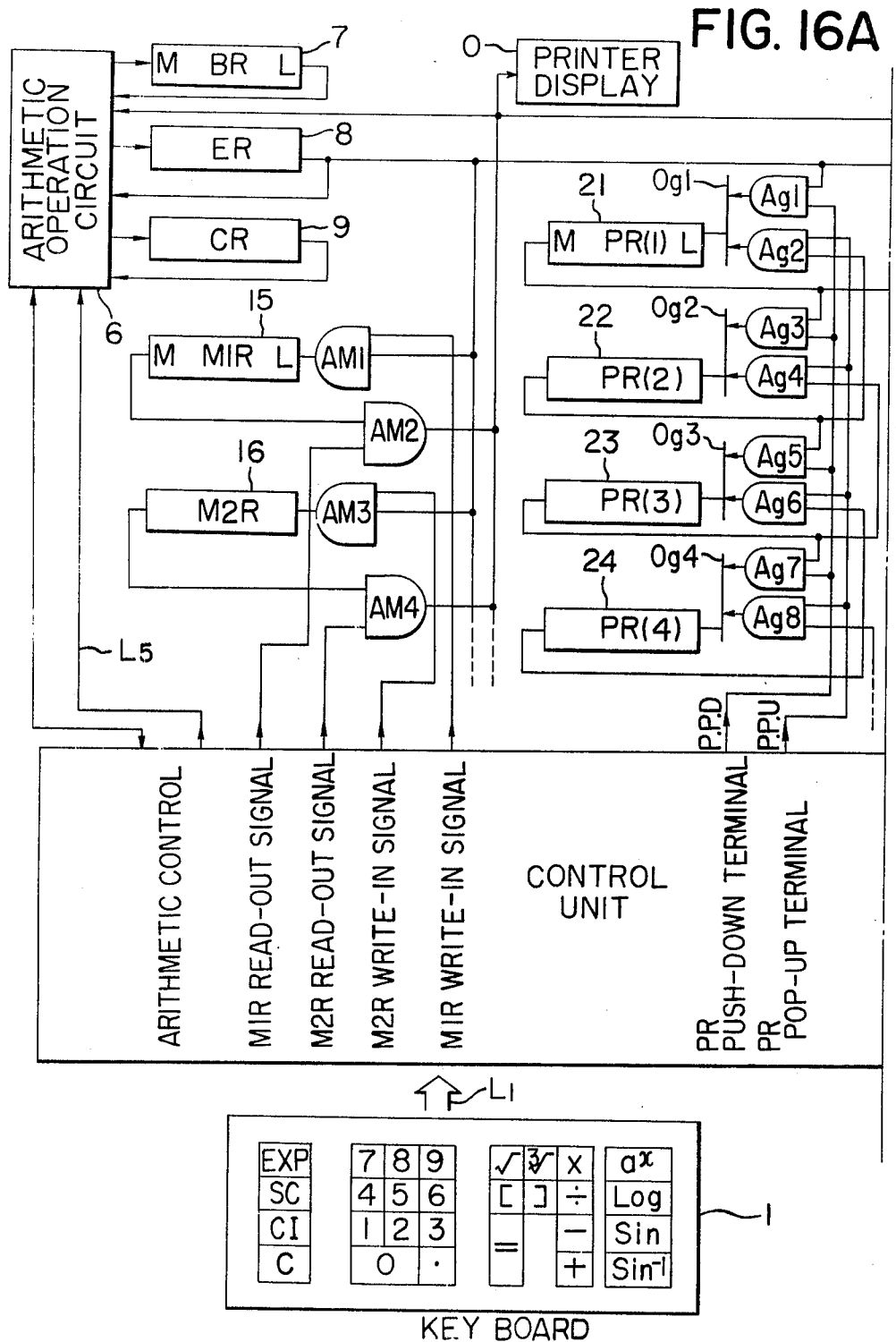
FIG. 16 is a block diagram of a third embodiment of the present invention.
Figure 16B:
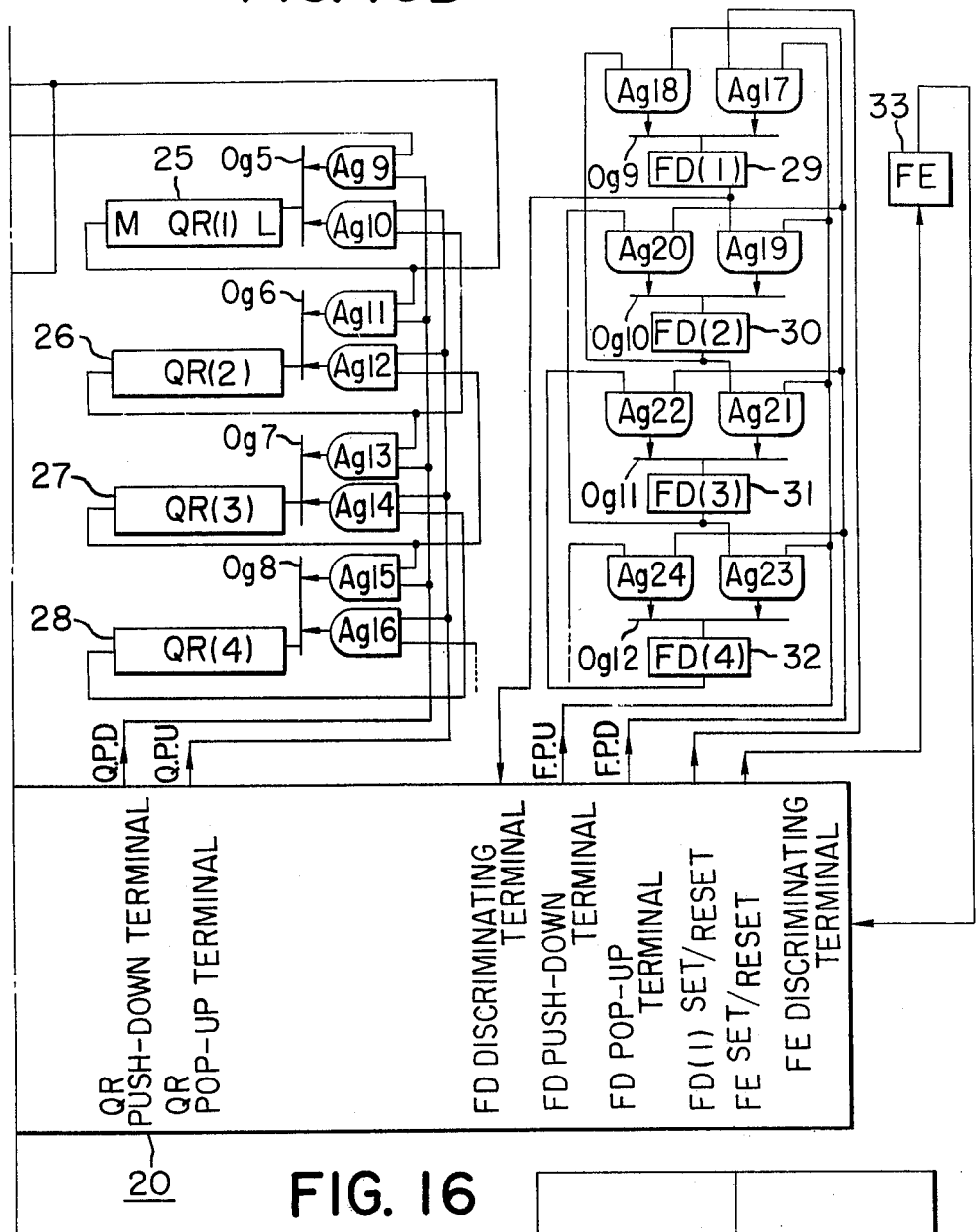
Figure 16:
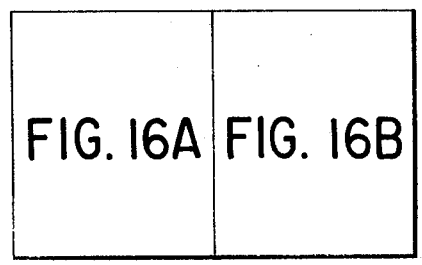

FIG. 16 is a block diagram of the third embodiment of the present invention, The keyboard 1 has various operator keys, parenthesis keys, equal key, numerical keys and so on. As with the case of the first and second embodiment, even a complex problem may be solved by depressing the numerical keys, operator keys and other mathematic notation keys in the sequence as they appear in the problem. A control unit accomplishes various controls on arithmetic operations. An arithmetic unit 6 performs the addition, subtraction, multiplication and division in cooperation with registers 7, 8 and 9. The register ER is an accumulator register (or answer register), and the arithmetic operations are performed by controlling the registers ER 8, the register BR 7 and the register CR 9. The register 8 is also used to store a factor, which is defined hereinbefore. If required, a factor register may be additionally provided. Memory registers 15 and 16 of the conventional type are used for carrying out a special function and multiplication in which a multiplicand is multiplied by a constant multiplier. Registers PR 21–24 store therein the terms which is defined hereinbefore. In this specification, the process for opening odd-numbered AND gate Ag3, Ag5, Ag7, and so on so as to shift the content in the register PR(1) into the next register PR(2), to shift the content in the register PR(2) into the register PR(3), . . . and to transfer the content in the register PR (n-1) into the register PR(n) will be referred to as "Push Down." On the other hand, the reverse process of "Push Down" for opening even-numbered gates AG8, AG6, AG4, and AG2 so as to transfer the content in the register PR($n$) into the register PR($n-1$), . . . and to transfer the content in the register PR(2) into the register PR(1) will be referred to as "Pop Up." Furthermore the arrangement in which a plurality of data may be sequentially stored and the datum which has been stored last may be derived first when the data are read out will be referred to as "stack."

Registers QR 25–28 make up a stack similar to that made up by the registers PR and store therein the arithmetic expressions defined hereinbefore. In like manner, flip-flops 29–32 of one bit make up also a stack and store therein only the operator ÷ (/). An one-bit flip-flop FE 33 stores therein the operator(↑). AND gates AM1–AM4 and Ag1–Ag24 control the transfers of the data among the registers and flip-flops. Og1–Og12 are OR gates.

Next referring to FIGS. 16, 19 and 20A, the construction and mode of operation of the third embodiment will be described in conjunction with solving a problem of A × (B + C). First the clear key C is depressed, the control unit 20 stores the numerical data signal "1" into the LSD place in the register PR(1) and clears and resets all of the other registers and flip-flops. This arrangement may be so modified that when a power key is depressed, the above step may be accomplished.

Next the numerical value A is entered and stored in the register ER. Upon depression of the operator key ×, the operations or process A and B shown in FIG. 19(c) are performed under the control of the control unit 20, and then the machine is halted. As shown in FIG. 19(j), in operation A the control unit 20 decides whether the flip-flop FE is set or reset, and the routine is carried out as shown. In this example, the exponentiation key $a^x$ is not depressed, the flip-flop FE is set, and control immediately follows the path to RETURN so that the operation B shown in FIG. 19($k$) may be carried out. In operation B, the control unit 20 decides whether the flip-flop FD(1) is set or reset. The flip-flop FD(1) is one which is set when the operator key ÷ is depressed. Since it is reset, control follows the horizontal path so that the arithmetic unit 6 performs

PR(1) * ER → PR(1).

The above expression means that the contents in the conventional registers PR(1) and ER are multiplied and the product is stored into the register PR(1).

Figures 20A, 20B:
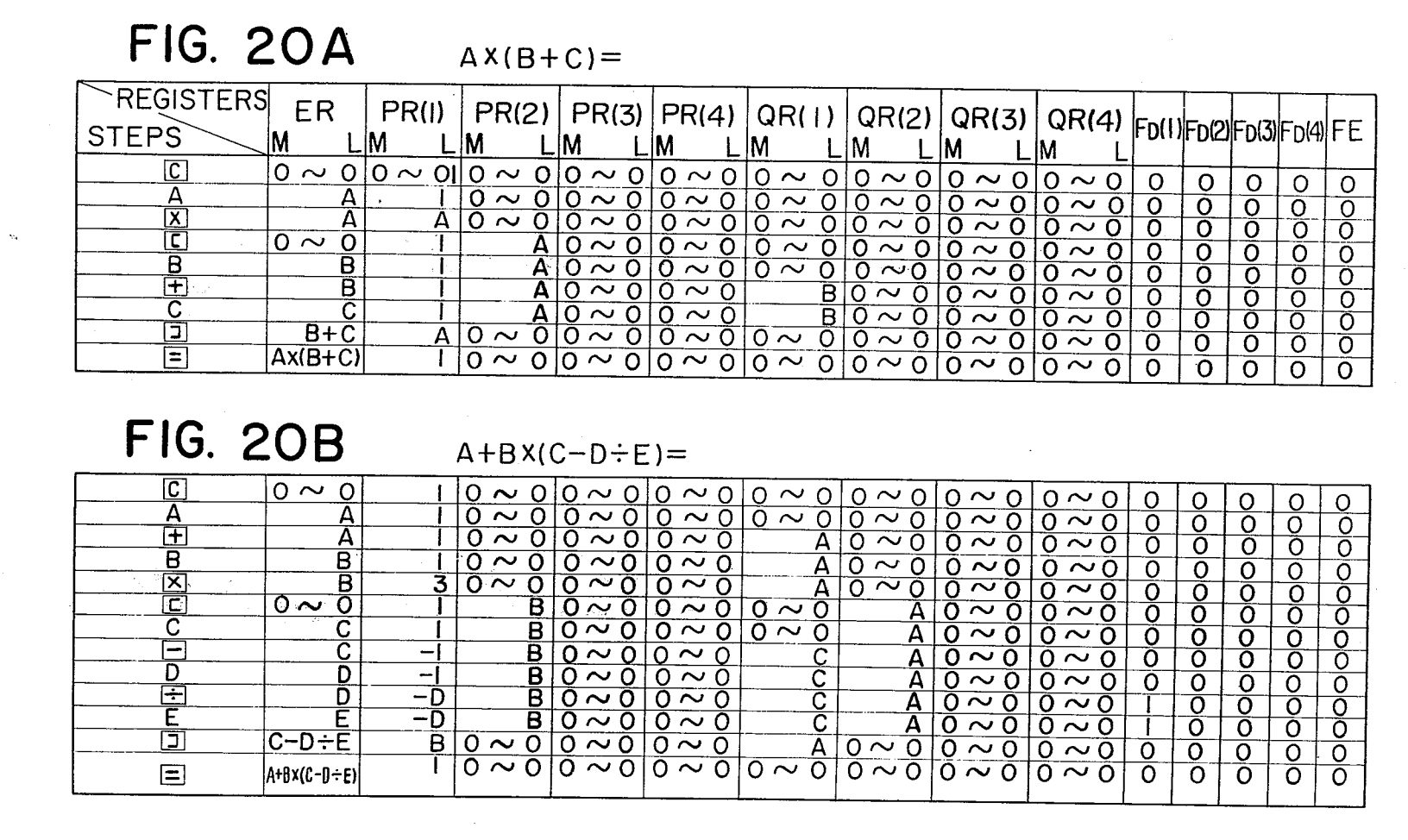

As shown in FIG. 20(A), Step A, the content in the register PR(1) is 1 stored in the LSD place while the contents in other digit places are all zero, and the content in the register ER is the numerical value A. Therefore, the product of the above multiplication is also A so that the content in the register ER is also A. However, the product A is no longer the factor because it is the product of the multiplication of the primary or factor A and the constant 1 which is a primary, but is the term. Therefore the term datum A is now stored in the term register PR(1). The control of the arithmetic operations in the operation B is one of the most important features of the present invention.

Upon depression of the parenthesis key (, "Push Down" is started as shown in FIG. 19(f), and thereafter the steps similar to those performed upon depression of the clear key C are performed under the control of the control unit 20. As Push Down is started, the odd-numbered AND gates AG3, AG5 and AG7 are opened so that the contents of the registers are transferred into the following registers as described hereinbefore as shown in FIG. 19(m). Consequently, the content in the register ER is 0; the content in the register PR(1) is only 1 in the LSD place; and the content in the register PR(2) is the numerical value or factor A.

Figure 19:
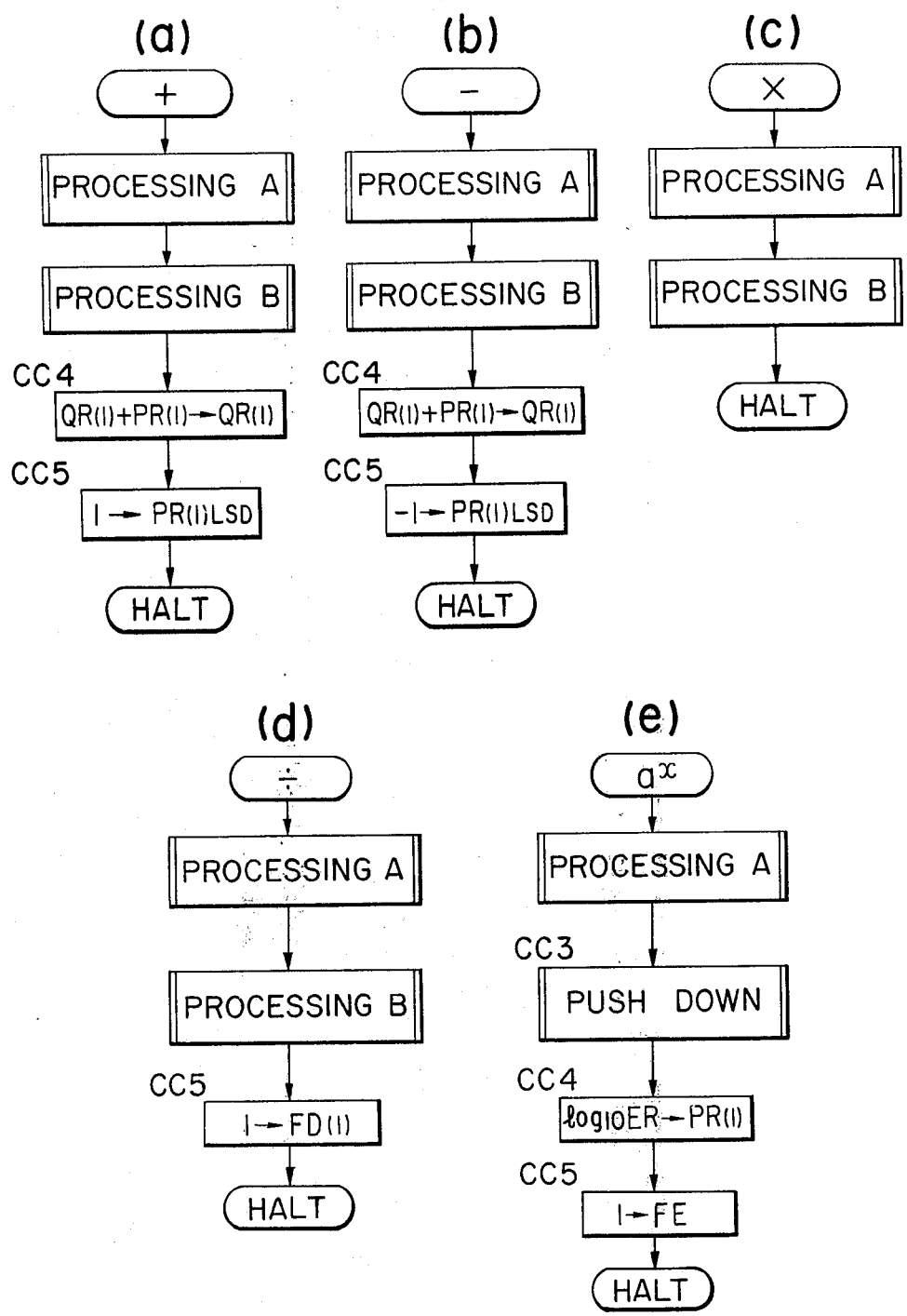
FIG. 19 is a flow chart corresponding to the timing charts shown in FIGS. 18A and 18B.
Figure 19:
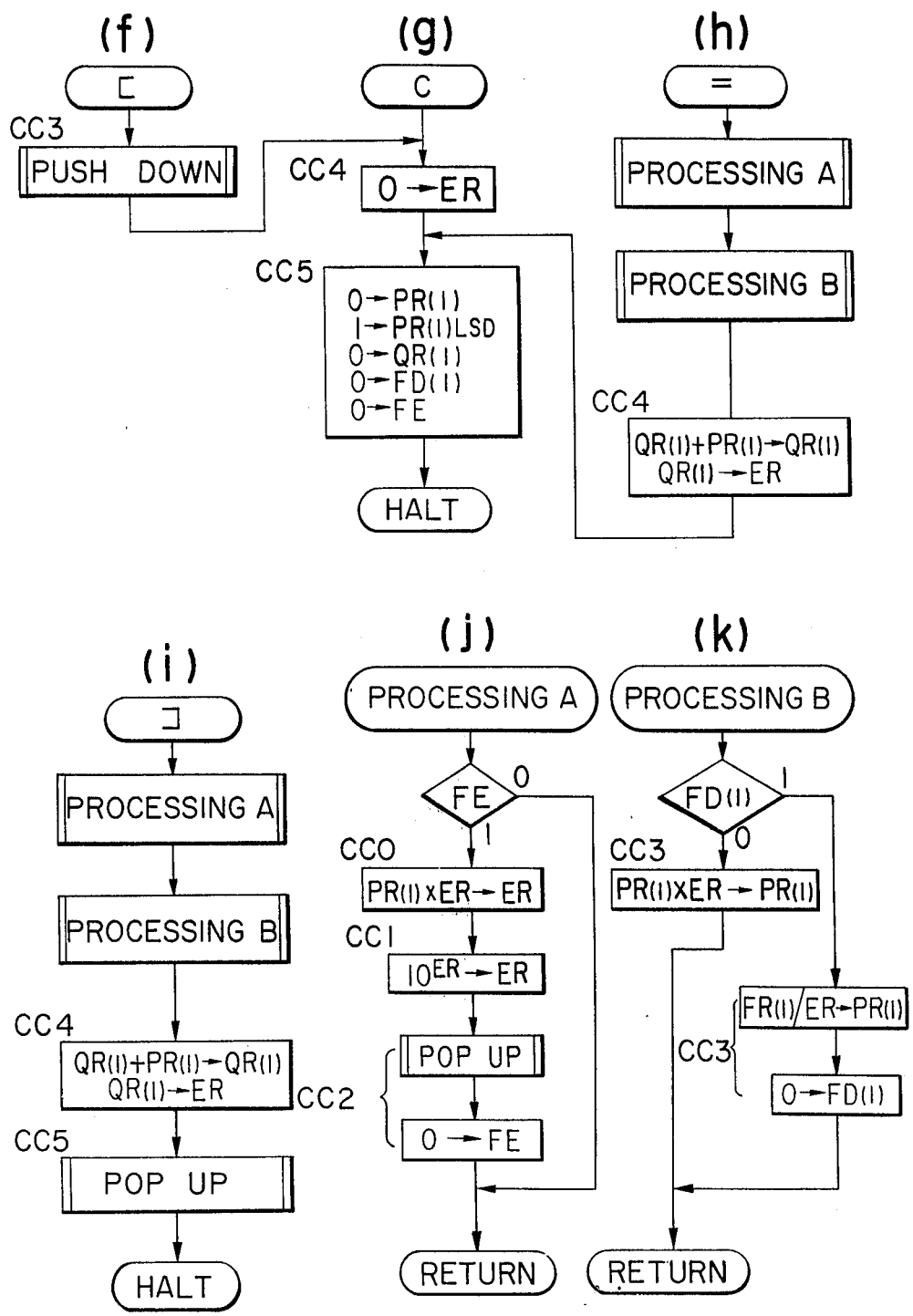

Thereafter the numerical value B is entered and stored in the register ER, and upon depression of the operator key + the steps as shown in FIG. 19(a) are performed. Since the exponentiation is not involved, the operation A is skipped so that the operation B is immediately started. In the operation B (See FIG. 19$k$), the operation of

PR(1) * ER → PR(1)

is performed because the flip-flop FD(1) is not set because of the reason explained hereinbefore. As shown in FIG. 20A, Step B, the content in the register PR(1) is 1 and the content in the register ER is B, the multiplication of 1 × B is performed. Since the factor B is transformed to the term B, the product 1 × B is stored in the term register PR(1).

When the operation B is accomplished, the operation

QR(1) + PR(1) → QR(1)

is performed as shown in FIG. 19($a$). That is, the content B stored in the register PR(1) is added to the content 0 in the arithmetic expression storage register QR(1) so that the sum is stored in the arithmetic expression storage register QR(1) as the term data have been transformed into the arithmetic expresssion data. Since the term B is added to the arithmetic expression which is 0 in this example at this step, an arithmetic expression 0 + B (arithmetic expression + term) is obtained. Therefore, this arithmetic expression must be stored in the arithmetic expression storage register QR(1). Thereafter 1 is stored again in the LSD place in the register PR(1). Thus the +key operation is completed. The contents in the registers are shown at Step + in FIG. 20A.

Next the numerical value C is entered stored in the register ER, replacing the numerical value B which has been stored therein. Next upon depression of the parenthesis key ), the routine shown in FIG. 19(i) is peformed. Since the flip-flop FE is reset, the operation A is skipped and the operation B is immediately started. In operation B, the flip-flop FD is reset, and the operation

PR(1) × ER → PR(1)

is performed. Since the content in the register PR(1) is 1 while the content in the register ER is C, the multiplication 1 × C is performed. The factor C is transformed into the term C so that the product C is stored in the register PR(1).

Next the operation

QR(1) + PR(1) → QR(1)

is performed. Since C is stored in the register PR(1) while B is stored in the register QR(1), the addition B + C is performed and the sum B + C is stored in the register QR(1). The sum stored in the register QR(1) is an arithmetic expression aggregated or grouped by the parenthesis so that the sum is a primary or factor. Therefore, the sum is transferred into the factor storage register ER, and the "Pop Up" of the group of the registers QR is started as the even-numbered AND gates Ag16, Ag14, Ag12, Ag10 and so on are opened. Consequently, the data B + C stored in the register QR(1) are erased, and the contents in the registers change to the contents shown in FIG. 20A, Step ).

Upon depression of the key = for obtaining the answer to the problem, the routine as shown in FIG. 19($h$) is carried out. As described hereinbefore, the operation A is skipped and the operation B is immediately performed. Since flip-flop FE is reset, the operation $$PR(1) \times ER \rightarrow PR(1)$$

is performed. Since the contents in the registers PR(1) and ER are those shown in FIG. 20A, Step ), the multiplication A × (B + C) is carried out and the product is stored in the register PR(1). The product is the term because the operation is the term A * factor (B + C) so that the product is stored in the term storage register PR(1). Thereafter the operation $$QR(1) + PR(1) \rightarrow QR(1)$$

is performed. The content in the register QR(1) is zero, so that the sum is the content in the register PR(1). Since the term is transformed into an arithmetic expression, the sum A × (B + C) is stored in the register QR(1). Thereafter, the content in the register QR(1) is transferred into the register ER so that the answer may be displayed or printed. Thus all of the steps of the arithmetic operation on the problem A × (B + C) are completed. Thereafter the routines shown in FIGS. 19($g$) and ($h$) are performed in a manner substantially similar to that when the clear key C is depressed so that the computer is now ready to perform the next arithmetic operation. That is, only 1 is stored in the LSD place in the register PR, and the other registers are cleared while the flip-flops are reset.

As described hereinbefore, according to the present invention, the fact that a numerical value remains unchanged, even it is multiplied by 1, is used so that a problem may be solved by a computer very simply in construction under the simple controls when the numerical keys, operator keys and other mathematic notation keys are depressed in the sequence as they appear in a problem to be solved.

So far the third embodiment has been described with reference to the block diagram shown in FIG. 16 as to its general construction and mode of operation, and the construction and mode of operation will be described in more detail hereinafter with reference to FIG. 17 illustration the detailed circuits.

FIG. 17 generally shows the details of the control unit 20 shown in FIG. 16. In FIG. 17, Og14–Og38 are OR gates; Ag25–Ag34, AND gates; F1–F7, flip-flops for generating the key signals K+, K–, . . . and K$a^x$ when the operator keys +, –, . . . and $a^x$ are depressed; and CF0–CF5, flip-flops for generating the fundamental control signals CC0–CC5 which control the gates shown in FIG. 17. The registers PR(2) – PR(4) and QR(2) – QR(4) are arranged in the manner described hereinbefore with reference to FIG. 16 so that the contents stored in the registers PR(1) and QR(1) are pushed down or popped up through them. Unlike the first and second embodiments, the static shift registers are used in the third embodiment and are asynchronously actuated, which means that the present invention may use either of the dynamic or static registers as needs demand. Therefore, the asynchronous static registers may be used in the first and second embodiments while the synchronous dynamic registers may be used in the third embodiment.

The arithmetic unit 6, and circuits 34–38 shown in FIG. 17H for generating the instructions for carrying out the multiplication, division, exponentiation, logarithmic operations, and addition are of the conventional type so that no detailed explanation thereof will be made in this specification except the brief general explanation to be described hereinafter. For instance, when the multiplication instruction generating circuit Mult 34 is energized, the adder cycles the addition of the X and Y inputs so that a multiplication X*Y is performed. The product is the output ADDo of the adder.

Figure 17A:
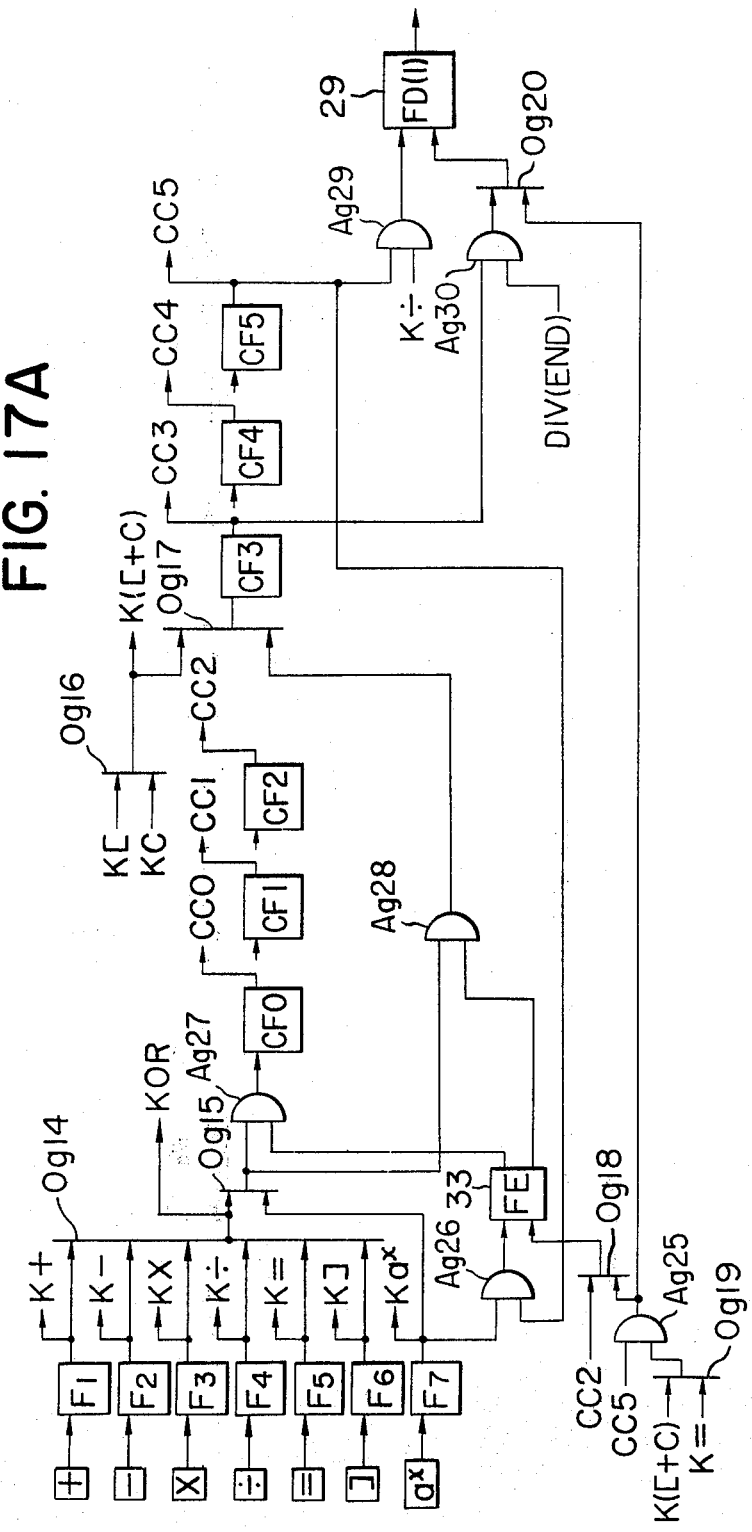
FIGS. 17A–17H are detailed circuit diagrams of a control unit 20 in the circuit diagram shown in FIG. 16.

Next the arrangement of the circuit shown in FIG. 17 will be described in detail hereinafter. Referring to FIG. 17A, the flip-flops F1–F7 are set when the operator keys +, –, ×, ÷, =, ) and $a^x$ are depressed so that the set outputs may be used as the key signals, K+, K–, K×, K×, , K=, K) and K$a^x$. Except the key signal K$a^x$, the key signals are transmitted through the OR gate Og14 to become the output KOR thereof. Complex control gates are interposed among the flip-flops CF0–CF5, which make up a ring counter so that the set output signals CC0–CC5 are sequentially generated and will not be superposed one upon another or will not be generated simultaneously. The set and reset input terminals of the flip-flop FE are coupled to the AND gates Ag26 and Ag25, respectively, so that the set and reset of the flip-flop FE may be controlled. The reset output is applied to the AND gates Ag27 and Ag28 so that whether the control signals from CC0 to CC5 must be generated or the control signals from CC3 to CC5 must be generated is decided depending upon whether the exponentiation key $a^x$ is depressed or not. The set input terminal of the flip-flop FD(1) is coupled to the AND gate Ag29 so that when it may be set upon depression of the division key ÷. The reset input terminal is coupled to the OR gate 20 so that the flip-flop FD(1) may be reset under various conditions as shown in FIG. 17.

Figure 17B:
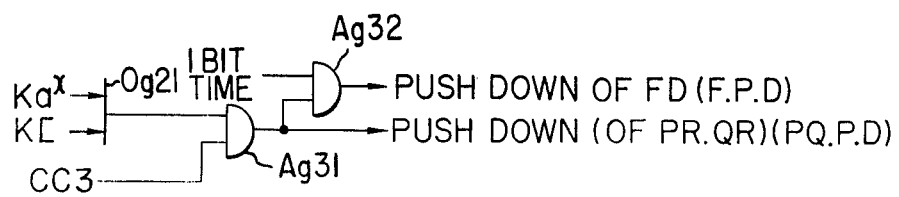

FIG. 17B shows the arrangement for generating the push down signal. As shown, when the key signal K$a^x$ or K( is generated and applied to the AND Ag31 simultaneously with the control signal CC3, the push down signal F.P.D. and PQ.P.D. are generated.

Figure 17C:
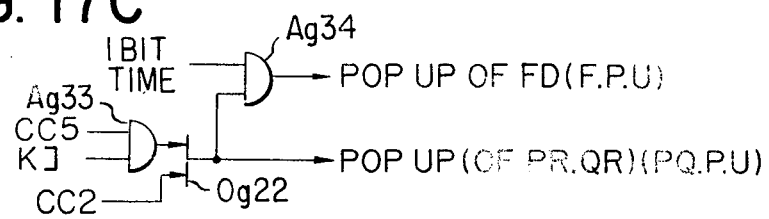

FIG. 17C shows the arrangement of the AND gates for generating the pop-up signal. As shown, when the key signal K) is generated and applied to the AND gate simultaneously with the control signal CC5 or CC2, the pop-up signals F.P.U. and PQ.P.U. are generated.

Figure 17D:
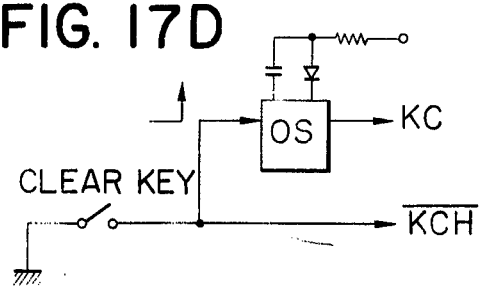

FIG. 17D shows the arrangement in which an oneshot multivibrator is actuated after the clear key C is returned to its normal position after it has been depressed, so that the clear signal KC is generated.

Figure 17E:
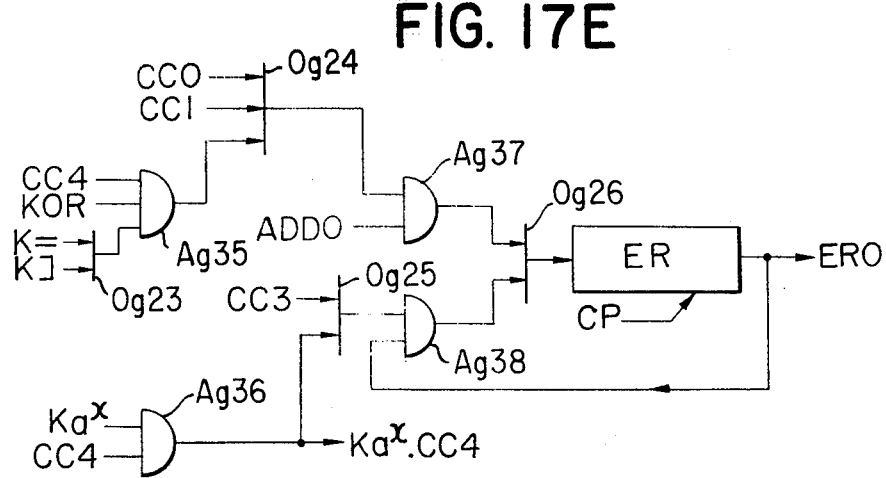

FIGS. 17E, F and G show the arrangements of the gates coupled to the factor register ER, the term register PR(1) and the arithmetic expression register QR(1) and incorporated within the control unit 20 shown in FIG. 16. The functions of these gates will become more apparent from the following description and are the very important features of the third embodiment.

Referring to FIG. 17E, in response to the output signals from the OR gates O$g$23 and O$g$24 and the AND gate A$g$35, the AND gate A$g$37 is opened so that the output ADDo of the adder (See FIG. 17H) is transferred into the factor register ER. The AND gate A$g$38 is a circulation gate through which the content of the register ER is circulated in order to hold its content and which is opened in response to the signal CC3. CC4 or K$a^r$.

Figure 17F:
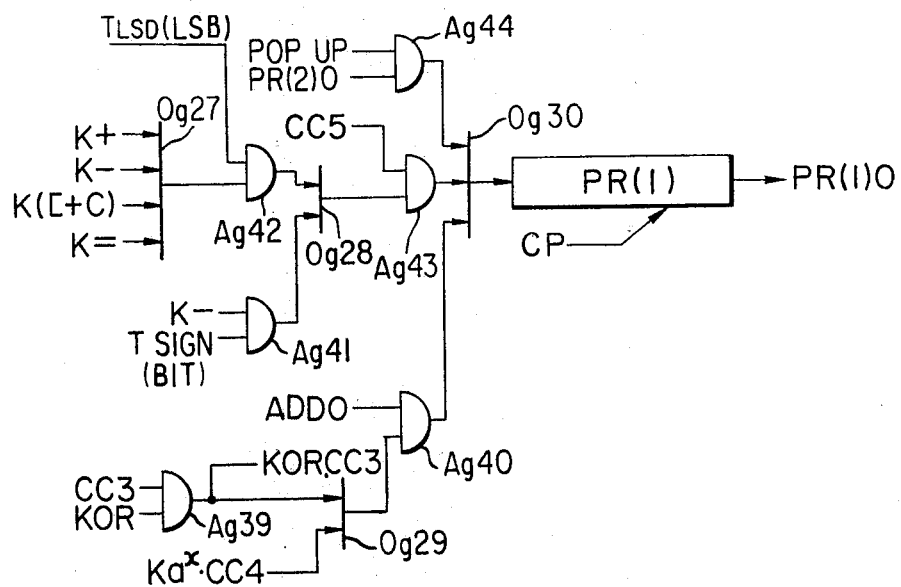

Referring to FIG. 17F, in response to the control signal CC3 and the signal KOR, and AND gate A$g$39 generates the output signal. In this case or when the AND gate A$g$40 is opened in response to signals K$a^r$ and CC4, the output ADDo of the adder is transferred into the factor register PR(1). The AND gates A$g$42 and A$g$43 are opened when the key signals K+, K−, K(, KC and K= are generated simultaneously when the control signal CC5 is generated so that the numerical deta signal 1 is stored in the LSD place in the register PR(1). When the key signal $k-$ is generated, 1 is stored in the LSD place and simultaneously the signal "1" is also stored in the sign place so that the datum stored in the register PR(1) is treated as a negative number. When the pop-up signal PQ.P.U. is applied to the AND gate A$g$44, the content in the register PR(2) is popped up into the register PR(1).

Figure 17G:
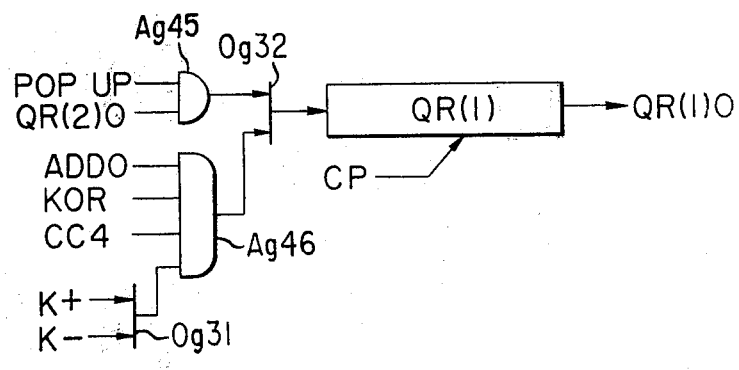

Referring to FIG. 17G, when the key signal K+ or K− is generated in synchronism with the control signal CC4, the output ADDo of the adder is transferred into the arithmetic expression register QR(1). Furthermore, in response to the pop-up signal, the AND gate 45 is opened so that the content in the register QR(2) is popped up into the register QR(1).

Figure 17H:
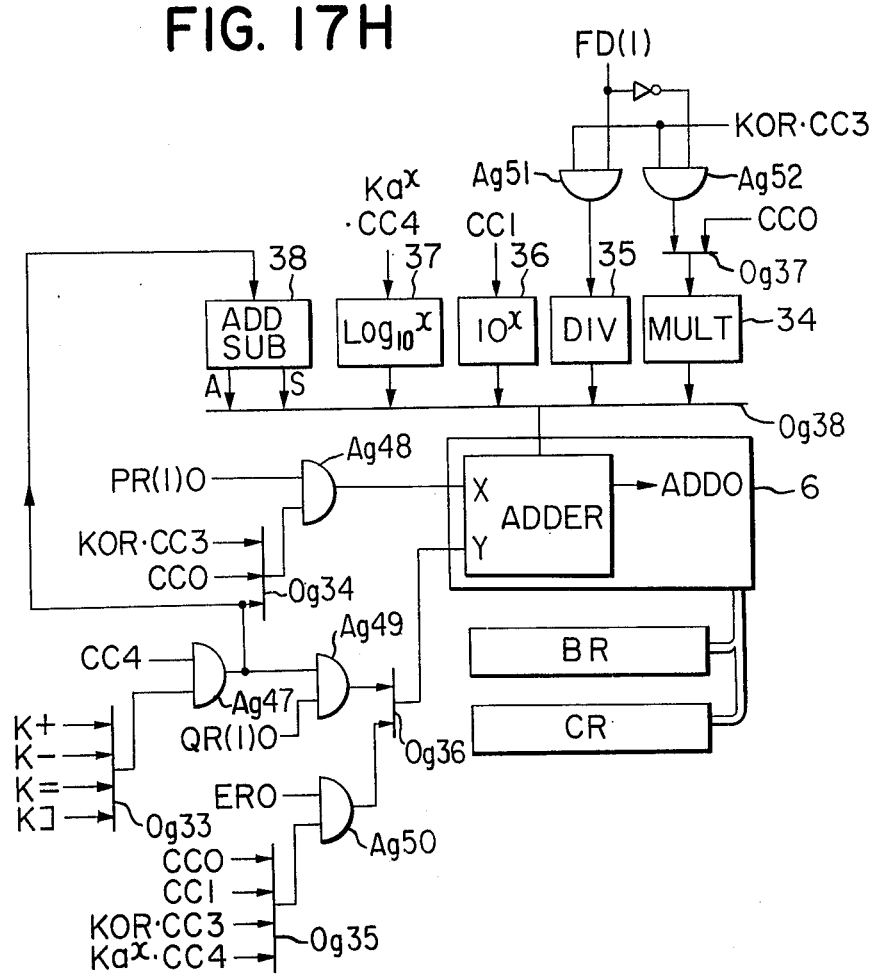

Referring to FIG. 17H, the X input terminal of the adder is coupled to the AND gates A$g$47 and A$g$47 and the OR gates O$g$34 and O$g$33 while the Y input terminal is connected to the OR gates O$g$36 and O$g$35 and the AND gate A$g$50. The AND gate A$g$48 is opened when the key signal K+, K−, K+, or K), the control signal CC0 or the signal KOR and CC3 is generated in synchronism with the control signal CC4. As a result, the output PR(1) 0 of the term register PR(1) is applied to the X input terminal of the adder. In response to the output signal from the AND gate A$g$47, the AND gate A$g$49 is opened so that the output QR(1) 0 of the arithmetic expression register OR(1) is applied to the Y input terminal of the adder. In response to the signal CC0, CC1, KOR, CC3, K$a^r$ or CC4 applied to the OR gate O$g$35, the AND gate A$g$50 is opened so that the output ER0 of the factor register ER is applied to the Y input terminal of the adder.

Figure 18A:
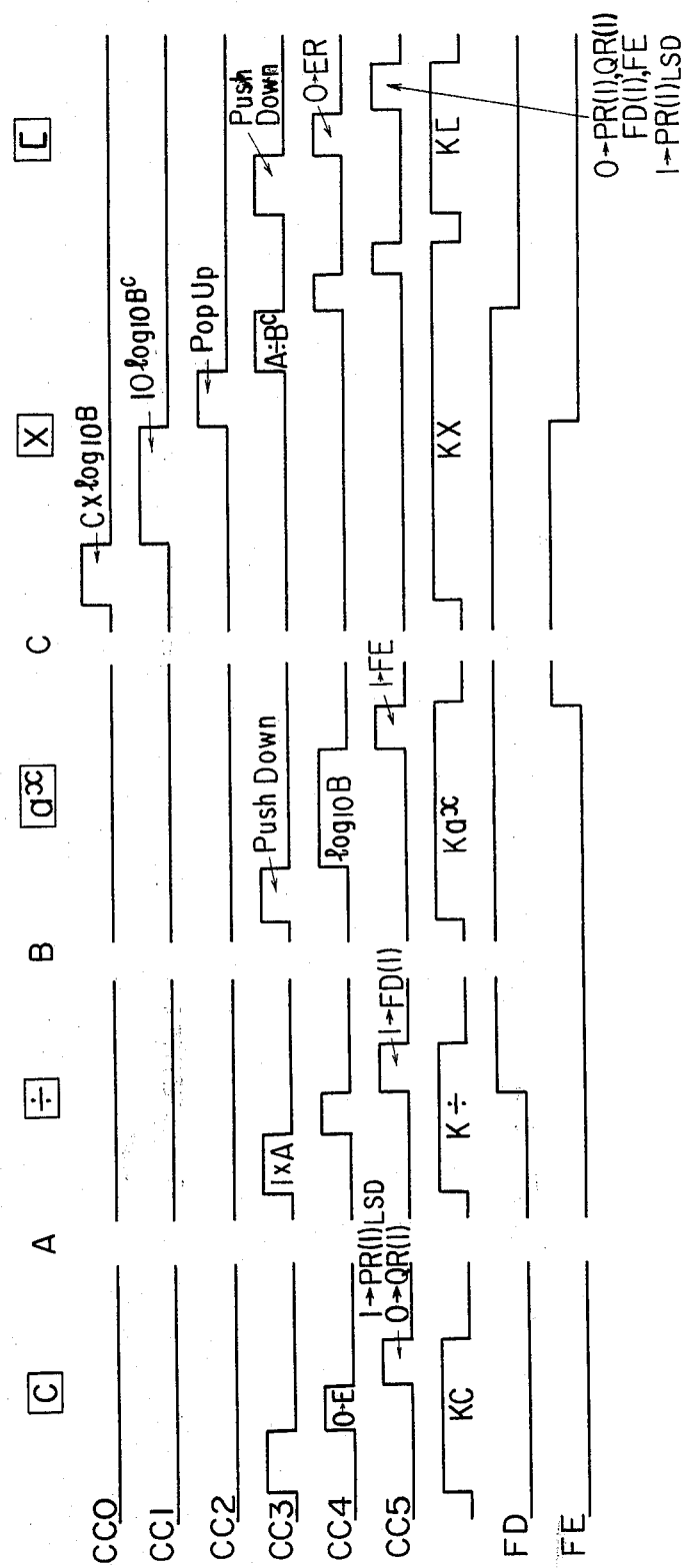

Next the mode of operation will be described in more detail in conjunction with solving of a problem A ÷ B$^c$ × (D + E) = Upon depression of the clear key C, the clear key shown in FIG. 17D is turned on so that the signal $\overline{\text{KCH}}$ is generated. Therfore, all of the registers and flip-flops in the computer are cleared and reset. When the clear key is returned to its normal position, the one-shot multivibrator OS is actuated in response to the fall or trailing edge of the pulse signal $\overline{\text{KCH}}$ so that the clear signal KC is generated as shown in FIG. 18A. The clear signal KC is applied to the OR gate O$g$16 shown in FIG. 17A so that the flip-flop CF 3 is set. At the fall or trailing edge of the set output signal CC3 of the flip-flop FC3, the flip-flop CF4 is set as shown in FIG. 18A to generate the set output signal CC4 in response to which the flip-flop FC5 is set to generate the set output signal CC5. When the flip-flop CF3 is set, any particular function will not be made. When the flip-flop CF4 is set, thus generating the set output signal CC4, the content in the register ER shown in FIG. 17E is cleared. That is, when the clock pulse CP is applied to the register ER during this period, all of the contents in the register ER are shifted to right, but the shifted content cannot be cycled because the AND gates A$g$36 and A$g$38 are not opened. Consequently, the content in the register ER is cleared. When the flip-flop CF5 is set, generating the set output signal CC5, the latter is applied to one input terminal of the AND gate A$g$43 shown in FIG. 17F. The clear signal KC, which is applied to the OR gate O$g$27, causes the AND gate A$g$42 to be opened during the bit time immediately after the LSD time of the register PR(1) so that the binary code 0001, which represents 1 in decimal code, is stored in the LSD place of the register PR(1) from the AND gate A$g$43. The contents in the remaining digit places of the register PR(1) are all zeros. Since the clock pulse CP is generated when the output signal CC5 is generated, the register QR(1) shown in FIG. 17G is also cleared in a manner substantially similar to that of the register PR(1) described hereinbefore. Since the signal CC5 opens the AND gate 25 shown in FIG. 17A, it is transmitted through the OR gate O$g$20 to reset the flip-flop FD(1). The output signal of the AND gate A$g$25 is transmitted through the OR gate O$g$28 to set the flip-flop FE. Thus, the steps shown in FIG. 19($g$) to be accomplished when the clear key C is depressed have been accomplished. The control pulses generated at various points are shown in FIG. 12A and 12B.

Next the numerical value A is entered and stored in the register ER. Upon depression of the operator key ÷ the flip-flop F4 is set (See FIG. 17A), and its set output signal, which is the key signal K÷, is transmitted through the OR gates O$g$14 and O$g$15 so that the signal KOR is derived. The signal KOR is applied to the gate A$g$27. Since the operator key $a^r$ is not depressed, the AND gate A$g$27 is not opened, but the AND gate A$g$28 is opened in response to the reset output signal of the flip-flop FE so that the OR gate O$g$17 is opened when the clear signal KC passes through the OR gate O$g$16. Consequently, as shown at step ÷ in FIG. 18A, the flip-flops CF3, CF4 and CF5 are sequentially set so that the control signals CC3, CC4, and CC5 are sequentially generated. During the presence of the control signal CC3, the output signal KOR of the OR gate O$g$14 is applied to the AND gates A$g$51 and A$g$52 shown in FIG. 17H. However, the flip-flop FD(1) has not been set yet, so that the AND gate A$g$52 is opened to actuate the multiplication-instruction generating circuit Mult 34. Since the output signal is derived from the OR gate O$g$34 in response to the signals KO3 and CC3, the output PR(1)0 of the register PR(1) is applied to the X input terminal of the adder in the arithmetic unit 6. In like manner, the output signal is also derived from the OR gate O$g$35 so that the AND gate A$g$50 is opened. Consequently, the output ER0 of the register ER is applied to the Y input terminal of the adder. Therefore, in response to the output signal from the multiplication-instruction generating circuit Mult 34, the multiplication, which is the repetition of the additions, is performed with the further use of the registers BR and CR. That is, the content 1 in the register PR(1) and the content A in the register ER are mulitplied ($1 \times A$). The product A, which has been transformed from the factor to a term, is stored in the term storage register PR(1). More particularly, the AND gates Ag39 and Ag40 shown in FIG. 17F are opened to store the output ADDo of the adder into the register PR(1). During the control signal CC4 is generated, no function is performed, but in response to the next control signal CC5, the AND gate Ag29 shown in FIG. 17A is opened so that the flip-flop FD(1) is set, thus memorizing that the division key $\div$ is depressed. Thereafter the numerical value B is entered and stored in the register ER, replacing the numerical value A.

Upon depression of the exponentiation key $a^x$, the AND gate Ag27 shown in FIG. 17A is not opened because the flip-flop FE whose function is to memorize the depression of the exponentiation key $a^x$, is not set. As in the case of the depression of the division key $\div$, the flip-flops CF3, CF4 and CF5 are sequentially set so that the control signals CC3, CC4, and CC5 are sequentially generated. During the presence of the control signal CC3, the AND gate Ag31 shown in FIG. 17B is opened so that the output signal, which becomes the push down signals PR.P.D. and PQ.P.D. for the group of registers PR(1)–PR(5) and the group of registers QR(1)–QR(5), respectively, may be derived and applied to the AND gates Ag1, Ag3, Ag5, and Ag7 and the AND gates Ag9, Ag11, Ag13, and Ag15, respectively. Consequently, Push Down of the group of registers PR(1)–PR(5) and the group of registers QR(1)–QR(5) is performed. One bit output signal of the AND gate Ag32 shown in FIG. 17B is also applied to the AND gates Ag17, Ag19, Ag21, and Ag23 in the one-bit stack FD(1)–FD(5) so that Push Down is started. Consequently, the content A in the register PR(1) is transferred into the register PR(2), and the content of the flip-flop FD(1) in the one-bit stack is also transferred into the flip-flop FD(2). Since the inverted or negative input is applied to the AND gate Ag19 of the flip-flop FD(1), the latter is reset. In response to the control signal CC4, the logarithmic operation instruction signal $Log_{10}X$ 37 shown in FIG. 17H is actuated, and the output signal is derived from the OR gate Og35 so that the AND gate Ag50 is opened to apply the content output ER0 of the register ER to the Y input terminal of the adder. In this case, no signal is applied to the X input terminal of the adder. The adder is actuated in response to the control signal from the logarithmic operation instruction generating circuit $Log_{10}X$ so that the content B in the register ER is converted into $Log_{10}B$, which is stored in the register PR(1). In response to the next control signal CC5, the AND gate Ag26 shown in FIG. 17A is opened so that the set output signal $Ka^x$ derived from the flip-flop F7 which is set upon depression of the key $a^x$ is applied through the AND gate Ag26 to the flip-flop FE to set it. Therefore, the depression of the key $a^x$ is memorized.

Figures 20A, 20B, 20C:
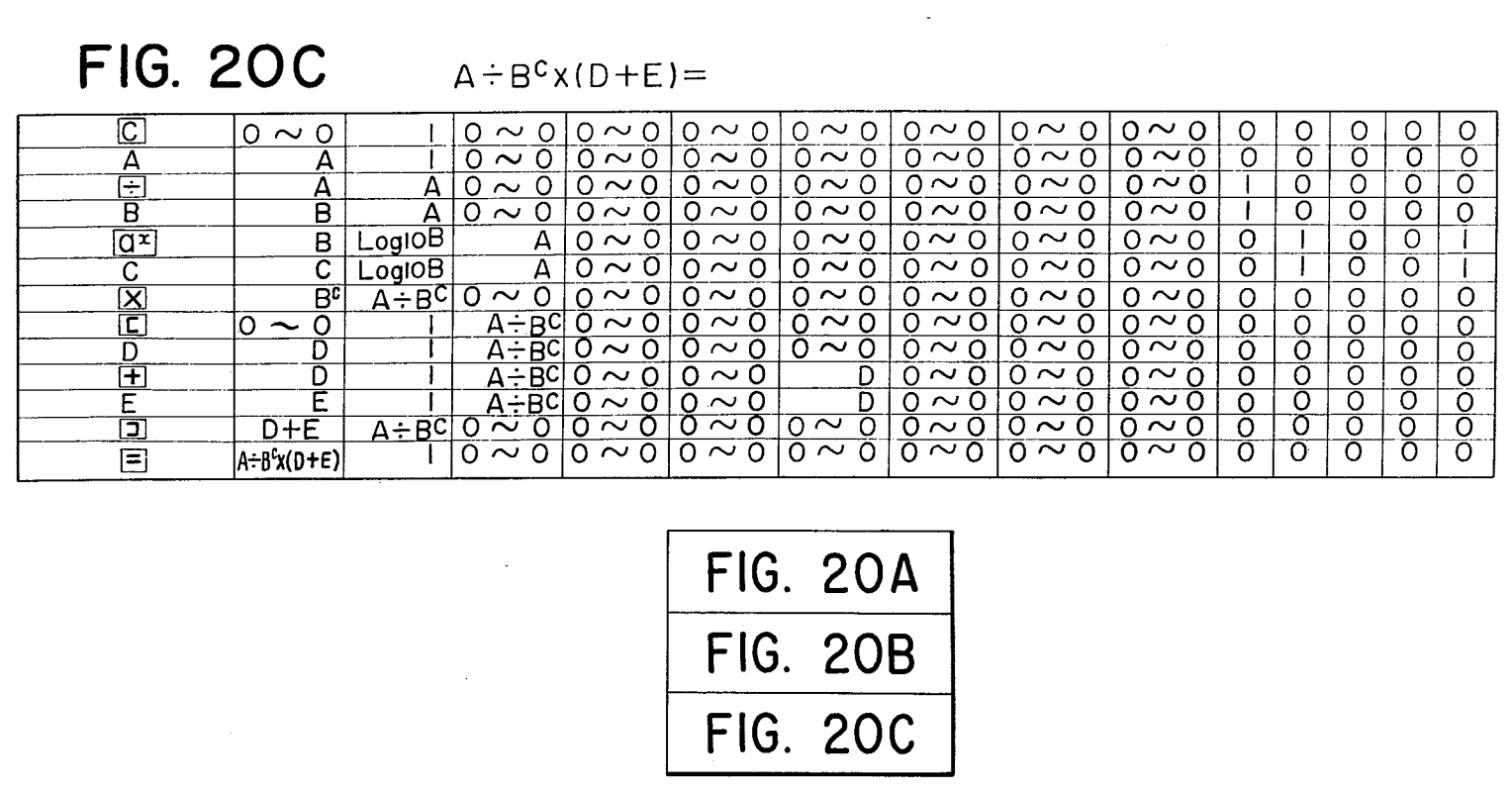

Thereafter the numerical value C is entered and stored in the register ER, replacing the previous content B. As shown in FIG. 20C, Step C, when the factor datum is stored in the register ER, the factor data $Log_{10}B$ and A are stored in the registers PR(1) and PR(2), respectively.

Next upon depression of the key ×, the flip-flop F3 shown in FIG. 17A is set to generate the key signal KX. Since the flip-flop FE is set in the previous step, the AND gate Ag27 is opened so that the flip-flop CF0 is set to generate the set output signal CC0 as shown in FIG. 18A. In response to the control signal CC0 the output signal is derived from the OR gate Og37 shown in FIG. 17H so that, as in the case of the depression of the division key $\div$, the AND gates Ag48 and Ag50, and the multiplication instruction generating circuit Mult 34 is actuated. As a result, the content output PR(1)0 of the register PR(1) and the content output ER0 of the register ER (which stores the numerical value C) are applied to the X and Y input terminals of the adder. The adder performs the multiplication $Log_{10}B \times C$ in response to the control signal from the circuit Mult 34 and the product $C\, Log_{10}B$ ($=Log_{10}B^C$) is transmitted through the AND gate Ag37 and stored in the register ER. In response to the fall or trailing edge of the control signal CC0, the flip-flop CF1 is set to generate the control signal CC1 in response of which is actuated the exponentiation instruction generating circuit $10^{-x}$ 36 shown in FIG. 17H and is opened the AND gate Ag50. The adder performs the multiplication of the content $Log^{10}B^C$ in the register ER and the content $10^{-x}$ in the regiser ER in response to the control signal from the circuit 36. The product $B^C$ is transferred through the AND gate Ag37 shown in FIG. 17E into the register ER. Thereafter the flip-flop CF1 is reset while the flip-flop CF2 is set. The set output signal CC'' of the flip-flop CF2 is applied to the OR gate Og22 shown in FIG. 17C so that the latter generates the Pop Up instruction signals PQ.P.U. and F.P.U. for the register groups PR and QR and the one-bit stack FD. As a result, the AND gates Ag8, Ag6, Ag4 and Ag2 ( Ag44 shown in FIG. 17E ) and the AND gates Ag16, Ag14, Ag12, and Ag10 ( Ag45 shown in FIG. 17G ) shown in FIG. 2 and the AND gates Ag24, Ag22, Ag20 and Ag18 are opened to start Pop Up. This means that the contents in the registers and the flip-flops are returned to the states before Push Down is started. The output signal is derived from the OR gate Og18 shown in FIG. 17A so that the flip-flop FE is reset and the AND gate Ag28 is opened. As a result, the flip-flop CF3 is set in response to the fall or trailing edge of the control signal CO2 to generate the output signal CC3, which is applied to the AND gates Ag51 and Ag52 shown in FIG. 17H. Since the flip-flop FD(1) has been set in response to the depression of the division key $\div$, the output signal is derived from the AND gate Ag51 to actuate the division instruction generating circuit Div 35. Since the AND gates Ag48 and Ag50 are also opened, the content A in the register PR(1) and the content $B^C$ in the register ER are applied to the adder which perfoms the division $A \div B^C$ in response to the control signal from the circuit Div.35. The quotient $A/B^C$ is transferred through the AND gate Ag40 shown in FIG. 17F into the register PR(1). Since the quotient is a term, it must be stored in the term storage register PR(1). In response to the signal AND representing the completion of the division, the flip-flop FD(1) shown in FIG. 17A is set, No operation is performed in response to the control signals CC4 and CC5.

Upon depression of the key (, the output signal is derived from the OR gate Og16 shown in FIG. 17A, so that, as with the case of the depression of the clear key C, the flip-flops CF3, CF4 and CF5 are sequentially set to generate the control signals CC3, CC4, and CC5 sequentially. In response to the control signal CC3, the AND gate Ag31 shown in FIG. 17B is opened to generate the Push Down signals PQ.P.D. and F.P.D. for pushing down the registers PR(1)–PR(5), the registers QR(1)–QR(5) and one bit stack FD(1)–FD(5). As a result, Push Down is started. As shown in FIG. 20C, Step ×, $B^c$ and $A/B^c$ are stored in the registers ER and PR(1) before the key ( is depressed, and the contents in other registers PR(2)–PR(5) and QR(1)–QR(5) are all zeros. Furthermore the flip-flop FD(1) is reset. Therefore, the content $A/B^c$ in the register PR(1) is transferred into the register PR(2) after Push Down. The AND gate Ag1 shown in FIG. 16 is opened so that the content $B^c$ in the register ER is temporarily stored in the register PR(1). Since the register ER is a factor register while the register PR is a term register, this transfer is not defined as Push Down. In fact, in response to the signal CC5, the content $B^c$ in the register PR(1) is cleared. In response to the fall or trailing edge of the control signal CC3, the control signal CC4 is generated. In response to the control signal, CC3 the OR gate Og25 shown in FIG. 17E generates the output signal so that the AND gate Ag38 is opened to circulate the content in the register ER to hold it. Therefore, even when the content $B^c$ in the register ER is transferred into the register PR(1), the numerical value $B^c$ may be retained. In response to the fall or trailing edge of the control signal CC3, the AND gate Ag39 is closed, the right shift is made in response to the clock pulse CP generated when the control signal CC4 is generated to clear the content. In response to the generation of the control signal CC5 as shown in FIG. 18A in response to the fall or trailing edge of the control signal CC4, the register (1) is shifted to right in response to the clock pulse CP generated when the control signal CC5 is generated in a manner substantially similar to that described hereinbefore so that its content $B^c$ is cleared and the AND gate Ag43 is opened to store the numerical signal "1" into the LSD place in the register PR(1). Furthermore the register QR(1) is cleared in a manner substantially similar to that of clearing the register QR(1). Then the AND gate Ag25 shown in FIG. 17A is opened so that the flip-flop FD(1) is to be reset, but it has been already reset. The reset signal is also applied to the flip-flop FE which has been already reset.

The numerical value D is entered and stored in the register ER which has been cleared. Upon depression of the key +, the AND gate Ag28 is opened in response to the set output signal K+ from the flip-flop F1 because the flip-flop FE has been set so that the control signals CC3, CC4, and CC5 are sequentially generated. In response to the control signal CC3, the AND gate Ag52 is opened because the flip-flop FD(1) is reset so that the circuit Mult 34 is actuated. The AND gates Ag48 and Ag50 are also opened, the multiplication $$PR(1) \times ER \ ( = 1*D)$$

is performed by the adder in response to the control signal from the circuit Mult 34, and the product, which is the output $ADD_o$ of the adder, is transferred through the AND gates Ag39 and Ag 40 into the term storage register PR(1). In response to the control signal CC3, the OR gate Og25 shown in FIG. 17E generates the output signal in response to which the AND gate Ag38 is opened so that the content D in the register ER may be retained. Next in response to the control signal CC4, the output signal is derived from the OR gate Og33 because the key signal K+, which is the set output signal of the flip-flop F1, is applied thereto, so that the AND gate Ag47 is opened to actuate the addition instruction generating circuit ADD 38. The AND gate Ag48 is opened and then the AND gate Ag49 is opened so that the adder performs $$QR(1) + PR(1)$$

in response to the control signal from the circuit ADD 38. Since the content in the register PR(1) is D while the content in the register QR(1), 0, the sum is D ( =0+D ) and stored in the register QR(1) through the AND gate Ag46 shown in FIG. 17G. Since the numerical value D, which is a factor, is added to 0, it is transformed into an arithmetic expression so that the sum must be stored in the arithmetic expression storage register QR(1). In the next bit time following the LSD time $T_{LSD}$ during the control signal CC5 is generated, the AND gates Ag42 and Ag43 are opened so that the numerical signal "1" is stored in the LSD place in the register PR(1). The contents stored in the various registers when the above step is completed are shown in FIG. 20C, Step +. That is, the contents of the registers ER, PR(1), PR(2) and QR(1) are D, 1, $A/B^c$, and D, respectively, whicle the contents of the other registers are all zeros.

Next the numerical value E is entered and stored in the register ER. Upon depression of the parenthesis key ) the flip-flop FE shown in FIG. 17A is reset so that the control signals CC3, CC4 and CC5 are sequentially generated. Since the flip-flop FD(1) is reset, the AND gate Ag52 shown in FIG. 17H is opened in response to the control signal CC3 so that the circuit Mult 34 is actuated. The AND gates Ag48 and Ag50 are also opened, the adder performs the operation.

$$PR(1) \times ER \ ( = 1 \times E \ )$$

and the product is stored in the register PR(1) through the AND gate Ag40 shown in FIG. 17F. In response to the control signal CC4, the AND gate Ag47 is opened so that the circuit ADD38 is actuated. Since the AND gates Ag48 and Ag49 are also opened, the adder performs $$QR(1) + PR(1) \ (= D+E \ ),$$

and the sum D + E is stored in the register ER through the AND gate Ag35 shown in FIG. 17E. Since the sum D + E is an arithmetic expression, which is transformed into a primary or factor as it is grouped by the parenthesis, it must be stored in the factor storage register ER. In response to the control signal CC5, the AND gate Ag33 shown in FIG. 17C is opened to generate the Pop-Up signals F.P.U. and PQ.P.U., the registers PR(1)–PR(5), and QR(1)–QR(5) and the one-bit stack FD(1)–FD(5) are popped up. Consequently, the registers and the one-bit stack are returned to the states before the pushdown started in response to the key (. Therefore, as shown in FIG. 20C, Step ), the content $A/B^c$ in the register PR(2) is transferred into the register PR(1); the content O in the register PR(3), into the register PR(2); and the content O in the register QR(2), into the register QR(1). The content D stored in the register QR(1) is shifted out of the register QR(1) and is cleared. As a result, D × E and $A/B^c$ are stored in the registers ER and PR(1), respectively, while the contents in other registers are all zeros.

Upon depression of the key =, the AND gate Ag28 shown in FIG. 17A is opened as the flip-flop FE is reset so that the control signals CC3, CC4, and CC5 are sequentially generated. Since the flip-flop FD(1) shown in FIG. 17A is reset, in response to the control signal CC3 the AND gate Ag52 shown in FIG. 17H is opened so that the circuit Mult 34 is actuated. The AND gates Ag48 and Ag50 are also opened so that the adder performs the multiplication $$PR(1) \times ER \; ( = A/B^c \times ( D + E ) )$$

under the control of the circuit Mult 34. The product, which is the output ADDo of the adder, is transferred into the register PR(1) through the AND gate Ag40 shown in FIG. 17F. In response to the control signal CC4, the AND gate Ag47 shown in FIG. 17H is opened to actuate the circuit ADD 38, and the AND gates Ag48 and Ag49 are opened. The adder performs $$QR(1) + PR(1).$$

Since the content in the register QR(1) is 0, the content $A/B^c \times ( D + E )$ in the register PR(1) remains unchanged. Since O is added, the sum must be stored in the arithmetic expression storage register QR(1), but since the key = is depressed the content $A/B^c \times (D + E)$ stored in the register PR(1) remains unchanged. Therefore, it is no longer an arithmetic expression, but is a constant. Since a constant is a primary or factor, and AND gate Ag35 shown in FIG. 17E is opened as with the case of the depression of the parenthesis key ), and then the AND gate Ag37 is opened in response to the output signal from the AND gate Ag35 so that the output ADDo of the adder, that is the content $A/B^c \times ( D + E )$ stored in the register PR(1), is stored in the factor storage register ER.

In response to the control signal CC5, the routine similar to that when the key ( or C is depressed is performed to carry out the next arithmetic operation. That is, the register PR(1) and QR(1) are cleared while the flip-flops FD(1) and FE are reset. The numerical value 1 is stored in the LSD place in the register PR(1). Thus, all of the steps are completed as shown in FIG. 20C, Step =.

The numerical values A,B,C,D and E entered and the results $B^c$, O D + E, and $A/B^c$ (D+E) during the arithmetic operation may be displayed or printed as the keys are depressed in the order of $A \div B \; a^x \; C \times ( D + E ) =$. The display or printing may be accomplished in a simple manner by coupling the register ER to an output unit O shown in FIG. 16. Upon depression of the substraction key —, the AND gate Ag41 shown in FIG. 17F is opened at the timing of the sign place of the register PR(1) so that the numerical signal "1" is stored in the sign digit place so as to perform the substraction. Therefore even though the substraction instruction generating circuit SUB shown in FIG. 17H is eliminated, the instruction signal may be derived from the circuit ADD38 so that the overall construction of the computer may be much simplified.

As described hereinbefore, according to the third embodiment of the present invention, a factor may be transformed into an arithmetic expression by the depression of the keys + and —, and a factor may be transformed into a term by the depression of a key $\times$ or $\div$. The factors, terms and arithmetic expression are stored in the factor, term and arithmetic expression storage registers, respectively and pushed down and popped up. Therefore, the answer to a very complex problem may be obtained automatically just by depressing the keys on the keyboard in the sequence as the numerical values, operators, and other mathematic notations appear in the problem.

As defined hereinbefore, an arithmetic expression includes a term which in turn includes a factor which in turn includes a primary. Therefore, an arithmetic expression includes a primary. Based upon the above principles, the circuit of the computer in accordance with the present invention is arranged so that the circuit is very simple in construction and the answer to a complex problem may be obtained simply by entering the numerical values, operators and other mathematic notations in the sequence as they appear in the problem.

In the first and second embodiments, the execution times for addition, substraction, multiplication and division are almost equal so that the overall execution time may be substantially reduced. Furthermore, the modification of the circuit due to the addition or elimination of the operator such as may be minimized. Moreover the third embodiment of the present invention has a distinct advantage that the numerical values entered and the results of the arithmetic operation during its execution may be displayed or printed in a very simple manner. Furthermore, according to the present invention, the provision of a register TR for storing therein all of the operators is not required since the arithmetic operations may be carried out when the flip-flop FD(1) for memorizing the depression of the key $\times$ or $\div$ is provided. A plurality of flip-flops FD(1)-FD(5) are arranged to make up a stack in order to solve a complex problem, but according to the present invention even a complex problem may be solved by using only two flip-flops FD as shown in FIG. 20C.

As described hereinbefore, according to the present invention, when an arithmetic expression is grouped by the parentheses ( and ), it is transformed into a primary which is a factor or term so that it is returned to an arithmetic expression again. Therefore, a mathematic expression aggregated or grouped by a plurality of parenthesis, brackets and so on such as { [ ([ ————— ] ) ] } may be solved by the repeated operations of a definite number of circuits by applying the above rules again and again so that the computer of the present invention is very simple in both construction and operation.

We claim:
1. An electronic calculator comprising:
   a keyboard having numerical keys, operator keys of addition, subtraction, multiplication and division, a left parenthesis key and a right parenthesis key;
   first detecting means operative in response to the depression of said left parenthesis key for producing a first detection signal;
   second detecting means operative in response to the depression of said right parenthesis key for producing a second detection signal;
   a plurality of data register means for storing data from said numerical keys, said plurality of data register means comprising result register means for storing a partial result indicating output;
   order register means for storing orders from said operator keys;
   arithmetic control means operative in response to said first and second detection signals provided from said first and second detecting means, respectively, for performing partial result arithmetic operations on the data stored in the data register means during an interval defined by the depression of said left parenthesis key and said right parenthesis key, for producing a corresponding partial result indicating output, for transferring the output to said result register and for holding said partial result indicating output in said result register means until a subsequent depression of one of said operator keys; and display means for displaying the contents of said result register, said display means having an input coupled to receive the contents of said result register.

2. An electronic calculator as defined in claim 1, wherein said keyboard further includes an exponential operation key, third detecting means being provided for detecting the depression of said exponential operation key to produce a third detection signal, said arithmetic control means further including a circuit to execute exponential operations, means connected to permit said circuit to execute exponential operations on data provided immediately before and after the depression of the exponential key in response to said third detection signal provided from said third detecting means, whereby a result obtained from the exponential operation is stored in said result register to be continuously displayed in said displaying means until the next depression of one of said operator keys.

3. An electronic calculator comprising:
a keyboard having numeral keys, operator keys of addition, subtraction, multiplication and division, a left parenthesis key and a right parenthesis key;
first detecting means operative in response to the depression of said left parenthesis key for producing a first detection signal;
second detecting means operative in response to the depression of said right parenthesis key for producing a second detection signal;
a plurality of data register means for storing data from said numerical keys, said plurality of data register means comprising result register means for storing a partial result;
order register means for storing coded signals corresponding to the depression of said operator keys, the contents of the order register being shiftable right and left;
left shifting means having an input connected to receive outputs from said first detecting means and being operative in response to said first detection signal provided from said first detecting means for shifting left the contents of said order register;
storage control means having an input connected to receive the output from said second detecting means and being operative in response to said second detection signal to permit the resultant empty digits of the order register means, caused by the left shifting of its contents, to be filled with said coded signals of the operator keys;
arithmetic control means operative in response to said second detection signal provided from said second detecting means for performing partial result arithmetic operations defined by said coded signals for transferring a partial result obtained from the partial result arithmetic operations to said result register and for holding said partial result in said result register for continuous display until a subsequent depression of one of said operator keys;
means operative in response to a signal indicating completion of said arithmetic operation in the arithmetic control means for shifting right the contents of said order register; and
displaying means connected to receive the contents of said result register.

4. An electronic calculator comprising:
a keyboard having numerical keys and operator keys of addition, subtraction, multiplication and division;
encoder means interconnected to the keyboard for coding signals provided by the depression of said operator keys on the keyboard;
first register means interconnected to the encoder for storing coded signals provided from the encoder into digits of said register in sequence from the least significant digit toward the most significant digit, said first register being constructed to shift the contents thereof left and right;
a group of second register means in an ordered stack arrangement and interconnected to the keyboard for storing numerical data provided from the numerical keys on the keyboard, the registers in said group of registers being disposed and mutually interconnected to permit said numerical data to be stored therein via the highest ordered register in the group;
a result storing register interconnected to said highest ordered register for storing a partial result;
discriminating circuit means interconnected to both said first register and said keyboard for comparing an order stored in a digit of said first register with an order then provided from the keyboard to decide an arithmetic operation sequence to be executed to produce decision signals;
a control circuit interconnected to said discriminating circuit for producing arithmetic operation executing instructions in accordance with the decision signals provided from said discriminating circuit;
an arithmetic operation executing circuit interconnected to said control circuit for executing arithmetic operations in accordance with said instructions provided from said control circuit, for producing a partial result, for transferring the partial result to said result storing register and for holding said partial result stored in said result storing register until a subsequent depression of one of said operator keys; and
display means for displaying the contents of the result storing register.

5. An electronic calculator comprising:
a keyboard having numerical keys and operator keys of addition, subtraction, multiplication, division, and exponential operation;
a first register for storing a primary or factor as first data;
a group of second register means in an ordered stack arrangement for storing terms as second data, said second register means being disposed and mutually interconnected to permit said second data to be stored therein via the highest ordered register in the group;
a group of third register means in an an ordered stack arrangement for storing an arithmetic expression as first information, said third register means being disposed and mutually interconnected to permit said first information to be stored therein via the highest ordered register in the group;
a group of flip-flops in an ordered stack arrangement and connected to be loaded with second information representing the depression of the division key on the keyboard, said flip-flops being disposed and mutually interconnected to permit the second information to be stored therein via the highest ordered flip-flop;

a further flip-flop connected to be loaded with third information representing the depression of the exponential operation key on the keyboard;

a control circuit coupled to said keyboard, to said group of flip-flops and to said further flip-flop, said control circuit being operative to detect whether any signal caused by the depression of one of said division and exponential operation keys is included within the signals provided by the operator keys then and previously depressed to selectively load the first, the second and the third groups of registers with numerical data provided by the numerical keys depressed on the keyboard;

an arithmetic circuit interconnected to said control circuit for executing arithmetic operations on numerical data stored in the first, the second and the third groups of registers by said control circuit; and display means for displaying the contents of the first register.

* * * * *

UNITED STATES PATENT OFFICE
CERTIFICATE OF CORRECTION

Patent No. U.S. Patent 3,971,924     Dated  July 27, 1976

Inventor(s)  Masayoshi Ozawa, et al.

It is certified that error appears in the above-identified patent and that said Letters Patent are hereby corrected as shown below:

Under the ABSTRACT, before "Figures" insert --5 Claims, 20 Drawing--.

Column 2, line 24, change "sequece" to --sequence--.

Column 4, line 3, delete the "=" sign and insert a comma after the "-" sign;

line 40, change "commercial" to --numerical--;

line 48, change "0" to --zero (0)--;

line 49, insert --zero-- before "(0);

line 59, change "0" to --"0"--.

Column 5, line 26, change "12" to --2--.

Column 6, line 61, change "operations" to --operation--.

Column 7, line 41, change "0" to --zero (0)--;

line 66, after "$a^x$," insert --X--.

Column 10, line 13, change "ate" to --gate--.

Column 12, line 45, after "value" insert --C--.

Column 13, line 19, change "hereinabove" to --hereinbefore--;

line 22, delete ""the sum of" (first occurrence).

UNITED STATES PATENT OFFICE
CERTIFICATE OF CORRECTION

Patent No. U.S. Patent 3,971,924    Dated    July 27, 1976

Inventor(s) Masayoshi Ozawa, et al.

It is certified that error appears in the above-identified patent and that said Letters Patent are hereby corrected as shown below:

Column 14, line 46, change "Reasearch" to --Research--;

line 48, after "invention" change the comma to a period.

Column 18, line 32, change "Kx" to --K$\div$--.

Column 22, line 22, change "$Log^{10}B^C$" to --$Log_{10}B^C$--.

Column 24, line 45, change "OR(1)" to --QR(1)--.

Column 26, line 20, insert --↑-- before "may".

Signed and Sealed this

Nineteenth Day of October 1976

[SEAL]

Attest:

RUTH C. MASON
*Attesting Officer*

C. MARSHALL DANN
*Commissioner of Patents and Trademarks*